(12) United States Patent
Campos et al.

(10) Patent No.: US 11,855,704 B1
(45) Date of Patent: *Dec. 26, 2023

(54) SYSTEMS AND METHODS FOR COHERENT OPTICS INTERFACE

(71) Applicant: CABLE TELEVISION LABORATORIES, INC., Louisville, CO (US)

(72) Inventors: Luis Alberto Campos, Superior, CO (US); Zhensheng Jia, Superior, CO (US); Matthew D. Schmitt, Pleasanton, CA (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/827,914

(22) Filed: May 30, 2022

Related U.S. Application Data

(60) Continuation of application No. 17/181,682, filed on Feb. 22, 2021, now Pat. No. 11,349,573, which is a continuation of application No. 16/595,217, filed on Oct. 7, 2019, now Pat. No. 10,931,380, which is a division of application No. 16/191,435, filed on Nov. 14, 2018, now Pat. No. 10,581,530.

(60) Provisional application No. 62/757,116, filed on Nov. 7, 2018, provisional application No. 62/585,640, filed on Nov. 14, 2017.

(51) Int. Cl.
*H04B 10/27* (2013.01)
*H04B 10/61* (2013.01)
*H04L 67/10* (2022.01)
*H04L 12/28* (2006.01)
*H04B 10/50* (2013.01)
*H04B 10/2575* (2013.01)

(52) U.S. Cl.
CPC ....... *H04B 10/615* (2013.01); *H04B 10/2575* (2013.01); *H04B 10/27* (2013.01); *H04B 10/501* (2013.01); *H04L 12/2878* (2013.01); *H04L 67/10* (2013.01)

(58) Field of Classification Search
CPC .. H04B 10/615; H04B 10/2575; H04B 10/27; H04B 10/501
See application file for complete search history.

(56) References Cited

U.S. PATENT DOCUMENTS

| | | | |
|---|---|---|---|
| 9,385,896 B1* | 7/2016 | Mitra | H04L 25/03203 |
| 11,349,573 B1* | 5/2022 | Campos | H04B 10/501 |
| 2013/0129350 A1 | 5/2013 | Koley et al. | |
| 2014/0016928 A1* | 1/2014 | Khatana | H04B 10/616 |
| | | | 398/25 |
| 2016/0196740 A1* | 7/2016 | Park | H04W 12/06 |
| | | | 340/12.28 |
| 2016/0204871 A1 | 7/2016 | Li et al. | |
| 2018/0269984 A1 | 9/2018 | Salsi et al. | |
| 2019/0052392 A1 | 2/2019 | DeAndrea | |
| 2019/0104078 A1* | 4/2019 | Kachrani | H04L 41/0659 |

* cited by examiner

*Primary Examiner* — Dzung D Tran
(74) *Attorney, Agent, or Firm* — Josh C. Snider

(57) ABSTRACT

A communication network includes a coherent optics transmitter, a coherent optics receiver, an optical transport medium operably coupling the coherent optics transmitter to the coherent optics receiver, and a coherent optics interface. The coherent optics interface includes a lineside interface portion, a clientside interface portion, and a control interface portion.

20 Claims, 40 Drawing Sheets

SYSTEMS AND METHODS FOR COHERENT OPTICS INTERFACE

CROSS REFERENCE TO RELATED APPLICATIONS

This application a continuation of U.S. patent application Ser. No. 17/181,682, filed Feb. 22, 2021. U.S. patent application Ser. No. 17/181,682 is a continuation of U.S. patent application Ser. No. 16/595,217, filed Oct. 7, 2019. U.S. patent application Ser. No. 16/595,217 is a divisional of U.S. patent application Ser. No. 16/191,435, filed Nov. 14, 2018, now U.S. Pat. No. 10,581,530, issued on Mar. 3, 2020. U.S. patent application Ser. No. 16/191,435 claims the benefit of and priority to U.S. Provisional Patent Application Ser. No. 62/585,640, filed Nov. 14, 2017, and U.S. Provisional Patent Application Ser. No. 62/757,116, filed Nov. 7, 2018. All of these prior applications are incorporated herein by reference in their entireties.

BACKGROUND

The field of the disclosure relates generally to communication networks, and more particularly, to communication interfaces for access networks capable of transporting signals according to one or more network protocols.

Most network operators have very limited fiber available between the headend (HE)/hub and the fiber node to use for data and video services, often only just 1-2 fiber strands. With end users demanding more bandwidth to the home, operators need a strategy on how to increase capacity in the access network. One way is to add more fiber between the HE/hub and the fiber node, but retrenching is costly and time consuming, so return on investment (RoI) makes this option unattractive; a solution that re-uses the existing infrastructure would be preferred. The best use of the existing infrastructure to meet the bandwidth demand while avoiding the retrenching costs is to use point-to-point (P2P) coherent optics along with wavelength division multiplexing (WDM) in the access network.

Coherent optics technology is becoming common in the subsea, long-haul, and metro networks, but has not yet been applied to access networks. However, it is desirable to utilize coherent optics technology in the access network because the distances from the HE/hub to the fiber node are much shorter in coherent optics networks in comparison with other types of networks. It is therefore desirable to provide coherent optics systems and methods for the access network realize a larger margin for adding more compact wavelengths, due to the signal-to-noise (SNR) improvements in that would result. By adapting coherent optics technology to the access network, some of the modules used in other networks, to conduct distortion compensation, nonlinear compensation, and error correction, may be eliminated, simplified, and/or implemented using components with relaxed requirements, thereby resulting in significant cost savings for a P2P coherent optic link implementation.

SUMMARY

In an embodiment, a communication network includes a coherent optics transmitter, a coherent optics receiver, an optical transport medium operably coupling the coherent optics transmitter to the coherent optics receiver, and a coherent optics interface. The coherent optics interface includes a lineside interface portion, a clientside interface portion, and a control interface portion.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
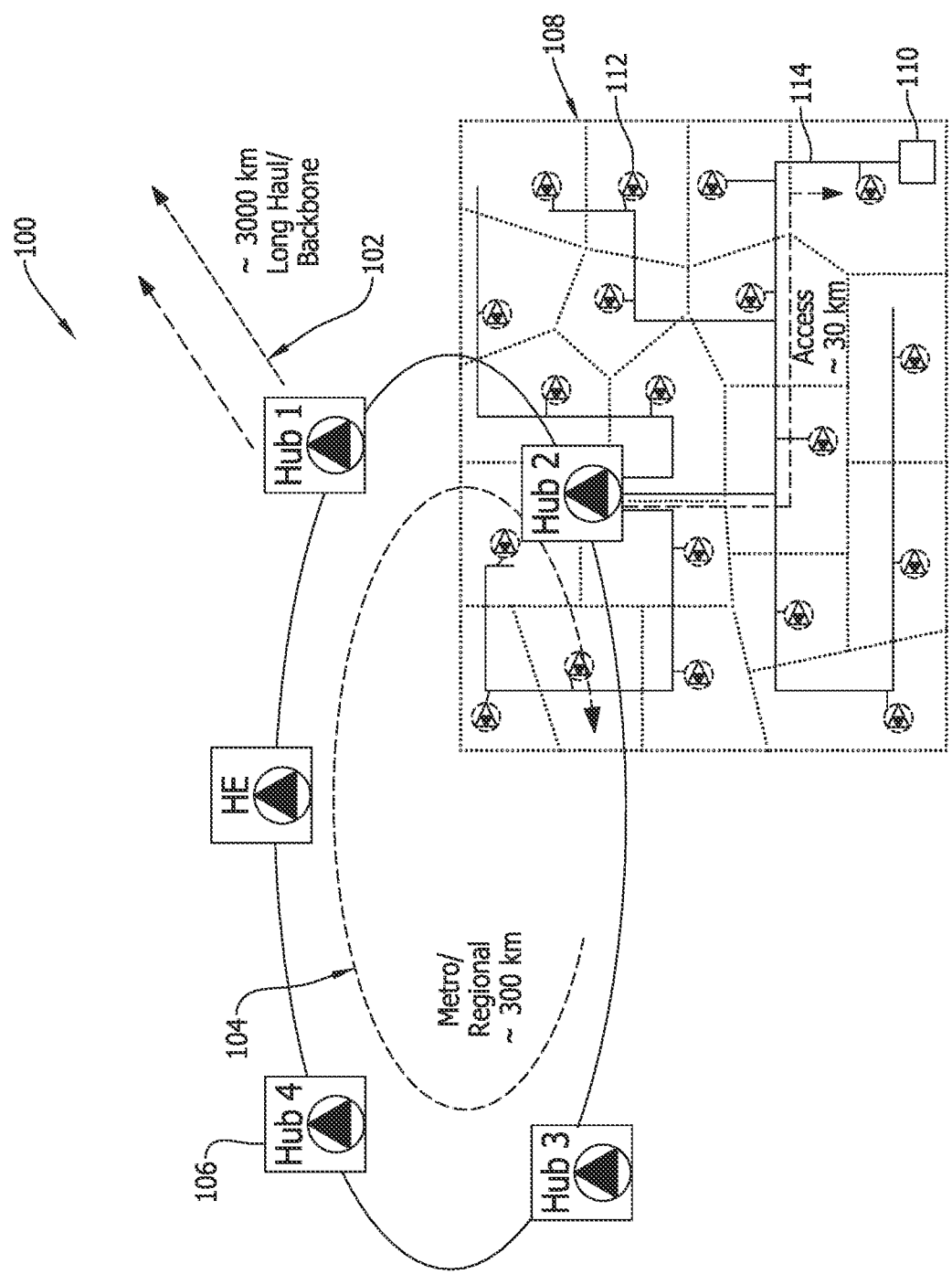
FIG. 1 is a schematic illustration of a cable network access architecture.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, unless specified to the contrary, "modem termination system," or "MTS"" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative cable access network architectures that are particular useful for the growing access network trends in the field. The present systems and methods leverage coherent optics, and particularly with respect to P2P systems, to significantly improve the cable access network, as well as access networks in general. According to the present techniques, the link loss budgets for P2P coherent optics transceivers are also significantly improved, and for a wide variety of different use cases.

FIG. 1 is a schematic illustration of a cable network access architecture 100. Architecture 100 includes a long haul or backbone network 102 that interconnects different metropolitan areas or regions in which an operator provides service. Architecture 100 further includes a metro or regional network 104 that provides interconnection to one or more hubs 106. One or more hubs 106 are deployed by the operator in a contiguous geographic area, such as, for example, an entire metropolitan area or state, or portions thereof. An access network 108 provides connection to a plurality of end users 110. End users 110 may include residential customers, business customers, small cells or base station backhaul-front-haul. Access network further includes plurality of nodes 112, amplifiers (not shown), or taps, that are interconnected by a transmission medium 114 to provide service to endpoints 110. Transmission medium 114 may be a fiber, coaxial cables, or other suitable means for signal transmission. Specific references any specific type of transmission medium (e.g. a fiber) herein should not be construed as limiting and are provided for illustrative purposes, unless otherwise indicated.

In operation of architecture 100, some components (not shown) at hub 106 generate radio frequency (RF) signals that are converted to optical signals, which hub 106 transmits over transmission medium 114 (e.g., an optical fiber) to node 112 (e.g., a fiber node) utilizing analog optics. Node 112 converts the optical signals back to RF/electrical signals that node 112 transmits over coaxial cable to endpoints 110. In some embodiments, the RF signal requires amplification several times using RF amplifiers (not shown in FIG. 1) to reach endpoints 110.

Most cable operators run a centralized network that includes head ends, hubs, and fiber nodes. This centralized architecture originally transmitted downstream video to cable subscribers, but then evolved into a data over cable network as defined by Data over Cable Service Interface Specification (DOCSIS) that introduced cable modem termination system (CMTS) in the headend and the cable modem (CM) at the customer premises. This centralized architecture originally provided internet access and video delivery on the same coaxial cable. The Video EdgeQAM (EQAM) was introduced into the HE/Hub to enable digital video, video-on-demand (VOD), and switched-digital-video. EQAMs evolved to support the modulation of both MPEG video and DOCSIS data onto the wire using a Modular Headend Architecture (MHA-TR). The CMTS and EQAM continued to evolve into the converged cable access platform (CCAP) that provided higher densities of EQAM and CMTS combined together into the same chassis; other technologies like Ethernet optics and Ethernet passive optical network (EPON) theoretically may share the same chassis as well. As a result, the CCAP enabled data, voice, and video to be handled over IP before being converted to RF or optical signals [CCAP-ARCH].

Figure 2:
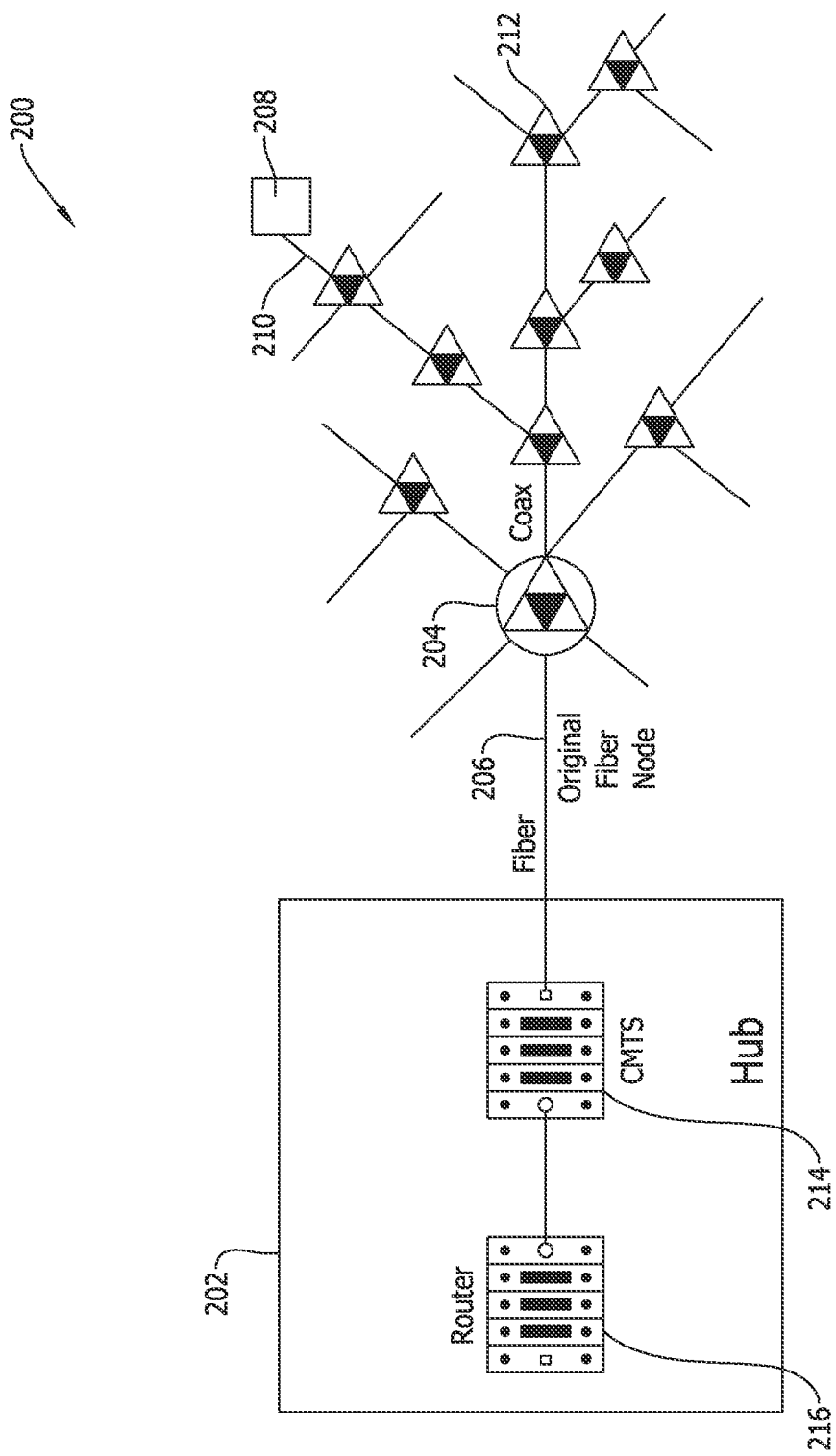
FIG. 2 is a schematic illustration of a centralized converged cable access platform architecture.

FIG. 2 is a schematic illustration of a centralized architecture 200. Architecture 200 is a centralized CCAP, which has a hybrid fiber-coaxial (HFC) architecture. Architecture 200 includes a hub 202, a node 204, and a transport medium 206 communicatively coupled therebetween. Transport medium 206 may be an optical fiber. Architecture 200 also includes a plurality of end users 208 downstream from node 204 and a short transport medium 210 communicatively coupled between node 204 and end user 208. A plurality of amplifiers 212 (e.g., including deep nodes) are communicative coupled between node 204 and end user 208 by short transport medium 210. Hub 202 further include a MTS 214 and a router 216.

In operation of architecture 200, the CMTS at hub 202 generates RF signals to node 204 over analog optics. From node 204, there are one or more amplifiers 212 in cascade. Typical HFC networks have a relatively small number (e.g., 6 to 8) of fiber strands 206 dedicated to each node 204. In some cases though, fibers 206 may be repurposed for other services or node splitting, which usually leaves 1-2 strands available for the original node 206 to support video and data services. Architecture 200 may support about 400 to 500 households per node 206.

As bandwidth demands increased, one approach utilized by cable operators to increase capacity has been to split each node into multiple nodes, referred to as node splits. With each node split, the number of amplifiers between the node and the end of the coaxial plant typically decreases. Eventually operators can reach a point where there is only a single amplifier between the fiber node and the end of the plant (known as N+1), or there are no more amplifiers at all (known as N+0 or Passive Coax). This both reduces the number of customers sharing the capacity available from that that node, and also reduces the amount of RF noise introduced by amplifiers.

Collectively, when a node reaches N+1 or N+0, it is referred to as a deep node, or a fiber deep node. The reason for this is that while some node splits can be made at the existing node location by segmenting the existing coaxial plant, eventually it becomes necessary to push those fiber nodes—and the fiber that supports them—deeper into the network.

Figure 3:
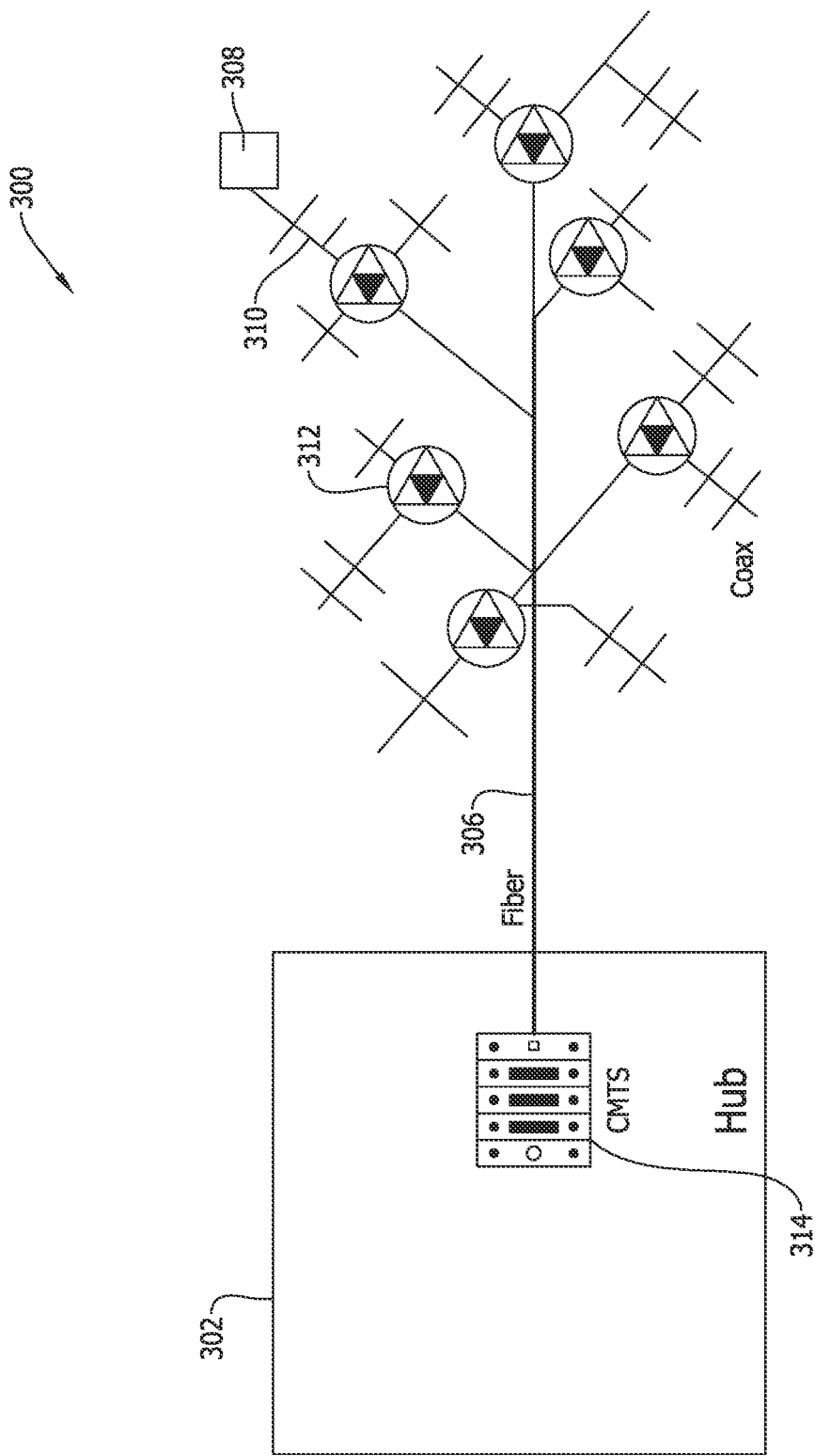
FIG. 3 is a schematic illustration of a fiber deep node architecture.

FIG. 3 is a schematic illustration of a fiber deep node architecture 300. In this description, and for the embodiments that follow, like features are referred to similarly to like features in architecture 200 (FIG. 2). Architecture 300 is a deep node architecture. Similar to architecture 200, architecture 300 includes a hub 302, a transport medium 306, a plurality of end users 308, a plurality of short transport media 310, and a MTS 314. Different from the configuration illustrated in FIG. 2, architecture 300 includes a plurality of deep nodes 312 communicatively coupled to transport medium 306 downstream of hub 302. Deep nodes 312 are communicatively coupled to respective end user 308 through short transport media 210. Architecture 300 may also include an original node (not shown).

As illustrated in FIG. 3, in cases where there are extra strands of fiber 306 at the original node (not shown) are not in use, these strands can be repurposed and extended out to the deep nodes 312. The thick line of fiber 306 extending from hub 302 to deep nodes 312 gets thinner as it adds each deep node 312 to represent multiple fibers 306 from hub 302 being extended to fiber 306 at each node 312. By extending fiber 306 to deep node 312, the bandwidth is increased deeper into the access network. Since a fiber deep node 312 has fewer end users 308 to serve, it has more capacity available to those end users 308. In this instantiation, the bandwidth limit is that of fiber(s) 306 at the deep node 312.

Figure 4:
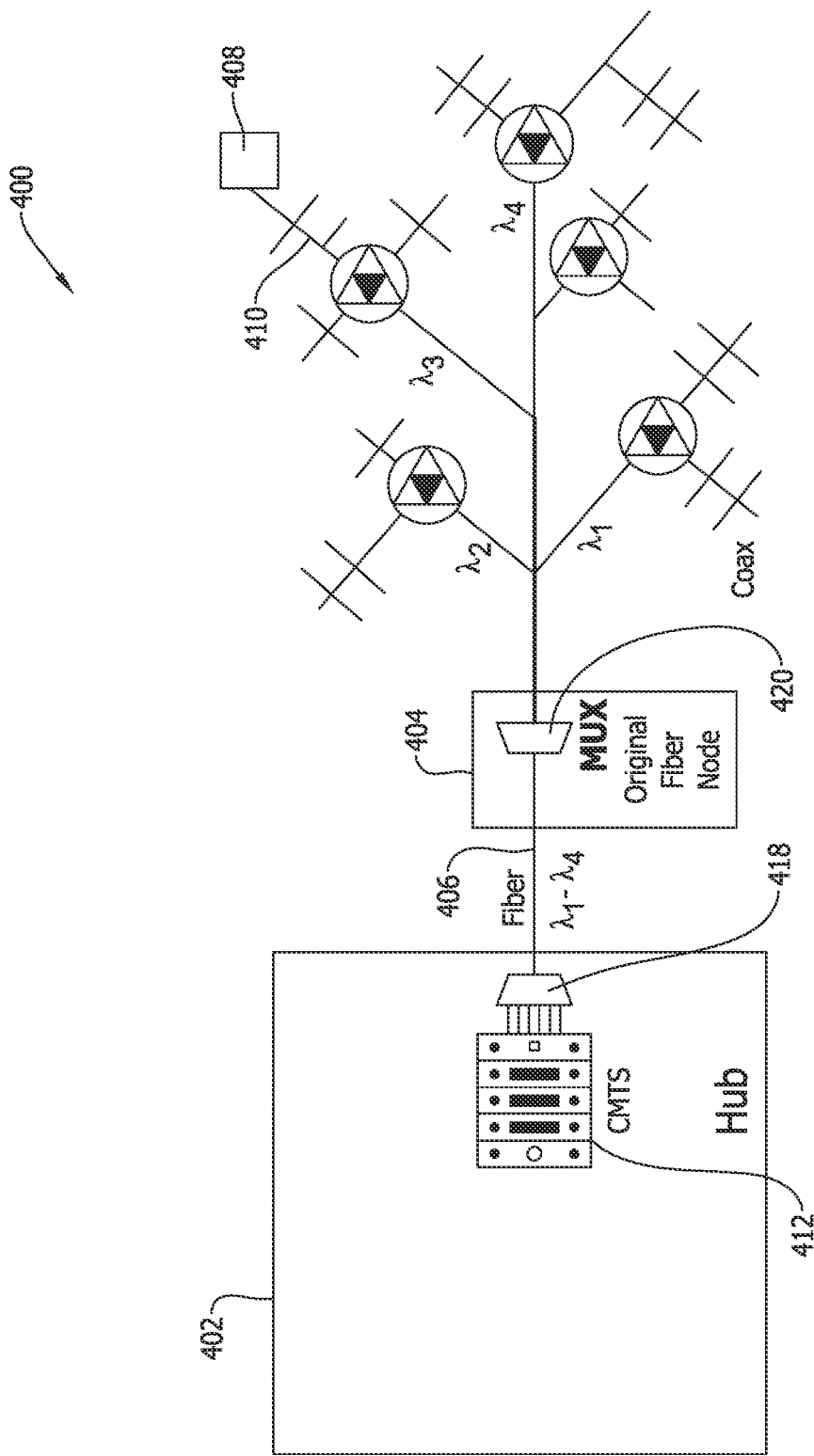
FIG. 4 is a schematic illustration of a fiber deep node architecture.

FIG. 4 is a schematic illustration of a fiber deep node architecture 400. Architecture 400 is a deep node architecture that includes a wavelength multiplexer, and is similar to, in some respects, architecture 300. Architecture 400 includes a hub 402, a node 404, a transport medium 406, a plurality of end users 408, a plurality of short transport media 410, a plurality of deep nodes 412, and a MTS 414. Different from the configuration illustrated in FIG. 3, architecture 400 further includes a multiplexer 418 communicatively coupled to MTS 414 and transport medium 406 at hub 402 and a demultiplexer 420 commutatively coupled to transport medium 406 at node 404. Node 404 may, for example, be an optical distribution center (ODC).

As described above, there are limited fibers 406 available between node 404 location and hub 402. In order to support multiple deep nodes 412, where before there was only one, some type of wavelength division multiplexing (WDM) may be used to support multiple wavelengths, one for each of new deep node 412. As shown in FIG. 4, in some embodiments, multiplexer 418 may be used to aggregate multiple wavelengths onto a single fiber or fiber pair, allowing multiple nodes 404, 412 to share the same fiber 406 connecting to hub 402. It should be noted that with analog optics, the link between hub 402 and ODC 404 is most commonly four wavelengths, but could be up to 16 wavelengths for shorter distances. This limited number of wavelengths is due to the noise generated by the analog signals, which require larger spacing between each wavelength to prevent inter-channel interference. Therefore, this is the practical maximum capacity for analog wavelengths from hub 402 to ODC without adding additional fiber.

The next evolution of the cable access network is to distribute some of its functions down to remote locations like the fiber node. This evolution is referred to generally as a distributed architecture; when some or all of the CCAP is distributed into the network, also referred to as a distributed CCAP Architecture (DCA). Distributed CCAP architectures extend the reach of the digital medium which provides performance gains that are helpful in getting to higher order DOCSIS modulation (e.g., CCAP-ARCH).

There are three distributed architectures that have been defined so far: remote-physical layer (R-PHY); remote-media access control PHY (R-MACPHY); and split-media access control (Split-MAC). In some embodiments, Remote-MACPHY moves the entire CMTS/CCAP into a device that sits at a remote node, referred to as a R-MACPHY device (or RMD). R-PHY splits the CMTS between the MAC layer and PHY layer and moves the PHY layer to a remote node; the device at the hub that retains the MAC layer is referred to as a CCAP-Core, and the device that sits at the Remote Node location is referred to as Remote PHY Device (RPD). Split-MAC moves some of the MAC function and all the PHY function to the remote node.

Figure 5:
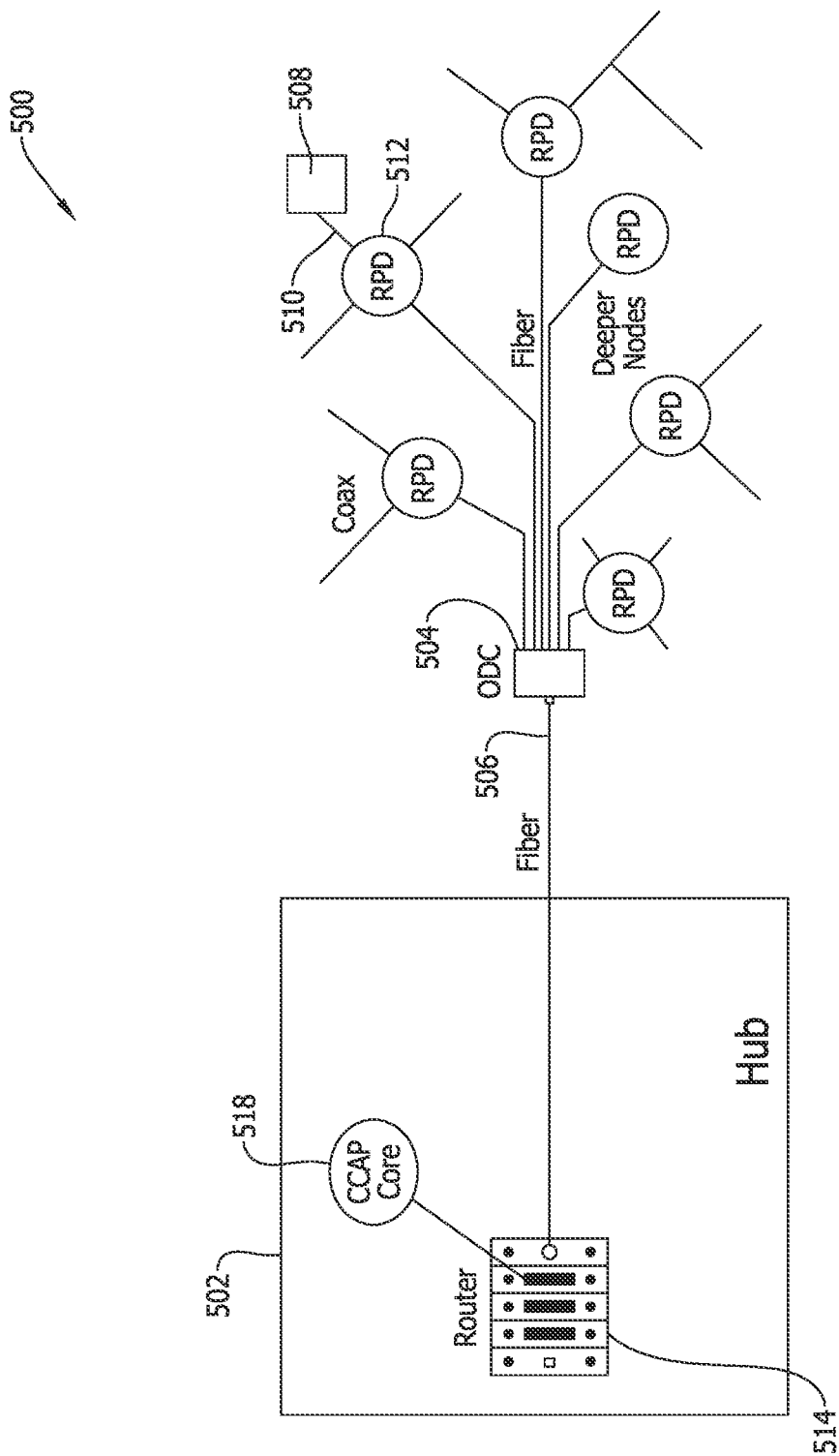
FIG. 5 is a schematic illustration of a remote network architecture.

FIG. 5 is a schematic illustration of a remote network architecture 500. Architecture 500 represents a PHY architecture, and is similar to, in some respects, architecture 300, FIG. 3. That is, architecture 500 includes a hub 502, a node 504, a transport medium 506, a plurality of end users 508, a plurality of short transport media 510, a plurality of deep nodes 512, and a router 516. Node 504 may be an OCD (e.g., an enclosure), or an OCD may exist elsewhere within architecture 500. Deep nodes 512 may represent a RPD, and router 516 may include a CCAP core 518. In this case, architecture 500 illustrates an R-PHY architecture, and is functional to convert from a digital medium like Ethernet or PON to analog for transmission over coaxial using RF in the downstream and upstream directions.

In operation of architecture 500, the ODC, which may be located in node 504, includes an Ethernet switch that receives an inbound Ethernet signal from the CCAPMTS 414 at hub 402 and routes the Ethernet signal to the intended RPD (e.g. located in deep node 512). The RPD terminates the Ethernet signal and converts it into RF that it sends to modem at the customer premises of end user 508. A R-MACPHY architecture (not shown) is similar to architecture 500; however, a R-MACPHY architecture will typically include an RMD instead of a RPD as deep nodes 512.

Figure 6:
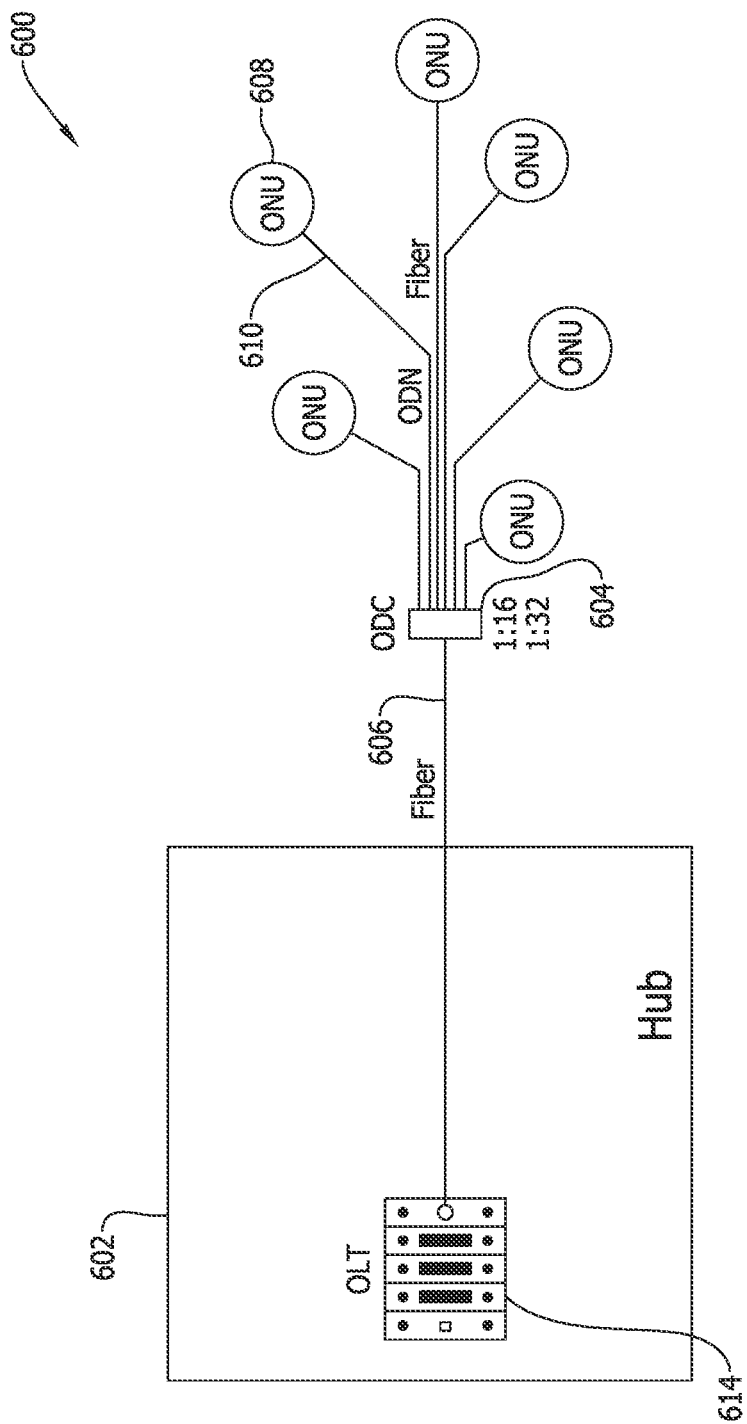
FIG. 6 is a schematic illustration of a passive optical network architecture.

FIG. 6 is a schematic illustration of a passive optical network (PON) architecture 600. Architecture 600 similar to, in some respects, architecture 300, FIG. 3, and includes a hub 602, a node 604, a transport medium 606, a plurality of end users 608, and a plurality of short transport media 610. Different from the configuration illustrated in FIG. 3, architecture 600 includes an optical line terminal (OLT) 614 at hub 602. Additionally, a plurality of optical network units (ONUs) 608 are coupled to transport media 610 at or near the customer premises of end users.

In some cases, such as areas with new construction, cable operators may build purely fiber networks rather than HFC networks using PON technologies. PON architecture 600 supports fiber 606 and/or 610 to end users (e.g., a residential customer (FTTH), a business (FTTB), small cell (FTTC), base station or tower (FTTT)). Architecture 600 includes OLTs at hub 602, optical splitters at node 604 (i.e., the location of the ODC), and ONUs 608 at or near the customer premises of endpoints/end users. Architecture 600 may service 16-32 ONUs. A digital PON architecture, such as architecture 600 may have some limitation, such as, for example, digital PON architecture traditionally supports no more than 20 km between the OLT 614 and ONU at the premises of end user 608, because of the signal loss that occurs from attenuation of the fiber and by using only passive components like optical splitters.

Figure 7:
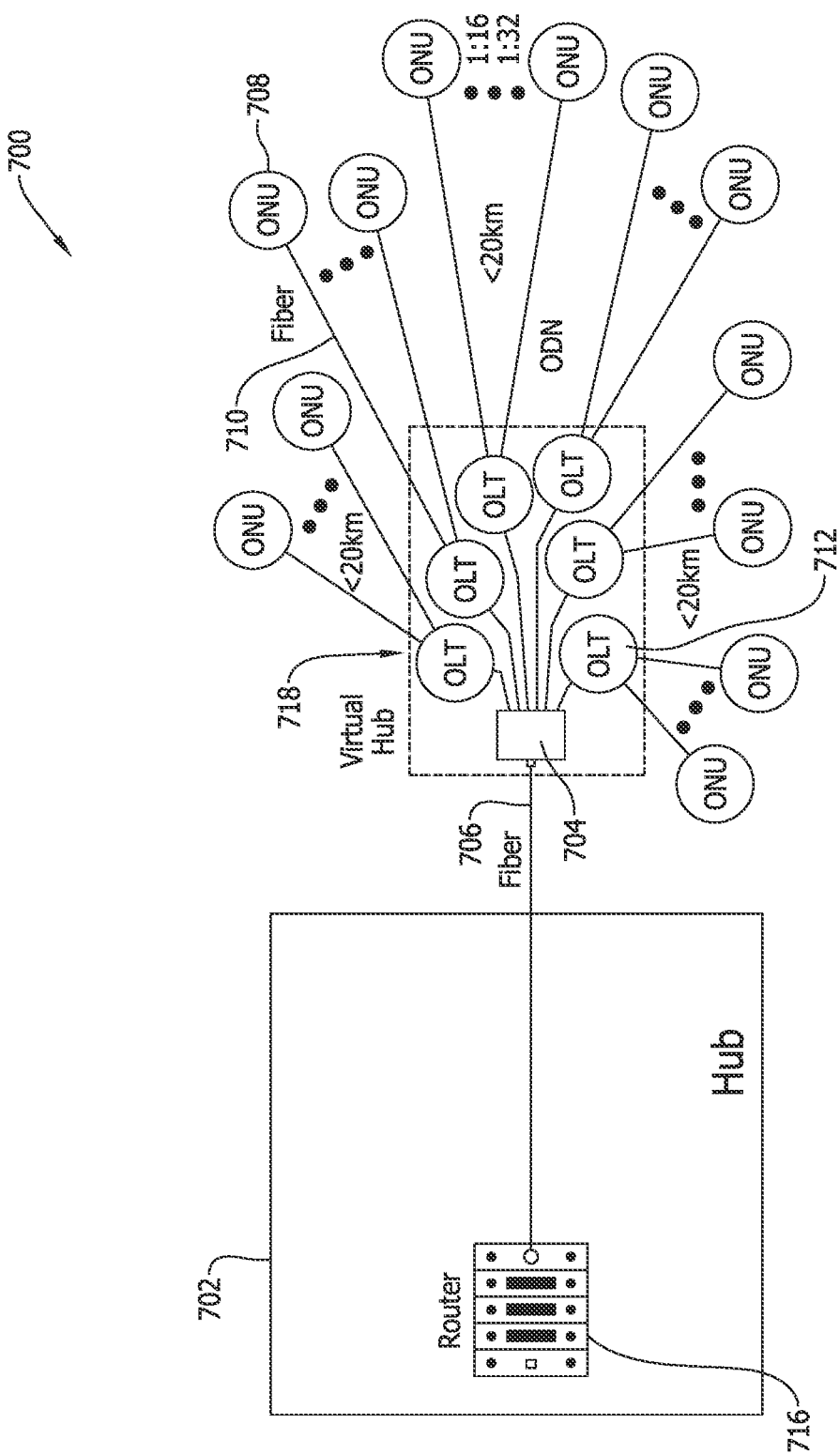
FIG. 7 is a schematic illustration of a remote passive optical network architecture.

FIG. 7 is a schematic illustration of a remote passive optical network architecture 700. Architecture 700 is a remote PON architecture, and is similar to, in some respects, architecture 300 (FIG. 3). Architecture 700 includes a primary hub 702, a node 704, a transport medium 706, a plurality of end users 708, a plurality of short transport media 710, and a router 714. Different from the configuration illustrated in FIG. 3, architecture 700 further includes a plurality of OLTs 712 downstream of node 704 and upstream from end users 708. As illustrated in FIG. 7, architecture 700 further forms a virtual hub 718 that includes node 704 and one or more OLTs 712. A plurality of ONUs is respectively coupled to transport media 710 at or near the premises of end users 708.

As described above, digital PON traditionally supports no more than 20 km between the OLT and ONU, because of the signal loss that occurs from attenuation of the fiber and by using only passive components like optical splitters. To overcome this limitation, operators can deploy Remote PON, or R-PON, architectures, such as architecture 700, to move OLT 712 out of primary hub 702 to a cabinet within virtual hub 718. OLT 712 is typically located less than 20 km from an ONU at the premises of an end user 708. By combining multiple wavelengths onto fiber 706 from hub 702 to virtual hub 718, virtual hub 718 can contain multiple OLTs 712, one for each wavelength. As shown in FIG. 7, virtual hub 718 contains a remote OLT 712 as well as an element that decomposes the single fiber back into individual wavelengths with one wavelength per fiber, where each fiber 710 connects to a remote OLT 712. In some embodiments, the decomposition back into individual wavelengths many be performed by an Ethernet Switch as shown in FIG. 7. In some cases a muxponder or demultiplexer is alternatively employed. If the remote OLT 712 happens to reside in the same cabinet or chassis as the Ethernet switch, there could be an electrical interface from the switch to remote OLT 714 instead of fiber. In some embodiments, remote OLT 714 is located within virtual hub 718, but the remote OLT could be deeper in the access network to maintain the maximum 20 km distance between OLT and ONU. As with the case of traditional PON (e.g., FIG. 6), each remote OLT 714 can service 16 to 32 ONU at the premises of an end user 708.

Figure 8:
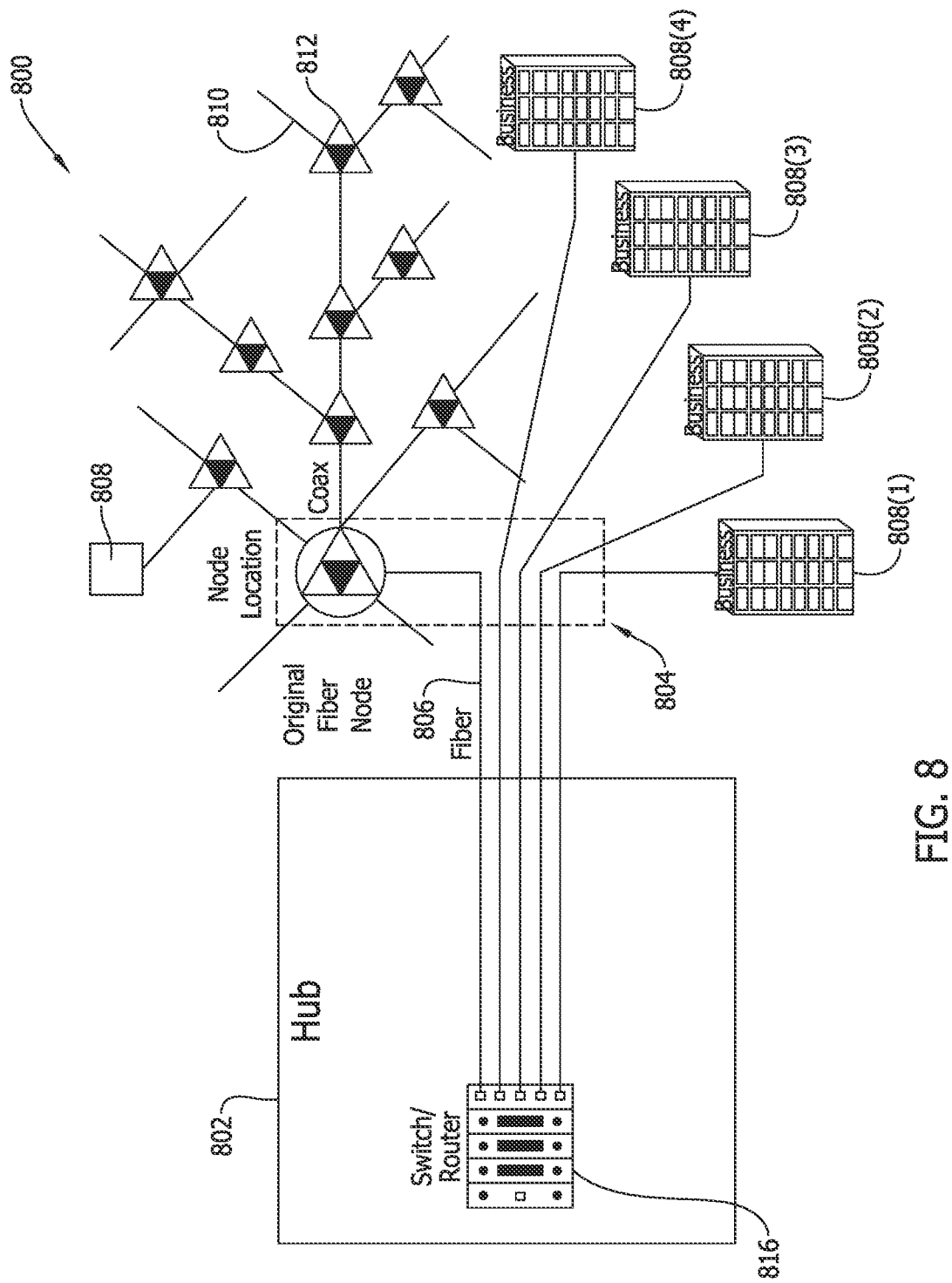
FIG. 8 is a schematic illustration of a network architecture.

FIG. 8 is a schematic illustration of a network architecture 800. Architecture 800 represents an Ethernet private line (EPL) architecture delivering P2P Ethernet over fiber, and is similar to, in some respects, architecture 200, FIG. 2, and includes a hub 802, a node 804, a transport medium 806, a plurality of end users 808, a plurality of short transport media 810, one or more amplifiers 812, and a router 816. As shown in FIG. 8, end users 808(1)-(4) are businesses and transport media 806 are directly communicatively coupled between hub 802 and end users 808(1)-(4).

As described above, HFC networks have been designed with a small number (6-8) of fiber strands dedicated to each node. These fibers may have been repurposed for business services, such as EPL or Ethernet Virtual Private Line (EVPL), while others may have been sold as dark fiber for the business that has total control of the fiber. In the Ethernet service illustrated in FIG. 8, hub 802 connects directly to the premise of one or more end users 808 (e.g., a business) over fiber 806 by using spare fibers or by repurposing and extending a fiber that was deployed to a node 804 as shown in FIG. 8.

Figure 9:
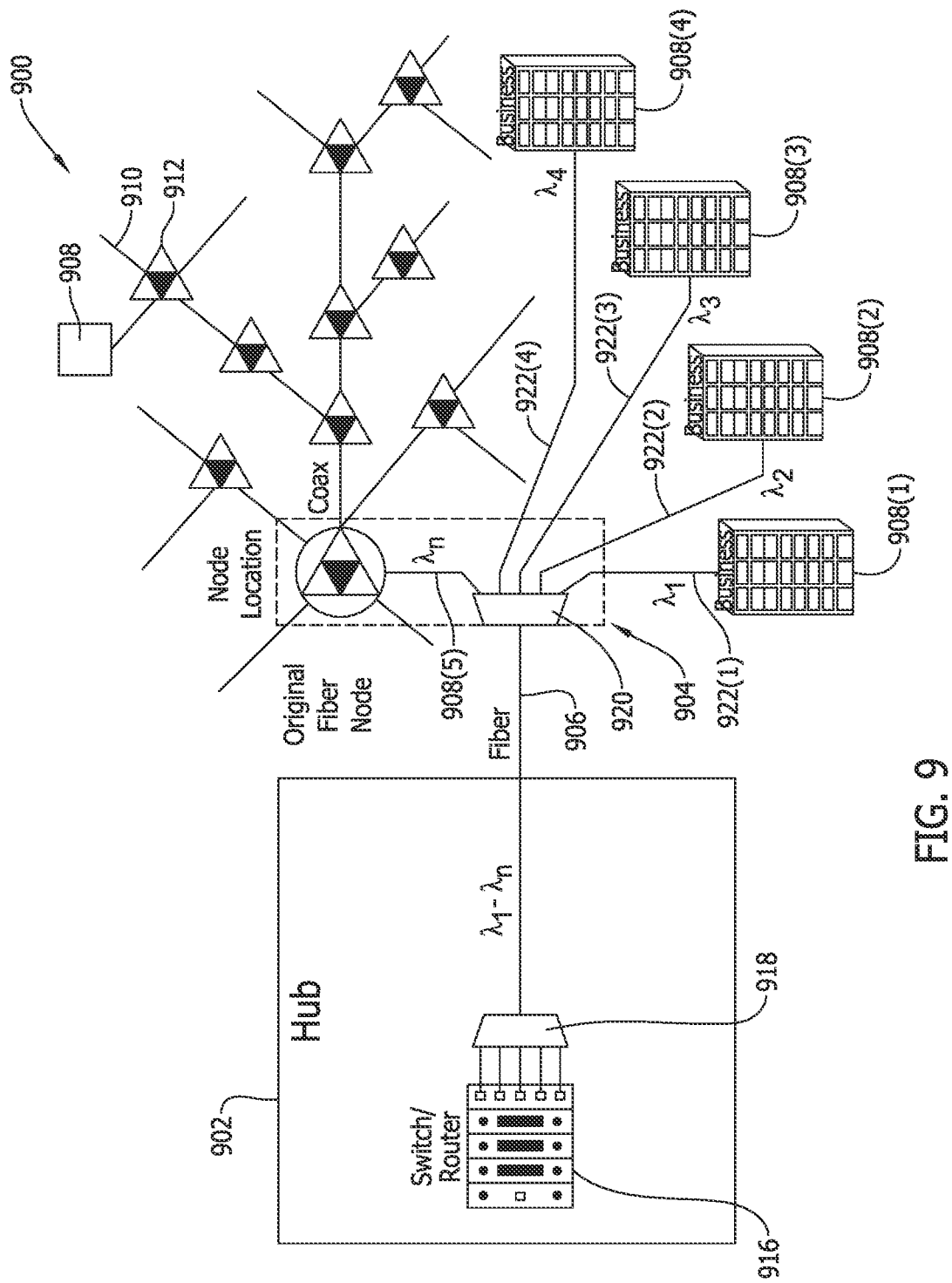
FIG. 9 is a schematic illustration of a network architecture.

FIG. 9 is a schematic illustration of a network architecture 900. Architecture 900 is an EPL architecture similar to architecture 800, FIG. 8, except that architecture 900 additionally features implementation of a multiplexer. More particularly, architecture 900 includes a hub 902, a node 904, a transport medium 906, a plurality of end users 908, a plurality of short transport media 910, a plurality of amplifiers 912, and a router 916. As illustrated in FIG. 9, end users 908 are depicted as businesses, and transport media 806 are connected directly to the premises thereof. Architecture 900 further includes a multiplexer 918 and a demultiplexer 920. Multiplexer 918 is connectively coupled to upstream to router 916 at hub 902 and connectively coupled downstream to transport medium 906. Demultiplexer 920 is connectively coupled to transport medium 906 at node 904 and downstream to end users 908 through a plurality of downstream fibers 922. In operation of architecture 900, demultiplexer 920 splits multiple wavelengths onto their own respective downstream fiber 922 and/or onto the same downstream fiber 922. Specifically, as shown in FIG. 9, downstream fibers 922(1)-(4) each receive their own wavelengths and are connected to end user/businesses 908(1)-(4). The remaining wavelengths travel through fiber 922(5) to node 904.

Where there is scarcity of fiber, an operator may use wavelength multiplexer 918 at HE/Hub 902 and demultiplexer 920 at the virtual hub (i.e., at node 904) to split the single fiber from the HE/Hub into multiple fibers that connect to businesses. This type of configuration represents a more cost-effective use of the fiber from HE/Hub to virtual hub than retrenching. However, non-coherent optical links, including those having very high capacity, use the wavelength spectrum thereof very inefficiently. Additionally, significant operational complexity is added by meeting to manage many wavelengths, which limits the capacity of the network as the demand increases. Complicating the problem further, the coexistence of non-coherent wavelengths with potentially different technologies (e.g., analog optics and EPON) on the same fiber will further limit the total number of wavelengths available to the non-coherent system, in order to avoid interfering with the coexisting wavelengths.

Figure 10:
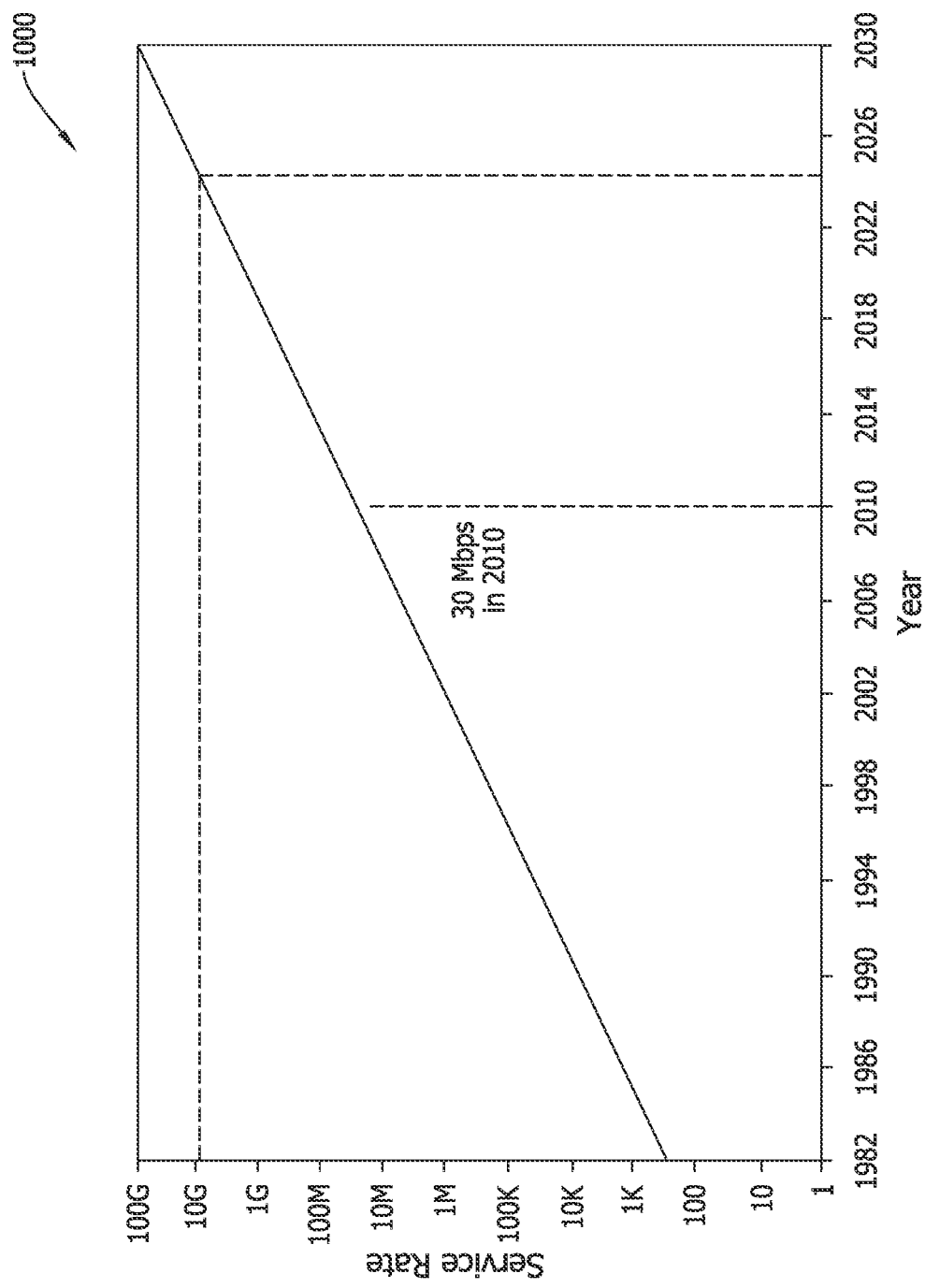
FIG. 10 is graphical illustration of a service bandwidth growth plot.

FIG. 10 is graphical illustration of a service bandwidth growth plot 1000. As illustrated in FIG. 10, service demand in the access network is steadily increasing, driven by a variety of factors. Operators perceive that the demand for additional service bandwidth to the user is caused by technology advances. As the demand for service bandwidth increases, the access network capacity needs to increase similarly.

As the Internet of Things (IoT) expands to more Internet-connected devices, such as Smart Homes or Smart Buildings, the IoT will drive the need for more bandwidth in the access network primarily from the very large number of devices that are deployed worldwide. However, there will be some devices, such as video doorbells and other video security devices that transmit to mobile or desktop devices that will only require large amounts of bandwidth periodically. Other industries, such as healthcare, will rely on the access network to make the IoT be reliable and responsive. As more medical devices connect to the Internet, these devices may need little bandwidth. However, the sheer number of such devices might consume the entirety of the access network capacity. Healthcare deployments will also require the Access network to have large bandwidth to exchange large data files across the Internet in near real-time for collaboration among healthcare providers in different locations.

Virtual Reality (VR) is also becoming more prevalent, especially in the mobile and gaming sectors, which will require large bandwidth to download the applications and environments. Eventually, it is expected that VR will become more interactive among two or more users that are sharing the experience together. Additionally, retail companies are pioneering into Augmented Reality (AR) to allow potential customers to experience a product before purchasing online. As VR and AR applications become more prevalent, it will drive the need for higher bandwidth in the Access network with low latency to make the experience feel realistic to users.

For television applications, the present trend is moving toward higher definition (e.g., Ultra HD of 4k or 8k) display, and for streaming over the Internet (IP TV). The combination of these two technologies will drive higher bandwidth and lower latency requirements onto the access network. In addition to receiving TV from the Cloud, more end users are relying on the Cloud as a storage for data, which can often be very large. There is also a move toward Fog Computing, as well as the processing of data on smart devices instead of in the Cloud. Sensors could send the data across the access network to the smart device for it to process, interpret, and display the data to the user on the smart device. The smart device in turn could summarize the data and send it to the Cloud for trending or long-term storage to free up space on the device itself.

As end users begin combining some of these technologies together, such as streaming Ultra HD VR from the Cloud, it will increasingly drive more need for bandwidth and low latency in the access network. The combined services will also enable new or expanding services for an operator, such as Small Cell and Base Station backhaul/fronthaul to deliver the needed bandwidth to the mobile end users. Finally, to compete with telecoms offering Fiber-to-the-Home (FTTH) and Fiber-to-the-Business (FTTB), cable operators are expanding their fiber reach as well. There is a natural evolution of the access network to lower the cost per bit and reduce operational complexity.

For these reasons and others, capacity demand in the access network will continue to increase, and cable operators will need cost effective means of doing so. As described above, cable operators are addressing this increasing demand by splitting nodes and pushing fiber deeper into the network, as well as deploying distributed architectures. However, with the limited fiber available between the HE/hub and existing fiber node locations, the current technology of choice—10 Gbps direct-detection combined with DWDM—is rapidly becoming cost-prohibitive, and provides a long term limit on network capacity. Trenching/retrenching new fiber is in even more expensive option, and therefore even less desirable. Accordingly, both embodiments provide significantly cost-effective solutions through the implementation of coherent optic technology into existing and future network architectures.

Coherent optics implements techniques for using the modulation and phase of light, as well as two different light polarizations, to transmit multiple bits per symbol over fiber transport media. There are several efficient modulation formats such as M-ary phase shift keying (QPSK, for example) and quadrature-amplitude-modulation (QAM). The coherent modulation formats have an in-phase (I) amplitude component and a quadrature phase (Q) amplitude component.

Figure 11:
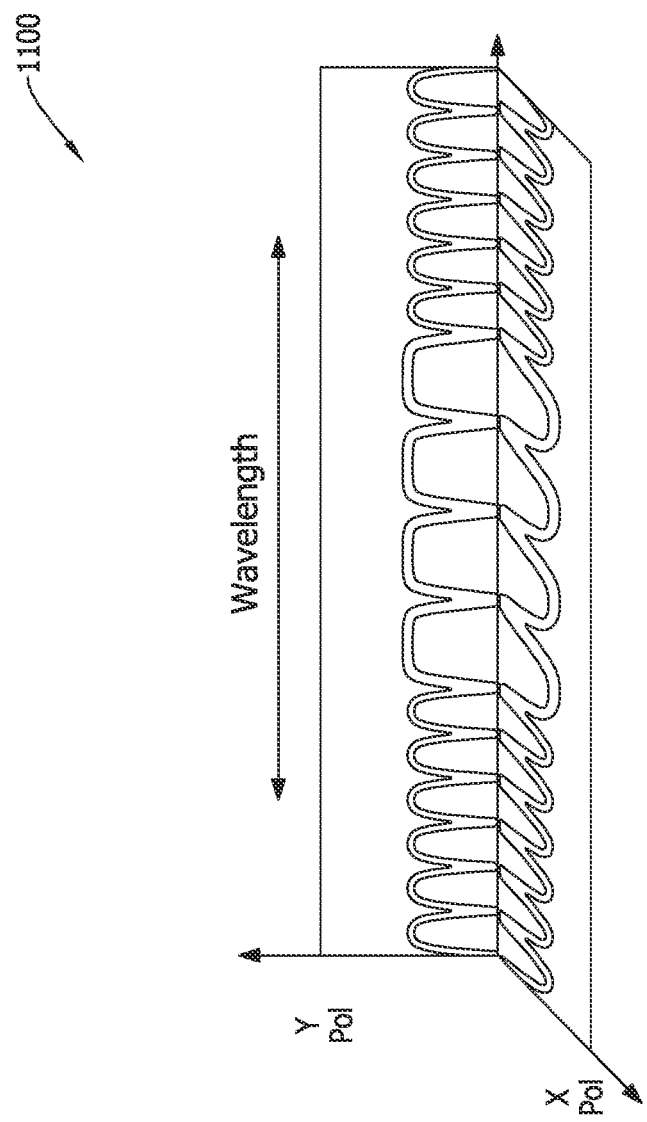
FIG. 11 is graphical illustration depicting a polarization multiplexing effect.

FIG. 11 is graphical illustration depicting a polarization multiplexing effect 1100. As shown in FIG. 11, a particular modulation format May be carried across two different polarizations that are orthogonal to one another, for example, linearly polarized signals represented as polarization X and polarization Y, thereby producing polarization multiplexing effect 1100.

A basic coherent optic link includes a transmitting end, a receiving end, and a transport medium/fiber therebetween. The coherent optic link is bidirectional, in that it may use the same wavelength for transmitting that it uses for receiving as long as the link is over two fibers. In this case, a coherent optic transceiver uses the same laser for transmitting as it does for receiving (e.g., a local oscillator, or LO). In the case of a single fiber, the Coherent Optic Link uses a different wavelength for sending than it does for receiving, so the Coherent Optic Transceiver needs 2 different lasers, one for each direction.

Figure 12:
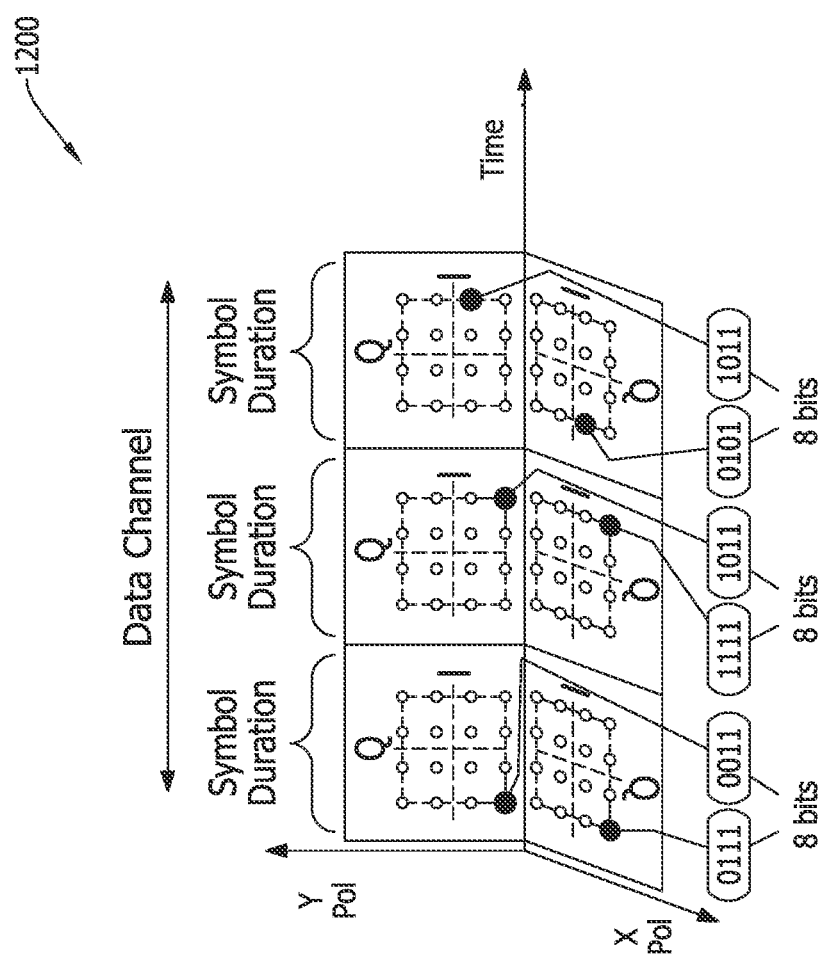
FIG. 12 is graphical illustration depicting a visualization of a data channel.

FIG. 12 is graphical illustration depicting a visualization 1200 of a data channel. In exemplary operation, the coherent optic transmitter receives data from its Host and maps the data into the symbol based on modulation format. If the transmitter uses polarization multiplexing (PM), it maps two consecutive constellations onto the two polarizations (I/Q-X, I/Q-Y), and then multiplexes the two polarizations. The transmitter may thus transmit two constellations simultaneously per time slice, thereby doubling the number of bits sent per symbol. The transmitter also controls the number of symbols it sends per second expressed as the symbol rate. The symbol rate relates to the bits/second the transmitter sends for each modulation format as determined by the number of bits per symbol and symbols per time slice. Accordingly, to increase the bit rate, the transmitter can either use a denser modulation format or it can increase the symbol rate.

For example, using 16-QAM modulation format with 4 bits per symbol and multiplexing the two polarizations at 32 G-symbols per second, a single wavelength can achieve 256 Gbps per channel. In another example, by using WDM configuration with eight wavelengths of each 256 Gbps, the raw bit rate across the fiber can reach 2048 Gbps (2.048 Tbps). Thus, each data channel contains two polarization tributaries. Each polarization contains In-Phase and Quadrature components. Each symbol has a defined duration determined by the symbol rate. The number of bits per time slice ranges from two bits (e.g., QPSK with single polarization) up to eight bits (16QAM with two polarizations). Visualization 1200 illustrates these relationships for a 16QAM modulation format having two polarizations.

In the case where PM is used, the coherent optics receiver separates the time slice into each polarization (I/Q-X, I/Q-Y), and then demodulates the received signal for each phase into the separate I and Q components using an LO. Once the receiver converts the analog signal to digital, the receiver may employ digital signal processing (DSP) and/or inexpensive filters to remove the signal distortions introduced along the path. Ultimately, the coherent optic receiver retrieves the data encoded in the symbol and passes that onto the Host.

Figure 13:
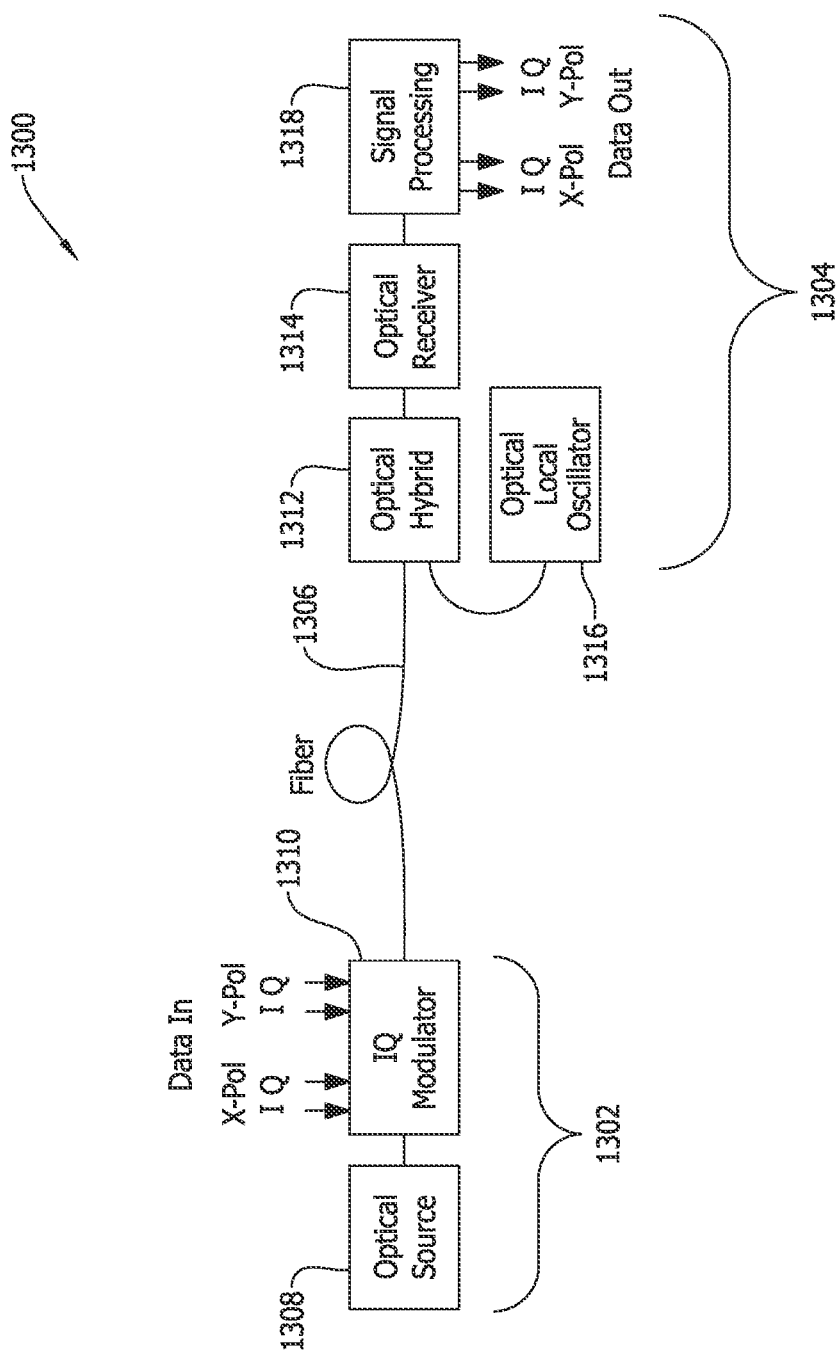
FIG. 13 is a schematic illustration of a coherent network architecture.

FIG. 13 is a schematic illustration of a coherent network architecture 1300. Architecture 1300 illustrates high-level functions of a coherent transmitter 1302 and a coherent receiver 1304. A transport medium 1306 (e.g., an optical fiber) is communicatively coupled between coherent transmitter 1302 and coherent receiver 1304. Coherent transmitter 1302 includes an optical source 1308 coupled to an UQ modulator 1310, which is directly or indirectly coupled with transport medium 1306. Coherent receiver 1304 includes an optical hybrid unit 1312, coupled to transport medium 1306, an optical receiver 1314, and an optical local oscillator 1316. Optical receiver 1314 is further be coupled to a signal processing module 1318.

In operation, coherent transmitter 1302 takes in data and maps the data into the modulation format using the four degrees of freedom (I, Q, X, Y) to create the time slice transmitted over medium/fiber 1306. Coherent receiver 1304 then detects the time slice and demodulates it to retrieve the data. Architecture 1300 is provided for illustrative purposes, and is not intended to be limiting. Architecture 1300 may include a number of additional components that are not depicted.

Conventional analog and non-coherent optical technology used in access networks are limited on how much bandwidth a single fiber can support (usually 10 Gbps or less per wavelength). To achieve greater bandwidth, more wavelengths and eventually more fiber strands are required. In many cases, retrenching as required to add the additional strands. The present embodiments illustrate how coherent optics technology and coherent optics P2P links may significantly increase the bandwidth delivered over the existing fiber, thereby avoiding the need for retrenching.

Most cable access networks between HE/hub and ODC/fiber node are less than 100 km with many less than 40 km. Therefore, the access network does not need some of the components needed for long-haul and metro coherent networks. These other coherent networks require amplifying the signal between transceivers and use more expensive components to deal with the distortion of the signal, such as chromatic dispersion (CD) and polarization mode dispersion (PMD), that worsen with distance. With shorter distances to fiber nodes that are in tens of kilometers, instead of hundreds or thousands of kilometers, P2P coherent optics for the access network is less complex than metro and long haul, so it can use less complex components, including less expensive DSPs. Less complex components consume lower optical power that results in lower heat dissipation for transmitting and receiving signals. With less complex components, implementations can use common components instead of proprietary components, which should lead to interoperability between vendors. Therefore, P2P coherent optics delivers a lower cost per bit in the access network than in the long-haul and metro networks, while leveraging similar technology.

The shorter distances of the present embodiments result in fewer signal distortions, especially when using unamplified links. For instance, there is almost no chromatic dispersion for distances less than 100 km, and what there is can easily be corrected for with a DSP or inexpensive filter. With less severe distortions, P2P coherent optics for access networks realizes a better signal-to-noise ratio (SNR), which allows for higher modulation orders than the other networks, which further leads to more efficient use of the fiber. The simpler design results in a more scalable network. For instance, the P2P coherent optics transceiver will be able to provide 100, 200, or even 400 Gbps per wavelength. Because of the higher spectral efficiency, P2P coherent optics in the access network provides increased bandwidth over the existing fiber infrastructure between the HE/hub and ODC/fiber nodes, which avoids the cost of retrenching. By using WDM, P2P coherent optics future-proofs the access network by supporting multiple 100-200 Gbps (or higher) wavelengths on a single fiber at a higher density than competing technologies. WDM also allows P2P coherent optics to coexist with analog, non-coherent, and PON technologies to enable a smooth transition for an operator.

The present systems and methods that introduce P2P coherent optics into the access network represent a progression of optical and electronics technologies that are moving to photonic integrated circuits (PIC) and complementary metal-oxide-semiconductor (CMOS) implementations that add more functionality to the transceiver component. Section P2P coherent optics use cases shows how P2P coherent optics can augment many of the proposed future P2P architectures to provide the most bandwidth at the lowest cost. Additionally, the present P2P coherent optics use cases may use muxponders instead of more expensive Ethernet switches at the ODC to lower costs even further. While other optical technologies are challenged to meet the full DOCSIS 3.1 capabilities (e.g., full duplex), the P2P coherent optics systems and methods described herein easily meet such requirements.

Figure 14:
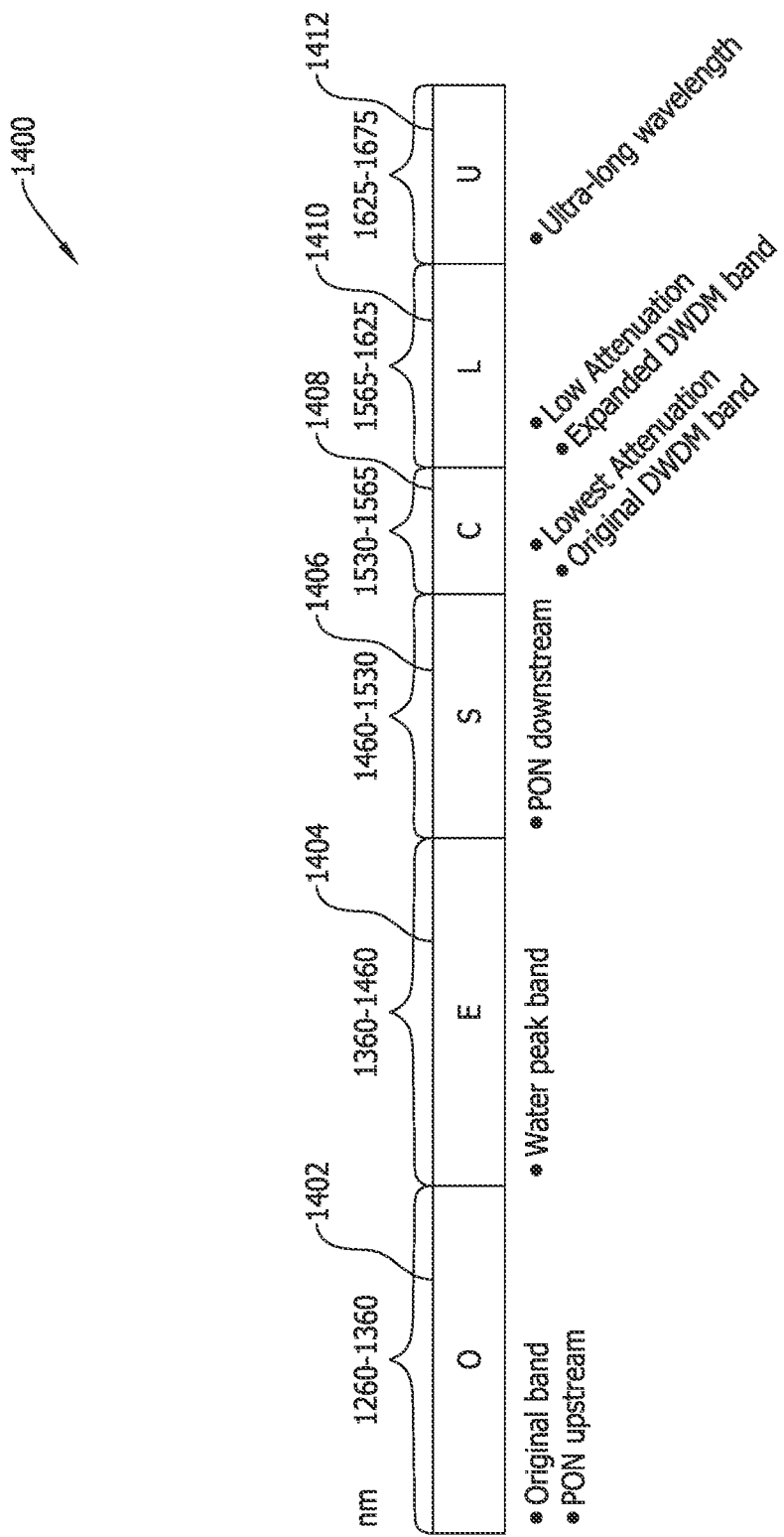
FIG. 14 depicts a spectral band diagram.

FIG. 14 depicts a spectral band diagram 1400. More particularly, diagram 1400 illustrates different spectral bands, including an original O band 1402, a water peak E band 1404, an S band 1406, a C band 1408, an L band 1410, and an ultra-long wavelength U band 1412. O band 1402 includes wavelengths from 1260 to 1360 nm, and represents a PON upstream band. E band 1404 includes wavelengths from 1360 to 1460 nm. S 1406 band includes wavelengths from 1460 to 1530 nm, and represents the PON downstream band. C band 1408 includes wavelengths from 1530 to 1565 nm, exhibits the lowest attenuation, and represents the original dense WDM (DWDM) band. L band 1410 includes wavelengths from 1565 to 1625 nm, has low attenuation, and represents an expanded DWDM band. U band 1412 includes wavelengths from 1625 to 1675 nm.

The P2P coherent optics solution targets C-band spectrum 1408. However, other services are already using parts of the C-band 1408, so not all wavelengths will be available to the P2P Coherent Optics solution when coexisting with other technologies on the same fiber. FIG. 14 shows a high level diagram of what wavelengths make up C-band 1408. For the initial deployment, operators would like to reuse existing WDM equipment that uses 100 GHz spacing between channels within C-band 1408. Although C-band 1408 is the initially targeted spectrum, it may be possible in the future to expand P2P coherent optics for the access network into part of the L-band 1410 to further increase the bandwidth a single fiber could support.

Accordingly, the systems and methods herein for deploying coherent optics in the access network enables increased bandwidth by reusing coherent optics technology developed for metro and long-haul networks. However, as described herein, because of the shorter distances supported, coherent optics for access network architectures provides a significantly less expensive and less complex option than for metro or long-haul networks.

The present embodiments illustrate two primary use cases for P2P coherent optics that operators may use to provide services: (1) an aggregation use case; and (2) an edge-to-edge (E2E) use case, where each P2P coherent optic link may be 100 Gbps or 200 Gbps. The aggregation use cases support both distributed CCAP (R-PHY) and R-PON architectures.

There are two primary aggregation configurations: (i) one for Remote PON; and (ii) another for distributed CCAP architectures. For either configuration, a host at the virtual hub/ODC will terminate the downstream P2P coherent optic link that originated at the HE/hub, such as by an Ethernet switch or muxponder.

Figure 15:
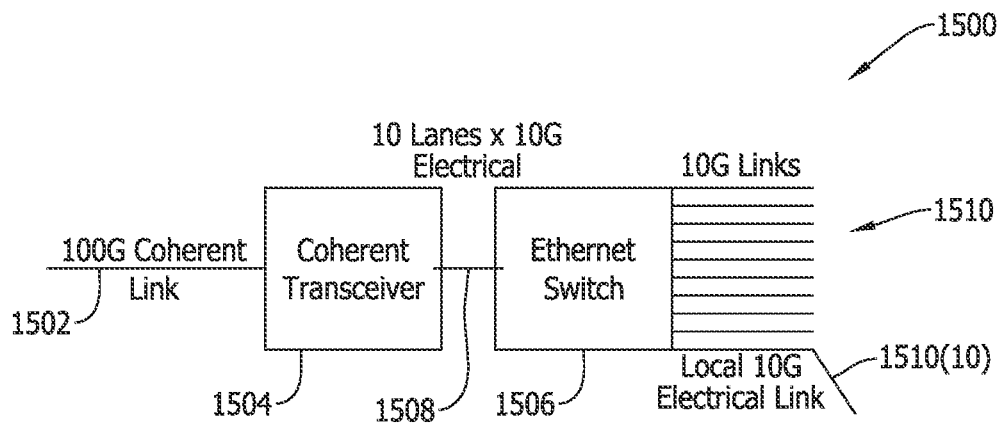
FIG. 15 is a schematic illustration of a coherent optics link subsystem.

FIG. 15 is a schematic illustration of a coherent optics link subsystem 1500. Subsystem 1500 represents a 100G P2P coherent optic link to Ethernet switches to 10G links. Subsystem 1500 includes a coherent link 1502 connectively coupled to a coherent transceiver 1504 and an Ethernet switch 1506 connectively coupled downstream of coherent transceiver 1504 by a transport medium 1508. Ethernet switch 1506 is further coupled to a plurality of links 1510. In the example illustrated in FIG. 15, Ethernet switch 1506 is coupled to ten links 1510. In operation of subsystem 1500, 100G coherent link 1502, coupled to coherent transceiver 1504, is then split into ten 10G links 1510 by Ethernet switch 1506. In this example, one of links 1510 is a local electrical link 1510(10).

Figure 16:
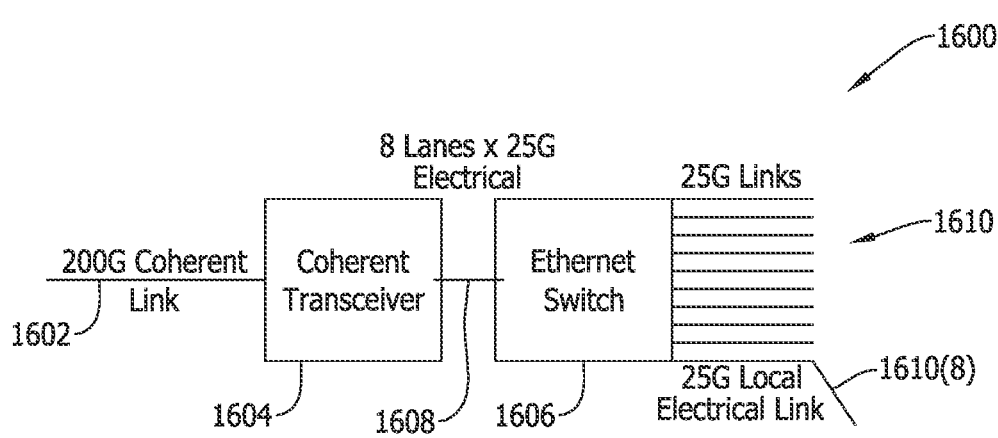
FIG. 16 is a schematic illustration of the coherent optics link subsystem.

FIG. 16 is a schematic illustration of the coherent optics link subsystem 1600. Subsystem 1600 is similar to subsystem 1500, FIG. 15, but represents a 200G P2P coherent optic link. Subsystem 1600 includes a coherent link 1602, a coherent transceiver 1604, a transport medium 1606, an Ethernet switch 1608, and links 1610. In this embodiment, Ethernet switch 1606 is coupled to eight individual links 1610. In operation of subsystem 1600, a 200G coherent link 1602, coupled to coherent transceiver 1604, is split into eight 25G links 1610 by Ethernet switch 1606. In this example, one of links 1608 is a local electrical link 1610(8).

Figure 17:
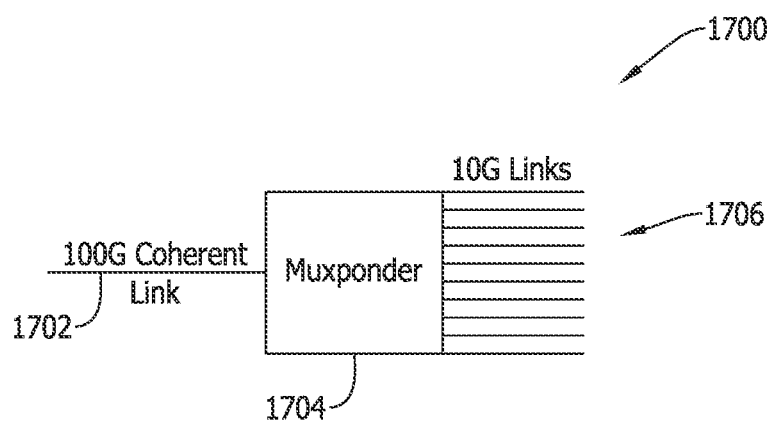
FIG. 17 is a schematic illustration of a coherent optics link subsystem.

FIG. 17 is a schematic illustration of a coherent optics link subsystem 1700. Subsystem 1700 represents a 100G P2P coherent optic link, and includes a coherent link 1702 communicatively coupled to a muxponder 1704. Muxponder 1704 is further coupled to a plurality of links 1706. In the embodiment illustrated in FIG. 17, muxponder 1704 is coupled to ten individual links 1706. In operation of subsystem 1700, 100G coherent link 1702 provides a coherent signal to muxponder 1704, and muxponder 1704 splits the received signal from coherent link 1702 into ten individual 10G links 1706.

Figure 18:
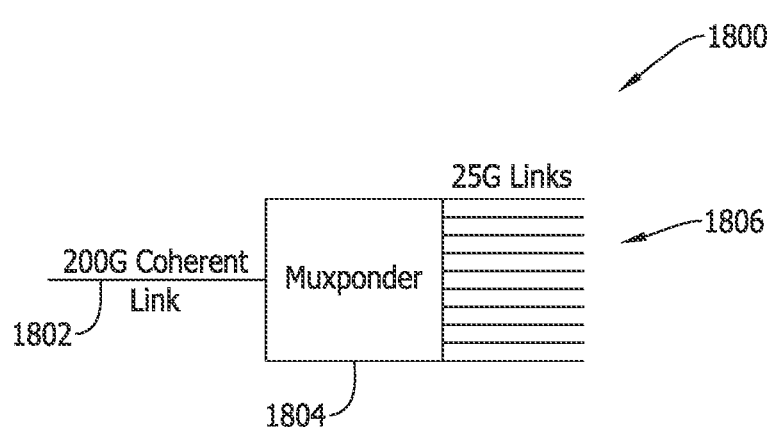
FIG. 18 is a schematic illustration of a coherent optics link subsystem.

FIG. 18 is a schematic illustration of a coherent optics link subsystem 1800. Subsystem 1800 represents a 200G P2P coherent optic link, and includes a coherent link 1802, a muxponder 1804, and links 1806. In operation of subsystem 1800, 200G coherent link 1802 provides a coherent signal to muxponder 1804 and muxponder 1804 splits the received signal from coherent link 1802 into eight individual 25G links 1806.

Accordingly, an Ethernet switch subsystem may support individual 10G (e.g., FIG. 15) or 25G (e.g., FIG. 16) outputs to optical links or electrical links for elements that are co-located with the Ethernet switch. The Ethernet switch may also be used to aggregate 10G links that exceed the capacity of the P2P coherent optic link, in the case where the 10G links may be underutilized. A muxponder subsystem similarly supports 10G (e.g., FIG. 17) or 25G (e.g., FIG. 18) output optical links. The muxponder 10G/25G output capacity is therefore equal to the capacity of the P2P coherent optic link. In the embodiments described above, the incoming P2P coherent optic link is 100 Gbps or 200 Gbps, but these links are provided for illustrative purposes, and not in a limiting sense. Future subsystems are contemplated that support 400 Gbps and greater.

For the first aggregation use case of R-PON, one or more OLT will exist at an aggregation point referred to herein as a "virtual hub." The Ethernet switch or muxponder will interface with the remote OLT that are usually co-located in the virtual hub. The P2P coherent optic link will go from the HE/hub device with a P2P coherent optic transmitter to the Ethernet switch or muxponder with a P2P coherent optic receiver. The Ethernet Switch or muxponder will terminate the P2P coherent optic link and perform an optical/electrical/optical process to convert the P2P coherent optic link into an Ethernet link.

Figure 19:
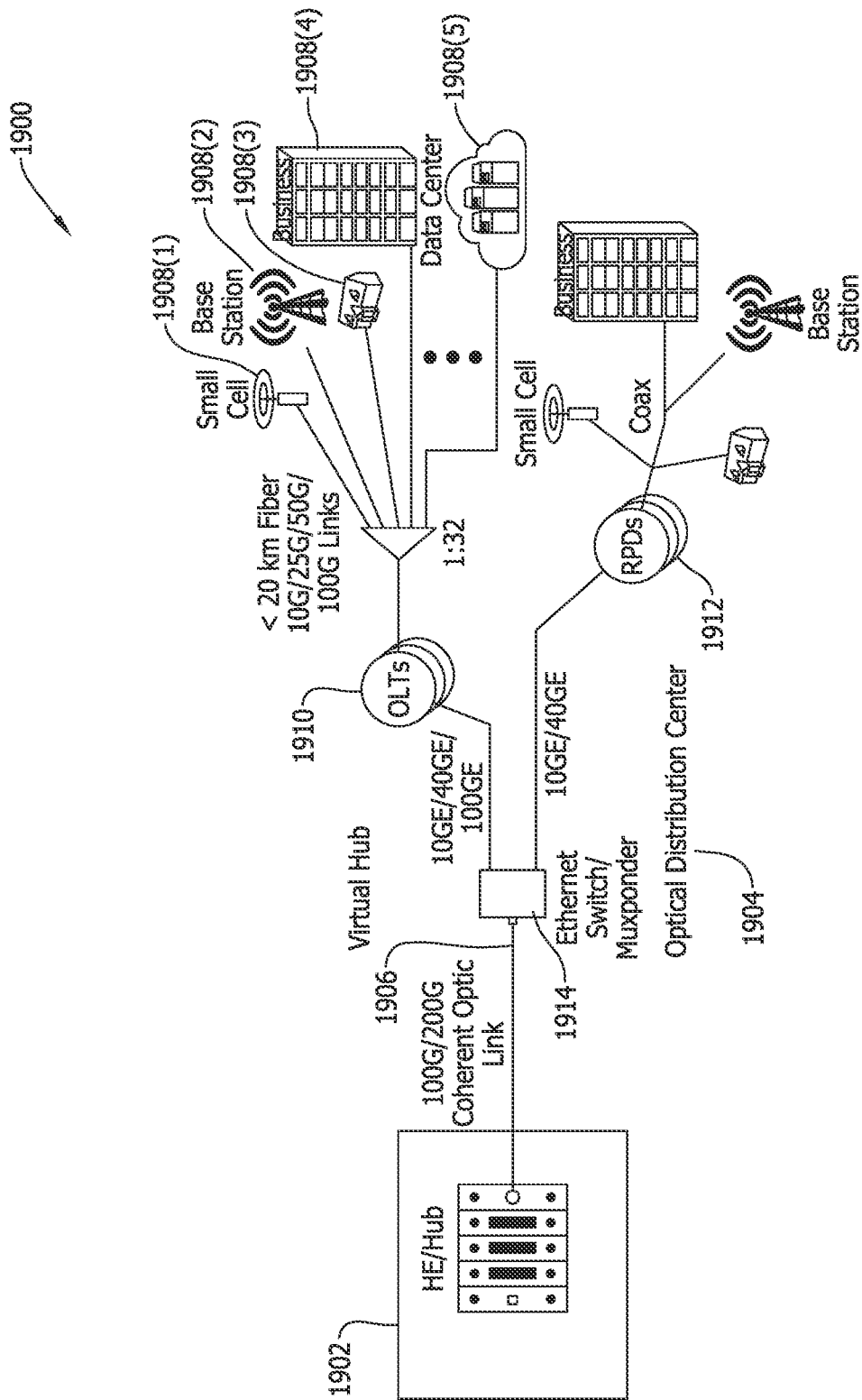
FIG. 19 is a schematic illustration of a network architecture 4A point-to-point coherent link.

FIG. 19 is a schematic illustration of a network architecture for a point-to-point coherent link 1900. Link 1900 represents an aggregation use case for a distributed CCAP architecture. Link 1900 includes a hub 1902, an ODC 1904, and a transport medium 1906 communicatively coupled therebetween. Transport medium may be a fiber, e.g., for a 100G or 200G coherent optic link. Link 1900 further includes a plurality of end users 1908 (e.g., a small cell 1908(1), a base station 1908(2), a consumer residence 1908(3), a business 1908(4), a data center 1908(5)). In this embodiment, ODC 1904 includes an Ethernet switch/muxponder 1910, which is coupled to a plurality of downstream fibers 1912.

Link 1900 further includes a plurality of OLTs 1914 and a plurality of RPDs 1916 coupled to downstream fiber 1912, downstream from Ethernet switch/muxponder 1910. In this example, OLTs 1914 are located at ODC 1904 and are configured to individually receive 10 Gb Ethernet (GE)/40 GE/100 GE optic links. OLTs 1914 are further coupled downstream to an optical splitter 1918, which splits the signals among end users 1908. In the embodiment illustrated in FIG. 19, optical splitter 1918 is a 1:32 splitter, and the fiber between optical splitter 1918 and end users 1908 is less than 20 km and is a 10G/25G/50G/100G link. Also in this example, the link from Ethernet switch/muxponder 1910 to RPD 1916 is a 10GE/40GE optic link. As illustrated in FIG. 19, link 1900 further forms a virtual hub 1918 that includes ODC 1904 and OLTs 1914.

The second aggregation use case for distributed CCAP uses the Ethernet switch or muxponder at the ODC to terminate the P2P coherent optic link from the HE/hub device. The Ethernet switch or muxponder converts the P2P coherent optic link into an Ethernet link to feed the RPD/RMD by performing an optical/electrical/optical process. The Ethernet link may transmitted at 10 Gbps, but may transmitted up to 40 Gbps. Other variations (not shown) to this use case are contemplated, for example, where an operator extends the P2P coherent optic link all the way to the RPD/RMD and performs the coherent-to-Ethernet conversion in the RPD/RMD.

Figure 20:
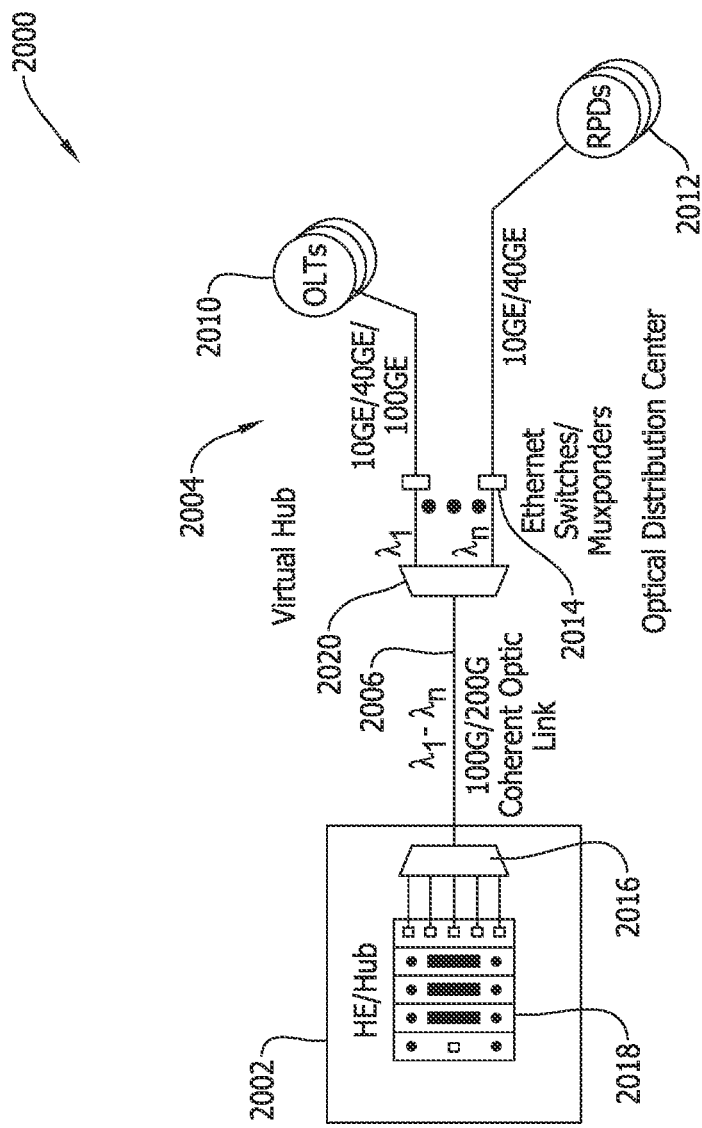
FIG. 20 is a schematic illustration of a coherent optics network architecture.

FIG. 20 is a schematic illustration of a coherent optics network architecture 2000. Architecture 2000 represents an example of an aggregation use case for distributed CCAP architecture, and is similar to link 1900, FIG. 19. That is, 2000 includes a hub 2002, an ODC 2004, a transport medium 2006, a plurality of OLTs 2010, a plurality of RPDs 2012, a plurality of Ethernet switches/muxponders 2014, a multiplexer 2016, servers 2018, and a demultiplexer 2020 communicatively coupled to transport medium 2006 at ODC 2004. In operation, multiplexer 2016 multiplexes two or more wavelengths onto transport medium 2006 and demultiplexer 2020 de-multiplexes the received two or more wavelengths onto discrete links before the signals travel to Ethernet switches/muxponders 2014.

For brownfield deployments, an operator can multiplex analog signals or other digital amplitude or pulse modulated wavelengths on the same fiber as the P2P coherent optic link enable a gradual migration to P2P coherent optic links. Additionally, for the aggregation configurations described herein, an operator can use wavelength multiplexing of multiple P2P coherent optic links to provide more bandwidth at the virtual hub/ODC. The wavelengths would be de-multiplexed prior being received by the Ethernet switch or muxponder.

Figure 21:
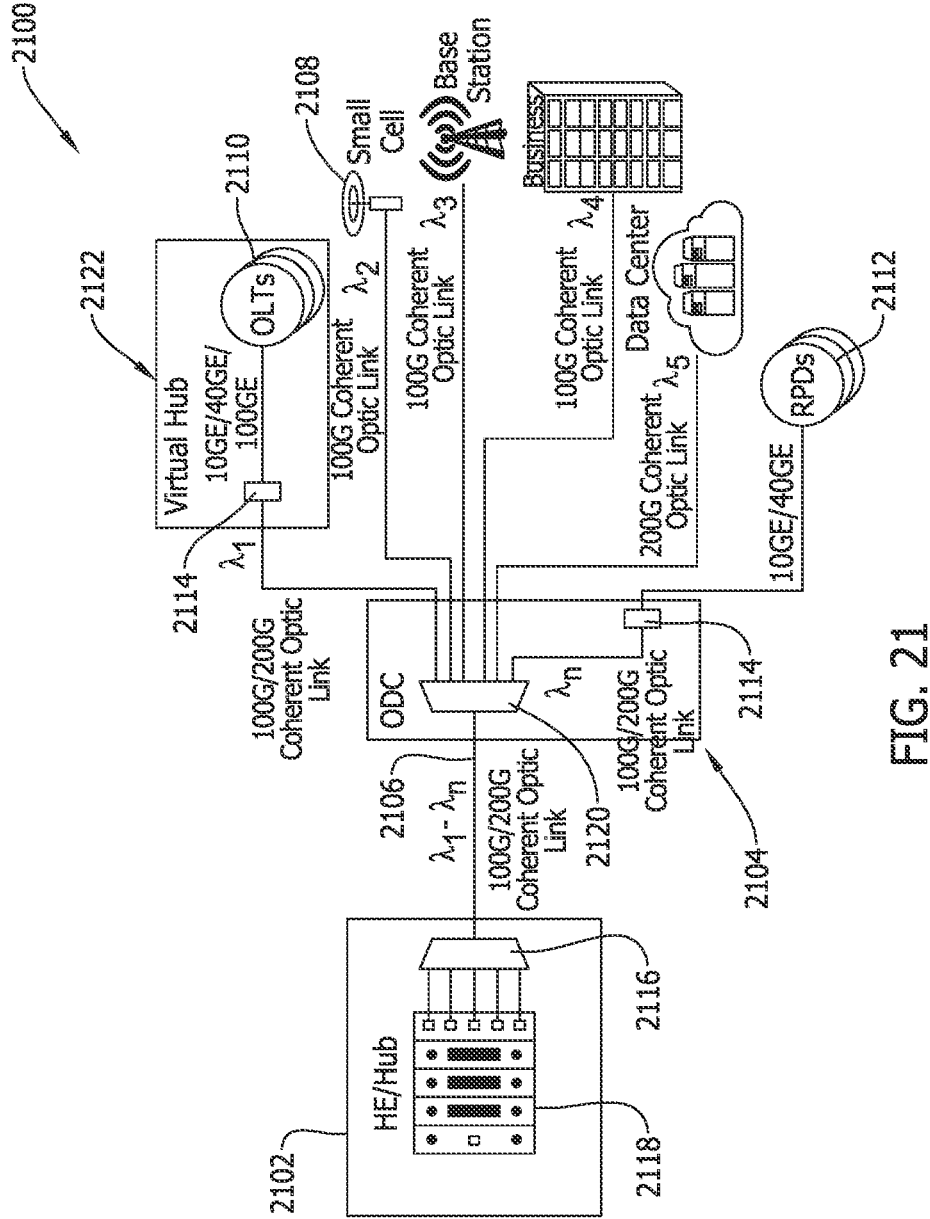
FIG. 21 is a schematic illustration of a coherent optics network architecture.

FIG. 21 is a schematic illustration of a coherent optics network architecture 2100. Architecture 2100 represents an example of an aggregation use case for distributed CCAP architecture, and is similar to, in some respects, architecture 2000, FIG. 20. Architecture 2100 includes a hub 2102, an ODC 2104, a transport medium 2106, a plurality of end users 2108, a plurality of OLTs 2110, a plurality of RPDs 2112, a plurality of Ethernet switches/muxponders 2114, a multiplexer 2116, servers 2118, a demultiplexer 2120, and a virtual hub 2122. In the embodiment illustrated in FIG. 21, OLTs 2110 and virtual hub 2122 are located outside of ODC 2104. Virtual hub 2122 includes a Ethernet switch/muxponder 2114 connectively coupled to ODC 2104 and OLTs 2114 by a downstream fiber, e.g. a 100G/200G coherent optic link and 10GE/40GE/100GE fiber. The demultiplexed links may then be connected directly to end users 2108 or OLTs 2110.

The second E2E use case employs a WDM at the HE/hub that combines multiple P2P coherent optic links onto a fiber. At the ODC, another WDM splits the P2P coherent wavelengths for individual transport each on its own fiber strand. The demultiplexed P2P coherent optic links may then connect directly to the endpoint. The P2P coherent optic links from the HE/hub may be a mix of 100 Gbps and 200 Gbps link rates. For this use case, the P2P coherent optic transceiver they reside in a device at the endpoint, therefore the P2P coherent optic link distance is from the HE/hub all the way to the endpoint. In some cases, the aggregation links may be mixed with the edge-to-edge links. However, such mixed configurations might not include analog or non-coherent wavelengths on the same fiber.

By varying the modulation format used and/or the symbol rate, P2P coherent optic transceiver should give an operator a configurable P2P coherent optic link of 100 Gbps, 200 Gbps, or 400 Gbps per wavelength. Initially, there could be a P2P coherent optic transceiver that only does 100 Gbps in order to get a solution to the operators quickly, eventually, there will also be a P2P coherent optic transceivers for 200 and 400 Gbps (note that there are a number of tradeoffs to consider to achieve the 400 Gbps that influence the acceptable solutions, such as using multiple wavelengths, using a higher order modulation format, increasing the symbol rate, etc. that could all affect the power needed by the P2P coherent optic transmitter and receiver and could limit the distance it could support).

By leveraging the available capacity in the C-Band through wavelength multiplexing, the number of wavelengths per fiber can increase to further grow the P2P coherent optic bandwidth without adding additional fiber. The goal is to make the solution flexible in the bandwidth available over the P2P coherent optic link to allow operators to deploy only what they require.

For the P2P coherent optic link, there will often be 2 fibers between the two P2P coherent optic transceivers, one for downstream/forward and one for upstream/return. However, an operator could deploy bidirectional links over a single fiber with optimized wavelength allocation and mitigation for backreflection, but there can be no inline amplification on the shared fiber. The amplification would need to occur directionally for downstream and upstream separately, before combining on the same fiber or after splitting from the same fiber. The P2P coherent optic transceivers will be paired such that the downstream/forward and upstream/return go to the same transceiver pair. However, bidirectional links will require a separate laser for the LO, because the downstream and upstream will be on different wavelengths. The P2P coherent optic transceivers generate a constant data rate in both directions, for example, 100 Gbps downstream/forward and 100 Gbps upstream/return.

The present P2P coherent optics implementations might further vary based on the length of the P2P coherent optic link. For example, the P2P coherent optic transceiver could require more power for the greater distances to increase the OSNR (optical signal to noise ratio) or it could require amplifiers or other components not needed for the shorter distances. The embodiments herein consider, by way of illustration and not in a limiting sense, three distance ranges: 0 km to 40 km; 40 km to 80 km; and 80 km to 120 km.

The present solutions optimize for distances of up to 40 km to capture greater than 80% of the use cases. In a base configuration, essentially any supported data rate may work without the addition of optical amplification. The solution for distances greater than 40 km might differ though, from the <40 km solution. There are a number of different tradeoffs that are contemplated within the present embodiments for distances>40 km that might drive up the cost of the solution and/or lower the overall bandwidth per fiber. Rather than trying to build one P2P coherent optic transceiver to support all the variations, the embodiments described herein illustrate optimization examples for up to 40 km and then, if that does not support the longer distances, look at how an operator could modify the optimized solution for the longer distances. Since the majority of cases (~88%) for most operators will be below the 40 km limit, the number of specialized solutions should be relatively small for most operators.

A P2P coherent optic transceiver in the HE/hub will be within an enclosure that is environmentally controlled, so it would be expected to operate within normal specifications for that type of environment. The P2P coherent optic transceiver in the field, however, may or may not be in a controlled environment. The remote P2P coherent optic transceiver could exist on a pedestal, pole, or other enclosure that is exposed to the weather and temperature changes. Therefore, the environmental requirements will vary drastically depending on where a P2P coherent optic transceiver is deployed. These temperatures may range from as low as −40 C to as high as +85 C. It may not be feasible for a single P2P coherent optic transceiver to support all conditions. However, the goal is to have an interoperable version of the P2P coherent optic transceiver that works in the majority (80%-90%) of the deployment environments.

The present P2P coherent optic transceiver are configured to work with the power available at the current fiber node location, sharing it with any other devices that may be present. Therefore, operators would like to target 10 W to 20 W for the P2P coherent optic transceiver, including the optics and DSP power requirements.

Figure 22:
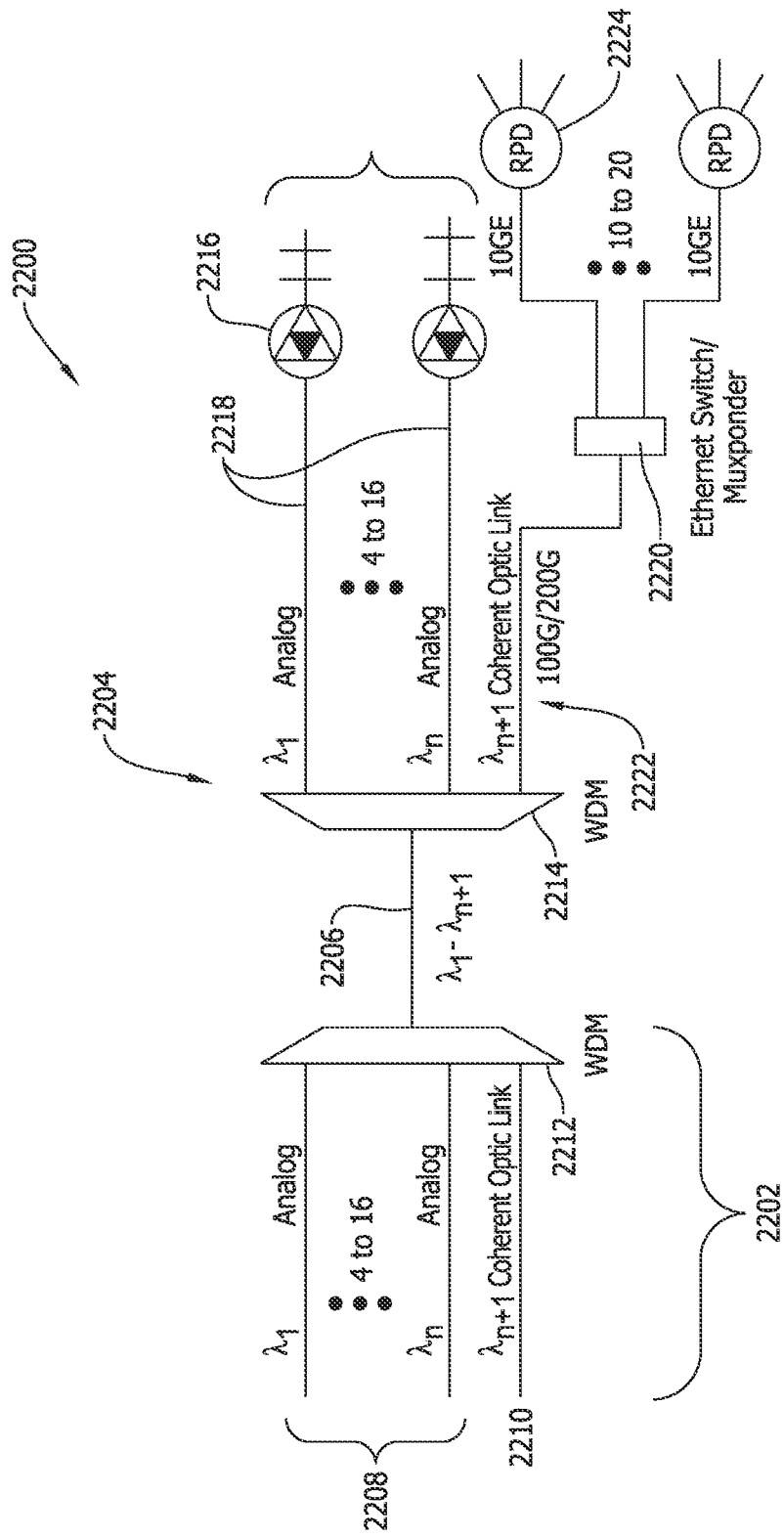
FIG. 22 is a schematic illustration of a migrated coherent optics network architecture.

FIG. 22 is a schematic illustration of a migrated coherent optics network architecture 2200. Architecture 2200 illustrates a case of a centralized network architecture coexisting with a P2P coherent optic architecture. Architecture 2200 includes a hub 2202, a node 2204 and a transport medium 2206 communicatively coupled therebetween. Hub 2202 includes a plurality of analog fibers 2208, a coherent optic link 2210, and a multiplexer 2212. Analog fibers 2208 and coherent optic link 2210 are communicatively coupled to multiplexer 2212. Node 2204 includes a demultiplexer 2214 that is communicatively coupled to a plurality of nodes 2216 through a plurality of analog fibers 2218. Demultiplexer is further communicatively coupled to an Ethernet switch/muxponder 2220 through a coherent optic link 2222. Coherent optic link 2222 is a 100G/200G link. A plurality of RPDs 2224 is communicatively coupled to Ethernet switch/muxponder 2220 downstream of Ethernet switch/muxponder 2220.

Where operators want to migrate from a current architecture to a P2P coherent optic architecture, there could be a time when P2P coherent optic links coexist with other intensity or phase modulated digital links, or an analog signal on the same fiber using different wavelengths. Where available, an operator can use separate fiber for each solution, and then move services off the old architecture onto the P2P coherent optic architecture in a controlled fashion. For an operator who does not have spare fibers available, using wavelength multiplexing and demultiplexing will allow a smooth transition.

Since many operators may already be using wavelength multiplexing for existing services, adding a P2P coherent optic link could be trivial. However, the P2P coherent optic link would need to match the spacing supported by the wavelength multiplexer. Additionally, operators would need to do wavelength management to ensure there is no interference between the channels they assign. Since operators should already be doing this for the existing multiplexed wavelengths, adding the P2P coherent optic link into the mix should not be an issue. Another consideration is that the existing analog optical amplifiers may not work for the P2P coherent optic link, so operators would need to design for that situation.

Figure 23:
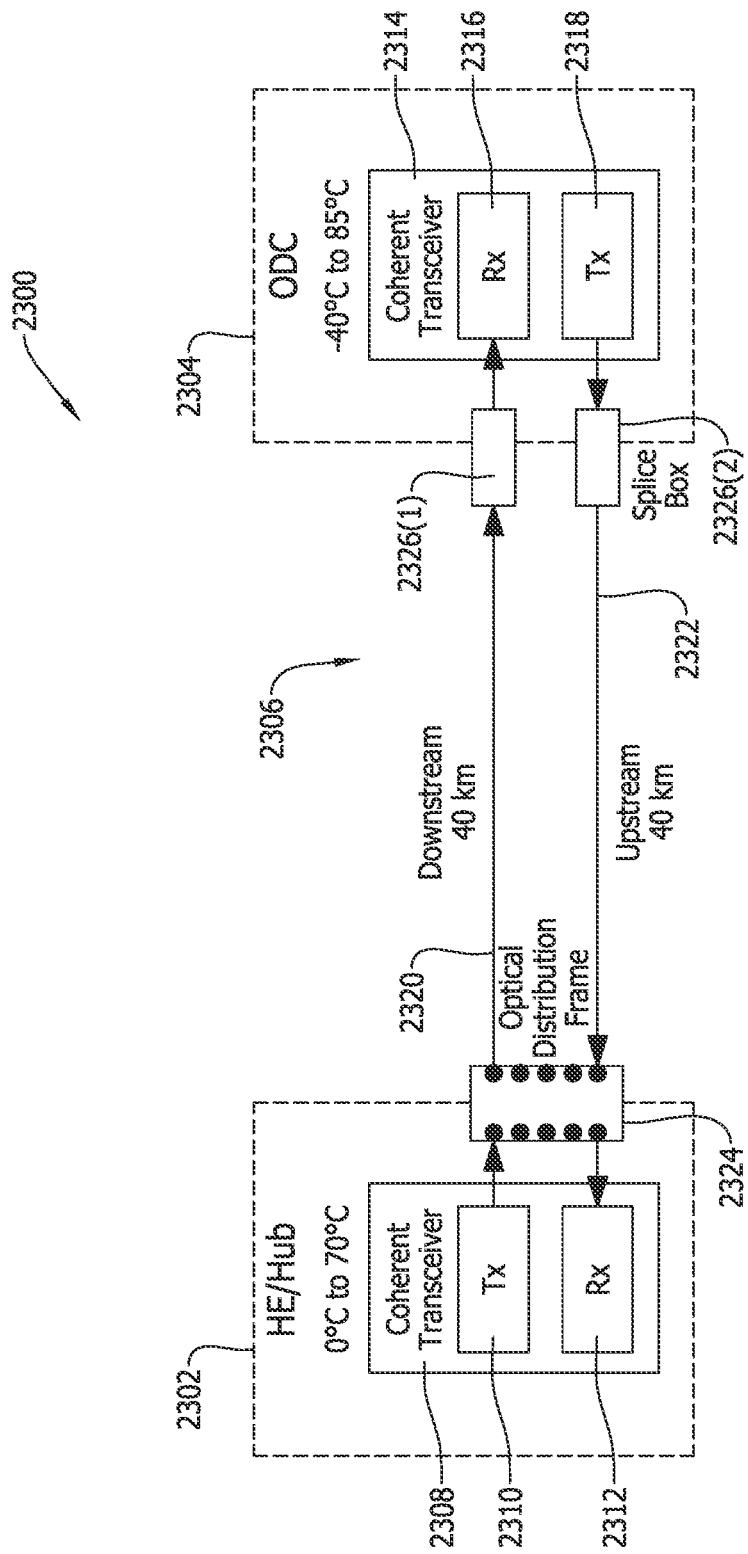
FIG. 23 is a schematic illustration of a coherent optics network architecture.

Many operators will be moving in the near future from analog to P2P coherent optics. During this transition, the operator could add a new wavelength for the P2P coherent optic link and multiplex it with the analog wavelengths as shown in FIG. 23. More than likely, the operator will be moving one analog wavelength at a time to the p2p coherent optic link. One option is to use one of the analog wavelengths for the P2P coherent optic link. This would be a flash cut of that one wavelength, so the operator would need to coordinate the cut over with the remote device. A more conservative approach is to add a new wavelength to the fiber for the P2P coherent optic link with a P2P coherent optic transceiver in the HE/hub and the ODC/virtual hub (or other location for the termination point of the P2P coherent optic link). Once the operator is comfortable with the P2P coherent optic link, the operator could then cut over the traffic on one of the analog wavelengths to the P2P coherent optic link by converting the fiber node from analog to Remote PHY, for example. If the operator experiences any issues with the traffic on the P2P coherent optic link, the operator can switch the traffic back to the analog wavelength with minimal impact.

The fiber optic strands used for P2P coherent optic links could coexist with other intensity or phase modulated digital links, or an analog signal on the same fiber using different wavelengths as is shown by FIG. 23. This means that P2P coherent optic links should avoid using certain wavelengths normally used by these other sources. An operator could use the remaining wavelengths for other P2P coherent optic links. The present P2P coherent optic link embodiments are also configured to manage the power budget. To support the longer distances, operators may apply more power at the P2P coherent optic transmitter or add an optical amplifier to increase the power of the P2P coherent optic link. However, when applying more power on the P2P coherent optic link, the more likely it could interfere with a neighboring wavelength. Therefore, an operator may need to manage the power budget associated with distance needed and adjust the wavelength spacing and frequencies used to avoid inter-channel interference. Over time, the anticipation is that all P2P wavelengths will transition to P2P coherent optic links. However, until such time, operators will need to manage how they add P2P coherent optic links onto a fiber. Initially, a small set of wavelengths using fixed lasers may be used, or a small set of wavelengths using a limited tunable laser of 4-8 channels. Operators can influence the decision based on the current set of wavelengths they are using in their networks.

To support the longer distances, operators may apply more power at the P2P Coherent Optic Transmitter or add an optical amplifier to increase the power of the P2P Coherent Optic Link. However, when applying more power on the P2P Coherent Optic Link, the more likely it could interfere with a neighboring wavelength. Since the output power of the analog links will be higher than the P2P Coherent Optic Link, it is more likely that the analog signal will interfere with the P2P Coherent Optic Link than vice versa. Therefore, when mixing the P2P Coherent Optic Link with analog signals, the operator must find a wavelength for the P2P Coherent Optic Link with which the analog wavelength channels will not interfere. With each conversion of an analog signal to the P2P Coherent Optic Link, the chance for interference will decrease.

More than likely, each analog wavelength went to a different Fiber Node, either co-located or in different locations (Fiber Deep Nodes) by demultiplexing at the Fiber Node location. However, for P2P Coherent Optic Link, the signal would go through an Ethernet Switch or Muxponder to convert the P2P Coherent Optic signal into an Ethernet signal. Since a Fiber Node only works with analog signals, the operator will need to convert from a Centralized CCAP to a Distributed CCAP (Remote MAC/PHY) that requires an Ethernet signal.

In other cases, the operator may be converting multiple PON Links to a P2P Coherent Optic Link. The operator can use the same approach as described for the analog conversion. The operator would add a new wavelength for the P2P Coherent Optic Link and then migrate each PON Link to it. At the Original Fiber Node location, the operator would demultiplex the P2P Coherent Optic Link into the targeted PON Links by converting the P2P Coherent Optic signal into an Ethernet signal that would go to a Remote OLT for each PON Link.

Once everything converts to a single P2P Coherent Optic Link between the HE/Hub and ODC/Virtual Hub, there is not a need for the WDM. However, if the operator plans to add more P2P Coherent Optic Links in the future, it may make sense to leave the WDM. Additionally, the operator could remain in the hybrid mode indefinitely, if some of the existing Analog and PON wavelengths are adequate for the traffic they are carrying.

The P2P Coherent Optic Transceiver could use tunable lasers or fixed lasers. To optimize the P2P Coherent Optic Transceiver for cost, a set of fixed lasers may be the most cost effective. There is also the option of using tunable lasers that only support 4 to 8 wavelengths that could also be cost competitive, but could increase the power required. Managing fixed lasers over the entire Coherent range could become cumbersome, and could make tunable lasers over the entire range attractive. However, for initial implementations that use the defined default P2P Coherent Optic Link(s), a fixed laser seems reasonable. As operators need to add P2P Coherent Optic Links, the 4 to 8 wavelength tunable lasers could make sense. By the time an operator exceeds the maximum number of tunable wavelengths, there may be cost effective alternatives. To combine the P2P Coherent Optic Links with other intensity or phase modulated digital links, or an analog signal, it may require a retrofit of the optical filters for these other links to screen out the P2P Coherent Optic Links.

While some high level goals were stated regarding the distances that a P2P Coherent Optics Link will need to support, in the end what determines distance will be the link budget: how much loss the system can tolerate, vs. how much loss is actually present. Due to the great variety of different network configurations that are possible, this number can vary widely. This section looks at some examples to provide an idea of the types of scenarios in which a P2P Coherent Optics Link could be used and be expected to operate. Loss can occur within the fiber as well as traversing each component in the path. There are a number of variables that affect the loss budget: (i) the fiber itself will have Attenuation Loss (including splices, temperature, etc.); (ii) WDM Loss; (iii) Bidirectional Band Splitter Loss (including connectors); (vi) Optical Failover Switch/Optical Splitter Loss; (v) added Safety Margin for other unaccounted for things that could occur between the transmitter and receiver.

The link loss may be calculated by the following equation:

Link Loss=[fiber length (km)×0.25 dB/km of fiber attenuation]+[1 dB×number of optical distribution frame]+[5 dB×number of WNM]+[2 dB×number of Bidirectional band splitters]+[2 dB×number of failover switches]+[4 dB×number of optical splitters]+[2 dB of margin]

Increasing the transmit power into the fiber can overcome some loss, but at the expense of needing more consumed power at the HE/Hub and/or ODC. Inline optical amplifiers can help to overcome the amount of loss by amplifying the power, but also amplify the noise. The receiver sensitivity must overcome the potentially weak signal received and the potentially large amount of noise (measured as OSNR) in order for the solution to work.

The amount of currently deployed redundancy varies by operator. Some have nearly 100% redundancy, while others have nearly 0% redundancy. However, with the increased bandwidth offered by Coherent Optics, redundancy could increase. Additional complexity occurs when the operator wants to use a bidirectional fiber (one wavelength for Downstream and another for Upstream on the same fiber) for both the working and protect paths. Another wrinkle comes when the protect path may be longer than the working path. In some cases, amplifying both paths is sufficient, however, amplifiers are directional, so the examples show one way to amplify the receive and transmit paths independently. All this complexity can add to the link loss that the transmitter and receiver must overcome. Since operators are doing this today for analog links, the coherent link should work, because a coherent receiver has higher sensitivity than the analog receivers. To try to verify this assumption, the following sections calculated what the potential link loss would be for each example architecture. The examples are not exhaustive, but examine some variations that are likely to be close to what operators would deploy to see where the P2P Coherent Optic Transmitter would work without amplification and where it wouldn't work without additional amplification. The goal being to verify that if an existing analog link didn't require amplification that the P2P Coherent Optic Link would not require amplification either.

The example Link Budget Calculation tables in the following sections use two different transmitter technologies—Tx A and Tx B—which results in different launch power into the fiber. The numbers for the transmit power and receiver sensitivity were taken from a vendor survey, so they are not based on a specific vendor. The following modulation formats were used to calculate the link loss: 100G: DP-QPSK at 28 GBaud with HD FEC; 200G: DP-QPSK at 64 GBaud with SD FEC; 200G: DP-8QAM at 42 GBaud with SD FEC; 200G: DP-16QAM at 32 GBaud with SD FEC.

FIG. 23 is a schematic illustration of a coherent optics network architecture 2300. Architecture 2300 is a 40 km dual fiber single channel architecture. Architecture 2300 includes a hub 2302, a node 2304, and a transport medium 2306 communicatively coupled therebetween. Hub 2302 includes a hub coherent transceiver 2308, having a downstream transmitting portion 2310 and an upstream receiving portion 2312. As shown in FIG. 23, node 2304 is depicted as an optical distribution center ("OCD") and includes a node coherent transceiver 2314, having a downstream receiving portion 2316 and an upstream transmitting portion 2318.

As shown in FIG. 23, transport medium 2306, includes a downstream transport medium 2320, configured to transport signals downstream, and an upstream transport medium 2322, configured to transport signals upstream. Transport medium 2306 is about 40 km in length.

Architecture 2300 further includes an optical distribution frame 2324 and a plurality of splice boxes 2326. Optical distribution frame 2320 is coupled near hub 2302 and, in operation, is used for receiving/transmitting the respective signals from/to node 2304. Splice box 2326 is coupled near node 2304 and is depicted as two separate splice boxes 2326(1) and 2326(2), namely splice box 2326(1) in the downstream lane of downstream transport medium 2320 and splice box 2326(2) in the upstream lane of second upstream transport medium 2322. In operation, splice boxes 2326 are used for transmitting/receiving the respective signals to/from node 2304.

Architecture 2300 is the simplest architecture for P2P coherent optic link. In this example, the P2P coherent optic link uses two fibers 2320, 2322 between hub 2302 and ODC 2304. The two fibers 2320, 2322 require a pair of P2P coherent optic transceivers 2308, 2314 to support the bi-directional traffic. From an operator survey, nearly 40% of the deployed optical links are dual fiber single channel.

Table 1 calculates an example link budget for 40 km dual fiber single channel link with one fiber for downstream and one fiber for upstream, in accordance with an embodiment of architecture 2300. The link loss is the same for both downstream and upstream under normal conditions, but the link budget could have 1-2 dB more loss for outdoor temperature extremes. As Table 1 shows, both P2P coherent optic transmitters function at a variety of the modulation formats. This is expected, since this is one of the simplest architectures operators could deploy.

TABLE 1

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| Optical Distribution Frame | 1 | | | | | | | | |
| Optical System Plant | | | | | | | | | |
| Fiber Attenuation 40 km 0.25 dB/km | 10 | | | | | | | | |
| Total Link | 11 | | | | | | | | |
| Margin | 2 | | | | | | | | |
| Calculated Rx Input | | −19 | −21 | −22 | −21 | −13 | −13 | −14 | −15 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Link Supported? | | Yes | Yes | Yes | Yes | Yes | Yes | Yes | Yes |

Figure 24:
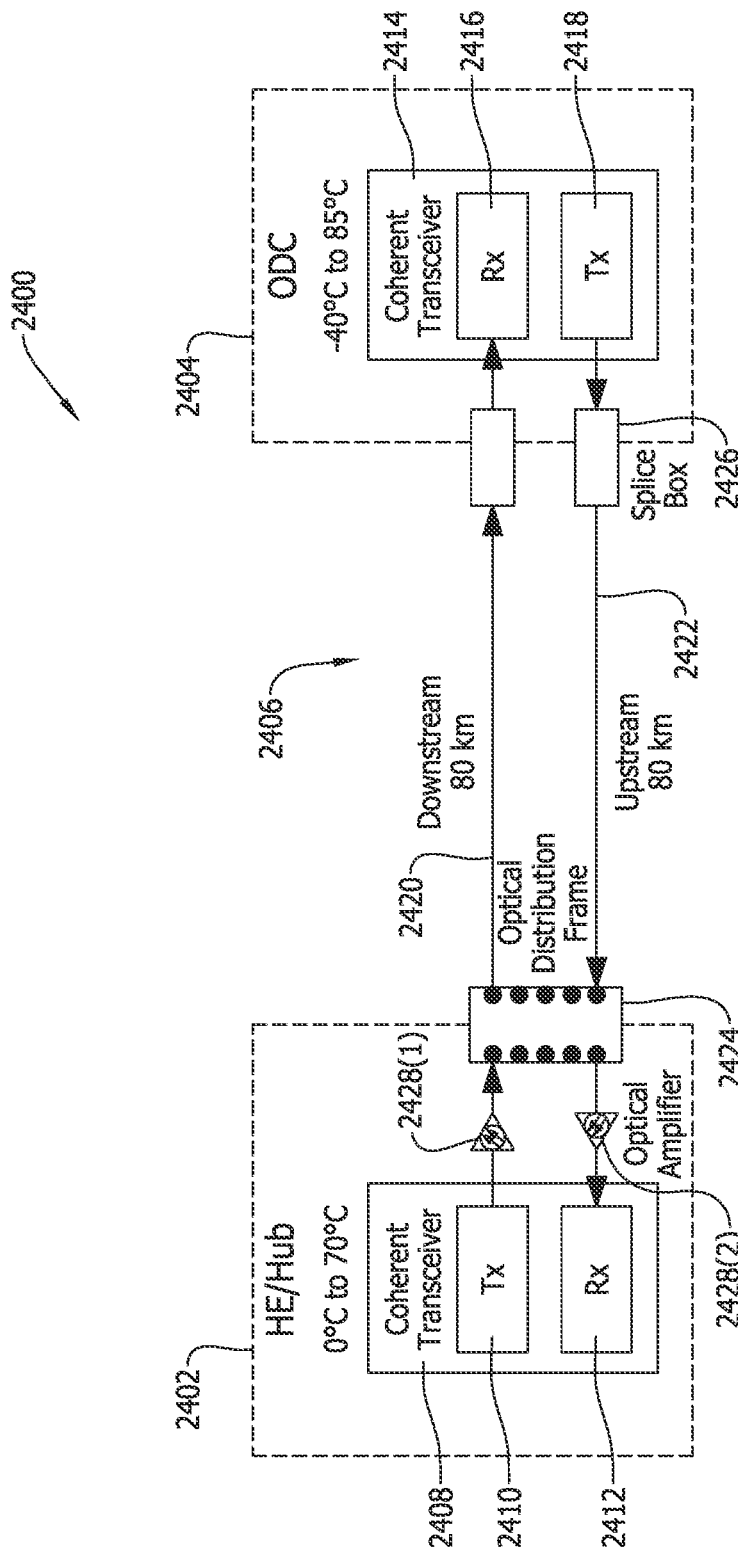
FIG. 24 is a schematic illustration of a coherent optics network architecture.

FIG. 24 is a schematic illustration of a coherent optics network architecture 2400. Architecture 2400 is an 80 km dual fiber single channel with amplifiers architecture, and is similar to, in some respects, architecture 2300 (FIG. 23). Architecture 2400 includes a hub 2402; a node 2404; a transport medium 2406; a hub coherent transceiver 2408, having a downstream transmitting portion 2410 and an upstream receiving portion 2412; a coherent transceiver 2414, having a downstream receiving portion 2416 and an upstream transmitting portion 2418; a downstream transport medium 2420; an upstream transport medium 2422; an optical distribution frame 2424; and a plurality of splice boxes 2426.

Different from the configuration in FIG. 23, in architecture 2400, transport medium 2406 is about 80 km in length while transport medium 2306 is about 80 km in length. Also different from the configuration in FIG. 23, architecture 2400 includes a plurality of optical amplifiers 2428. Optical amplifiers 2428 are coupled to hub 2402, and in FIG. 24, optical amplifiers 2428 are depicted as two separate optical amplifiers, with amplifier 2428(1) communicatively coupled between downstream transmission portion 2410 and optical distribution frame 2424 and amplifier 2428(2) communicatively coupled between optical distribution frame 2424 and upstream receiving portion 2412. In operation, optical amplifiers 2428 provide a boost for downstream signals and are used for reapplication for upstream signals. Optical amplifiers 2828 are depicted in this example as having two separate amplifiers 2828 on the downstream and upstream lines. Nevertheless, one of ordinary skill in the art will understand that this depiction is provided for illustration purposes and not in a limiting sense. That is, in some cases, a signal optical amplifier may perform functions on both the upstream and downstream signals.

Figure 26:
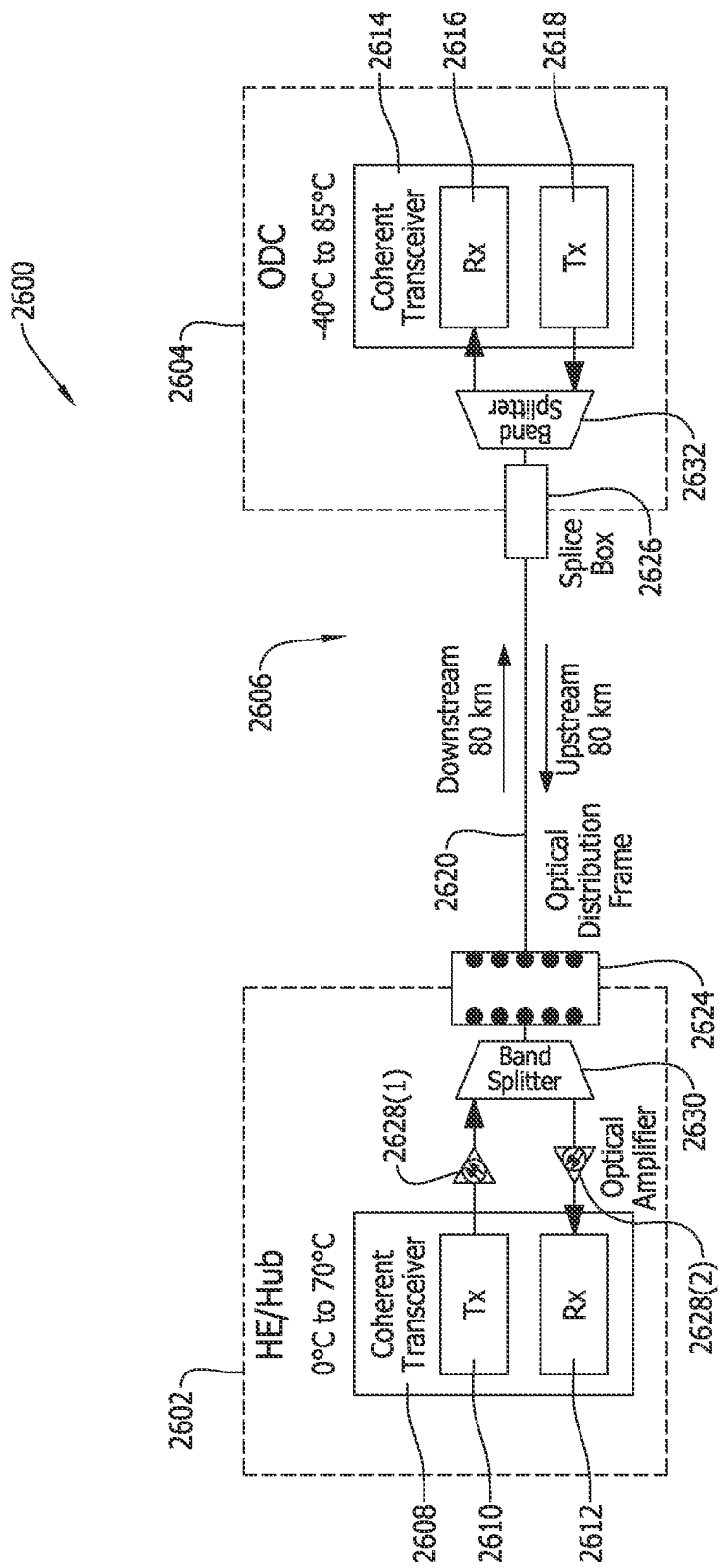
FIG. 26 is a schematic illustration of a coherent optics network architecture.

Longer distances can deploy the example architecture for P2P Coherent Optic Link as shown in FIG. 26. In this architecture, the P2P Coherent Optic Link requires optical amplifiers at the HE/Hub, a booster for Downstream and a preamplifier for Upstream.

Table 2 calculates an example link budget for 80 km dual fiber single channel link for downstream and Table 3 for upstream, in accordance with an embodiment of architecture 2400. As shown in Tables 2 and 3, the link loss is different for downstream and upstream, because of receiver sensitivity differences attributed to the optical amplifier booster for downstream and the optical pre-amplifier for upstream. Further, as Tables 2 and 3 show, either P2P coherent optic transmitter function for downstream and upstream at a variety of the modulation formats.

TABLE 2

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| Post EDFA Gain | | | −3 | −5 | −6 | | | | |
| Power/channel out of EDFA (dBm) | | | −5 | −4 | −2 | | | | |
| Optical Distribution Frame | 1 | | | | | | | | |
| Optical System Plant | | | | | | | | | |
| Fiber Attenuation 80 km 0.25 dB/km ODC | 20 | | | | | | | | |
| Total Link | 21 | | | | | | | | |
| Margin | 2 | | | | | | | | |
| Calculated Rx Input | | −29 | −28 | −27 | −25 | −23 | −23 | −24 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Calculated Rx | | 37.2 | 36.1 | 35.5 | 36.1 | 39.1 | 39.1 | 38.9 | 38.7 |

TABLE 3

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| Optical System Plant | | | | | | | | | |
| Fiber Attenuation 80 km 0.25 dB/km | 20 | | | | | | | | |
| ODC Optical Distribution Frame | 1 | | | | | | | | |
| Pre-EDFA Gain | | −11 | −14 | −10 | −12 | | | −2 | −6 |
| Power into EDFA (dBm) | | −26 | −28 | −29 | −28 | | | −21 | −22 |
| Total Link Attenuation | 21 | | | | | | | | |
| Margin | 2 | | | | | | | | |
| Calculated Rx Input | | −18 | −17 | −22 | −19 | −23 | −23 | −22 | −19 |
| Required Rx Input | | −18 | −17 | Not | Not | −26 | −24 | −22 | −19 |
| Rx OSNR (dB) | | 15 | 15 | 15 | 15 | 20 | 20 | 20 | 20 |
| Calculated Rx OSNR (dB) | | 19.4 | 17.4 | 16.4 | | 25.3 | 25.3 | 24.3 | 23.4 |
| Link Supported? | | Yes | Yes | No | No | Yes | Yes | Yes | Yes |

Figure 25:
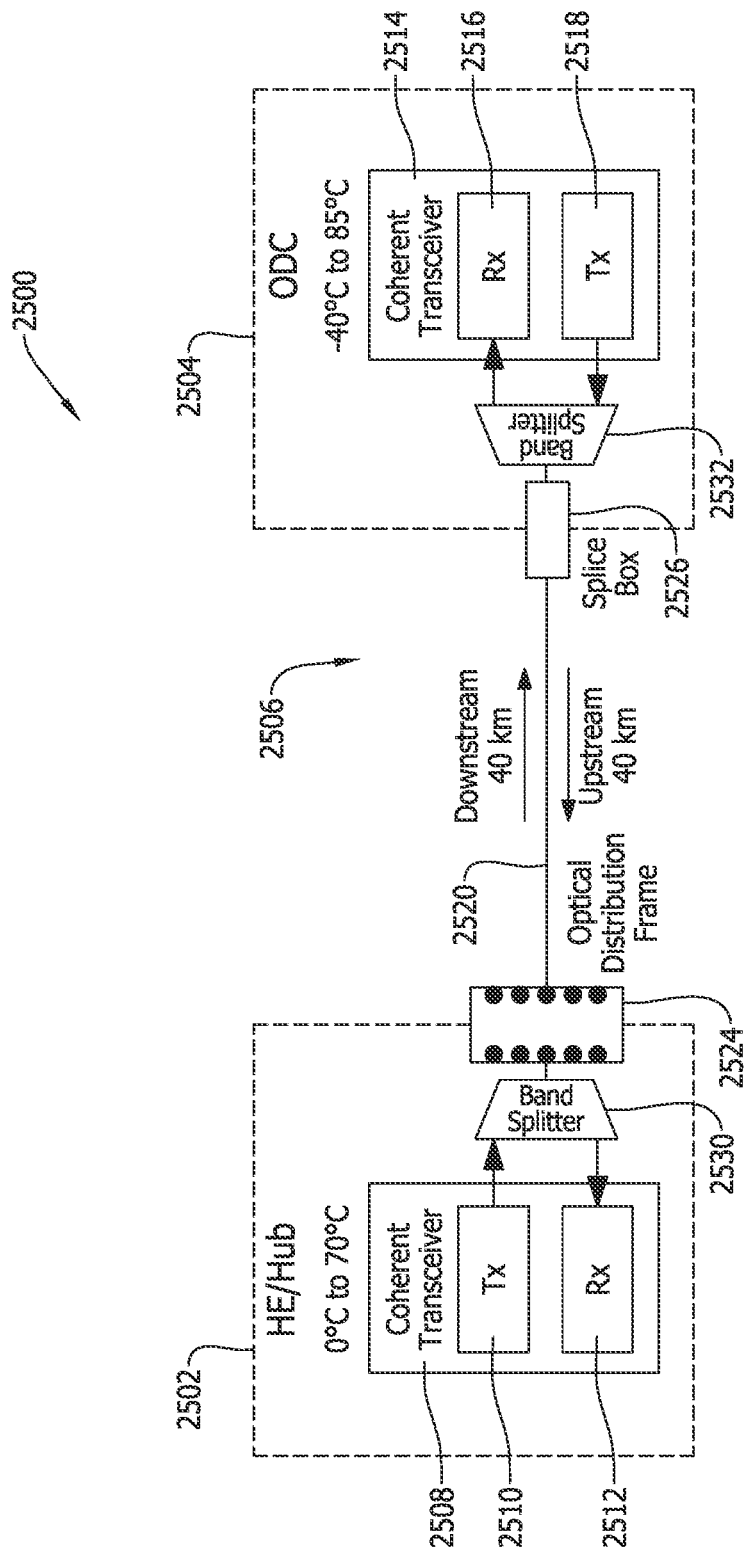
FIG. 25 is a schematic illustration of a coherent optics network architecture.

FIG. 25 is a schematic illustration of a coherent optics network architecture 2500. Architecture 2500 is a 40 km bidirectional single channel architecture, and is similar to, in some respects, architecture 2300 (FIG. 23). Architecture 2500 includes a hub 2502; a node 2504; a transport medium 2506; a hub coherent transceiver 2508, having a downstream transmitting portion 2510 and an upstream receiving portion 2512; a node coherent transceiver 2514, having a downstream receiving portion 2516 and an upstream transmitting portion 2518; an optical distribution frame 2524; and a splice box 2526. Transport medium 2506 is about 40 km in length.

Different from the configuration in FIG. 23, in architecture 2500, transport medium 2506 includes a single downstream and upstream transport medium 2520 communicatively coupled between optical distribution frame 2524 and splice box 2526, rather than downstream transport medium 2320 and upstream transport medium 2322. Architecture 2500 further includes a hub band splitter 2530 and a node band splitter 2532. Hub band splitter 2530 is located within hub 2502 and is communicatively coupled between hub coherent transceiver 2508 and optical distribution frame 2524. Node band splitter 2532 is located within node 2504 and is communicatively coupled between node coherent transceiver 2514 and optical distribution frame 2526. Band splitters 2530, 2532 are configured to combine/split two wavelengths onto transport medium 2506 between hub 2502 and node 2504.

In this example, the downstream will use one wavelength and the upstream will use a different one. The configuration illustrated by architecture 2500 requires optical bidirectional band splitters 2530, 2532 to combine/split two wavelengths onto fiber 2520 between hub 2502 and ODC 2504. From the operator survey, the weighted average for using a bidirectional fiber was 21% of the time, but some operators have nearly 100% bidirectional fibers.

Table 4 calculates an example link budget for 40 km single channel link using 1 bidirectional fiber, in accordance with an embodiment of architecture 2500. The link loss is the same for both downstream and upstream, since there are no optical amplifiers used in the link. As Table 10 shows, both P2P coherent optic transmitters will work for this link.

TABLE 4

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 20 0G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| BiDi Band Splitter | 2 | | | | | | | | |
| Opt Distribution Frame | 1 | | | | | | | | |
| Outside Plant Fiber Attenuation 40 km 0.25 dB/km | 10 | | | | | | | | |
| ODC BiDi Band Splitter | 2 | | | | | | | | |
| Total Link Attenuation | 15 | | | | | | | | |
| Margin | 2 | | | | | | | | |

TABLE 4-continued

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 20 0G DP-16QAM32 | 100 G DP-QPSK28 | 200 G DP-QPSK64 | 200 G DP-8QAM42 | 200 G DP-16QAM32 |
| Calculated Rx Input | | −23 | −25 | −26 | −25 | −17 | −17 | −18 | −19 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Link Supported? | | Yes | Yes | Yes | Yes | Yes | Yes | Yes | Yes |

FIG. 26 is a schematic illustration of a coherent optics network architecture 2600. Architecture 2600 is an 80 km bidirectional single channel with amplifiers architecture, and is similar to, in some respects, architecture 2400 and 2500 (FIGS. 24 and 25). Architecture 2600 includes a hub 2602; a node 2604; a transport medium 2606; a hub coherent transceiver 2608, having a downstream transmitting portion 2610 and an upstream receiving portion 2612; a node coherent transceiver 2614, having a downstream receiving portion 2616 and an upstream transmitting portion 2618; a single downstream and upstream transport medium 2620; an optical distribution frame 2624; a splice box 2626; a hub band splitter 2630; and a node band splitter 2632.

Different from the configuration illustrated in FIG. 25, but similar to the configuration shown in FIG. 24, in architecture 2600, transport medium 2606 may be about 80 km in length. Further, architecture 2600 includes a plurality of optical amplifiers 2628 coupled to hub 2602. In FIG. 26, optical amplifiers 2628 are depicted as two separate optical amplifiers, with amplifier 2628(1) communicatively coupled between downstream transmission portion 2610 and hub band splitter 2630 and amplifier 2428(2) communicatively coupled between hub band splitter 2630 and upstream receiving portion 2612.

For longer bidirectional links, such as the example of architecture 2600 illustrated in FIG. 26, amplifiers 2428 are necessary at hub 2602. From the operator survey, the operators that have nearly 100% bidirectional fibers have <1% of those fibers at or greater than 80 km. Therefore, this example architecture 2500 may have little practical application and is provided primarily of illustrative purposes.

Table 5 calculates an example downstream link budget for 80 km single channel with optical amplifier booster, in accordance with an embodiment of architecture 2600. Table 6 calculates an example upstream link budget for 80 km single channel with optical pre-amplifier, in accordance with an embodiment of architecture 2600. As Tables 5 and 6 illustrate, this link requires a small amount of amplification in order to close the link. Because of optical amplifiers 2428 and the increased distance, the estimated OSNR is lower than the previous tables showed. With a lower OSNR, it reduces the P2P coherent optic receiver sensitivity making it harder to close the link at the estimated P2P coherent optic transmitter launch power. However, as Tables 5 and 6 show, both P2P coherent optic transmitters should work for this example for all modulation formats.

TABLE 5

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| Post EDFA Gain | | −3 | −7 | −9 | −11 | | | −1 | −4 |
| Power/ch out of EDFA (dBm) | | −3 | −1 | 0 | 3 | | | 0 | 2 |
| BiDi Band Splitter | 2 | | | | | | | | |
| Opt Distribution Frame | 1 | | | | | | | | |
| Outside Plant Fiber Attenuation 80 km 0.25 dB/km | 20 | | | | | | | | |
| ODC BiDi Band Splitter | 2 | | | | | | | | |
| Total Link Attenuation | 25 | | | | | | | | |
| Margin | 2 | | | | | | | | |
| Calculated Rx Input | | −30 | −28 | −27 | −24 | −27 | −27 | −27 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Calculated Rx OSNR (dB) | | 37.2 | 36.1 | 35.5 | 36.1 | 39.1 | 39.1 | 38.9 | 38.7 |
| Link Supported? | | Yes | Yes | Yes | Yes | Yes | Yes | Yes | Yes |

TABLE 6

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| BiDi Band Splitter | 2 | | | | | | | | |
| Opt Distribution Frame | 1 | | | | | | | | |
| Outside Plant Fiber Attenuation 80 km 0.25 dB/km ODC | 20 | | | | | | | | |
| BiDi Band Splitter | 2 | | | | | | | | |
| Pre-EDFA Gain | | −15 | −18 | −20 | −20 | −1 | −3 | −6 | −10 |
| Power into EDFA (dBm) | | −31 | −33 | −34 | −33 | −25 | −25 | −26 | −27 |
| Total Link Attenuation | 25 | | | | | | | | |
| Margin | 2 | | | | | | | | |
| Calculated Rx Input | | −18 | −17 | −16 | −15 | −26 | −24 | −22 | −19 |
| Required Rx Input | | −18 | −17 | Not | Not | −26 | −24 | −22 | −19 |
| Rx OSNR (dB) | | 15 | 15 | 15 | 15 | 20 | 20 | 20 | 20 |
| Calculated Rx OSNR (dB) | | 19.4 | 17.4 | 16.4 | | 25.3 | 25.3 | 24.3 | 23.4 |
| Link Supported? | | Yes | Yes | No | No | Yes | Yes | Yes | Yes |

Figure 27:
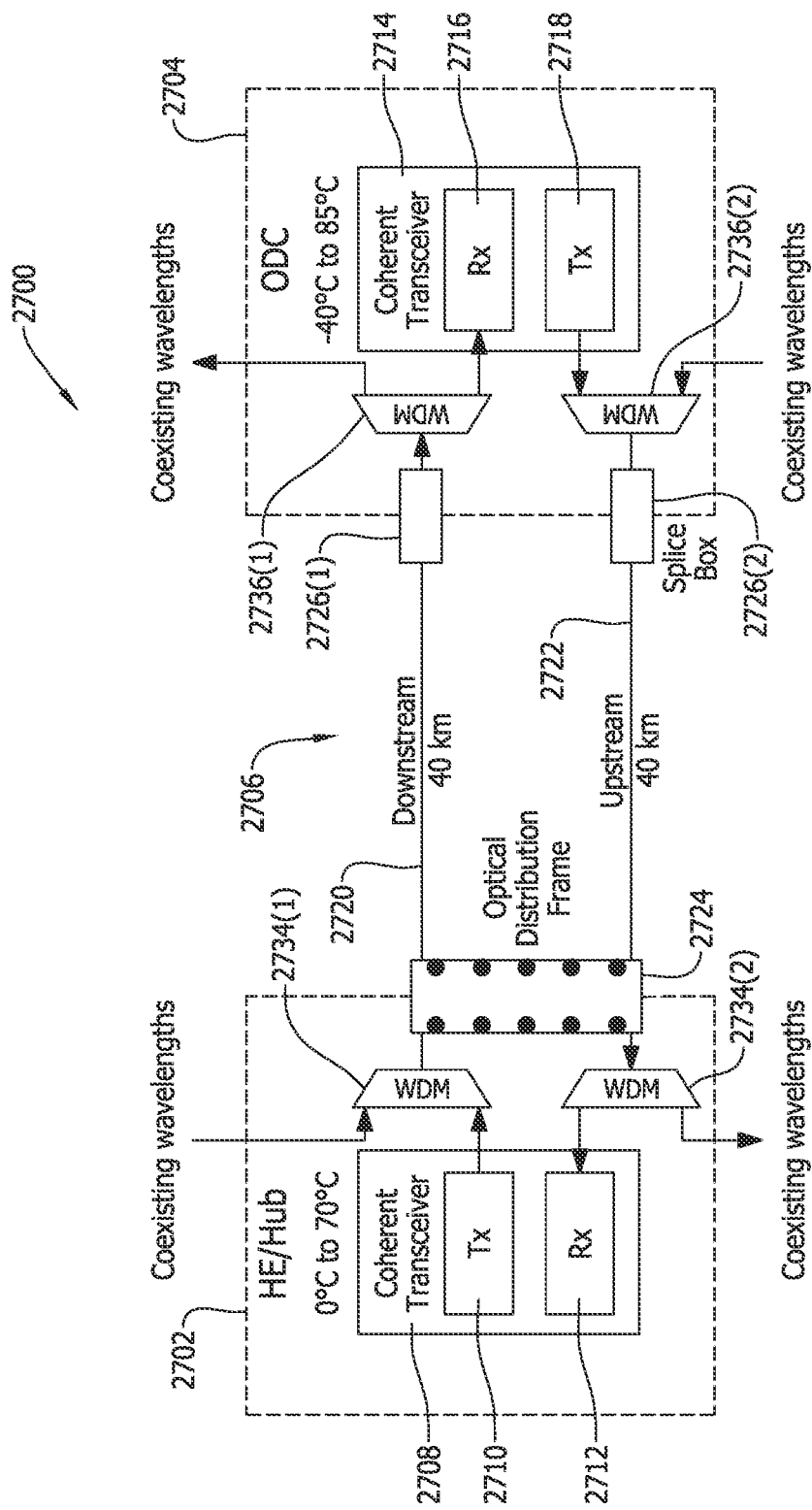
FIG. 27 is a schematic illustration of a coherent optics network architecture.

FIG. 27 is a schematic illustration of a coherent optics network architecture 2700. Architecture 2700 is a 40 km dual fiber multi-channel architecture, and is similar to, in some respects, architecture 2300 (FIG. 23). Architecture 2700 includes a hub 2702; a node 2704; a transport medium 2706; a hub coherent transceiver 2708, having a downstream transmitting portion 2710 and an upstream receiving portion 2712; a node coherent transceiver 2714, having a downstream receiving portion 2716 and an upstream transmitting portion 2718; a downstream transport medium 2720; an upstream transport medium 2722; an optical distribution frame 2724; and a plurality of splice boxes 2726. Additionally, transport medium 2706 is about 40 km in length.

Different from the configuration illustrated in FIG. 23, architecture 2700 includes a plurality of hub multiplexers 2734 and a plurality of node multiplexers 2736. Hub multiplexers 2734 are coupled to hub 2702 and are depicted as two separate hub multiplexers 2734, with hub multiplexer 2734(1) communicatively coupled between downstream transmission portion 2710 and optical distribution frame 2724, and hub multiplexer 2734(2) communicatively coupled between optical distribution frame 2724 and upstream receiving portion 2712. Node multiplexers 2736 are coupled to node 2704 and are depicted as two separate node multiplexers 2736, with node multiplexer 2736(1) communicatively coupled between splice box 2726(1) and downstream receiving portion 2716, and node multiplexer 2736(2) communicatively coupled between downstream transmission portion 2718 and splice box 2726(2). As depicted in FIG. 27, multiplexers 2734, 2736 are wave division multiplexers.

Although the example architecture 2300 is possible, frequently (~70% of the time according to the vendor survey), the operator will add a P2P coherent optic link to an existing hub 2702 that uses analog signals to the ODC. In this case, the P2P coherent optic link will go through a multiplexer 2734, 2736 to co-exist with the analog signals, as illustrated in FIG. 27.

Table 7 calculates an example link budget for a 40 km multi-channel link using two fibers with one for downstream and one for upstream, in accordance with an embodiment of architecture 700. The link loss is the same for both downstream and upstream. As Table 7 shows, the lower power P2P coherent optic transmitter may only work for the 100 Gbps bit rate, while the higher power P2P coherent optic transmitter should work for all modulation formats.

TABLE 7

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Opt Distribution Frame | 1 | | | | | | | | |
| Outside Plant Fiber Attenuation 40 km 0.25 dB/km ODC | 10 | | | | | | | | |
| WDM | 5 | | | | | | | | |
| Total Link | 21 | | | | | | | | |
| Margin | 2 | | | | | | | | |

TABLE 7-continued

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Calculated Rx Input | | −29 | −31 | −32 | −31 | −23 | −23 | −24 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Link Supported? | | Yes | No | No | No | Yes | Yes | Yes | Yes |

Figure 28:
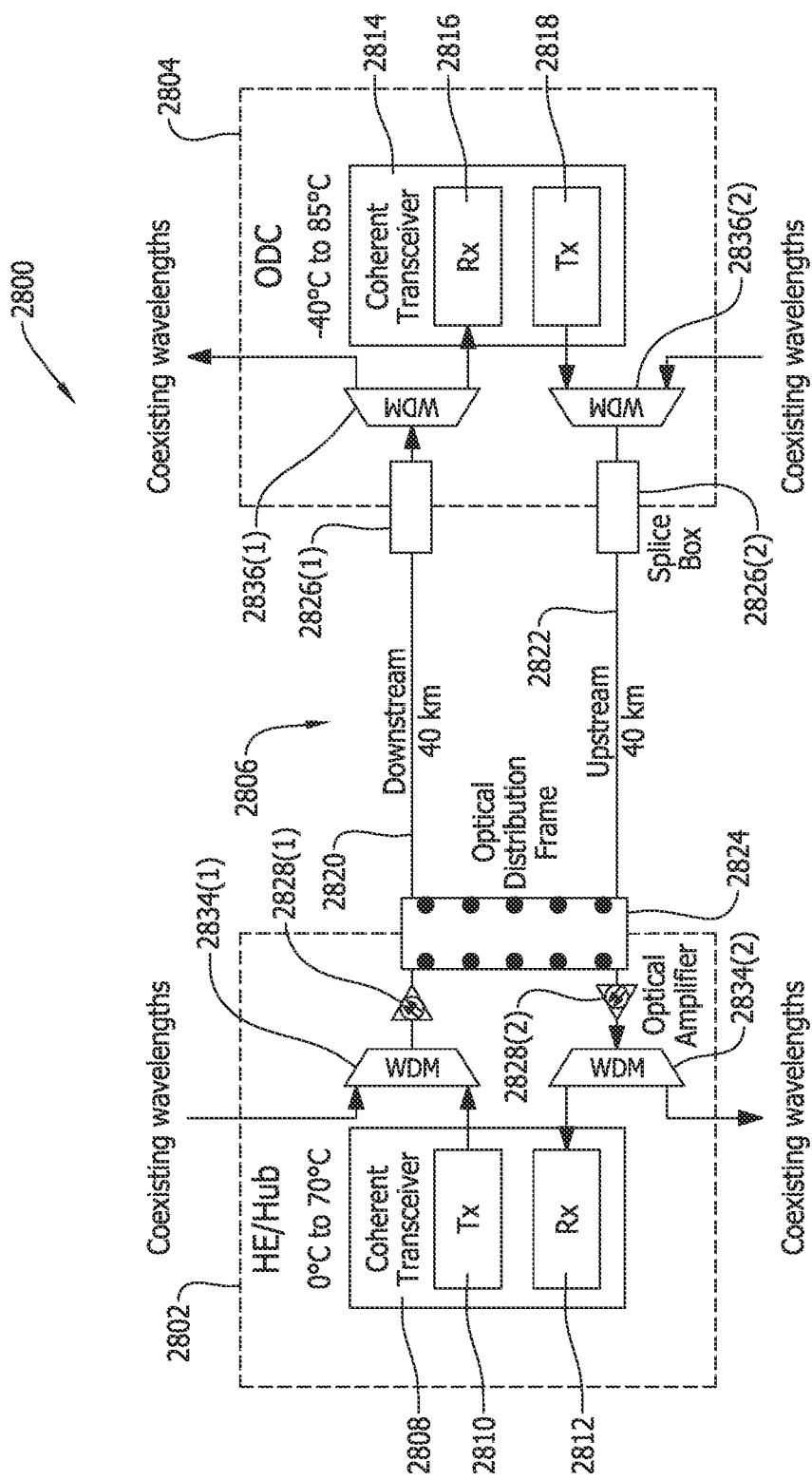
FIG. 28 is a schematic illustration of a coherent optics network architecture.

FIG. 28 is a schematic illustration of a coherent optics network architecture 2800. In an embodiment, architecture 2800 is a 40 km dual-fiber multi-channel network including an optical amplifier architecture, and is similar to, in some respects, architecture 2700 (FIG. 27). Architecture 2800 includes a hub 2802, a node 2804, a transport medium 2806, a hub coherent transceiver 2808 having a downstream transmitting portion 2810 and an upstream receiving portion 2812, a node coherent transceiver 2814 having a downstream receiving portion 2816 and an upstream transmitting portion 2818, a downstream transport medium 2820, an upstream transport medium 2822, an optical distribution frame 2824, a plurality of splice boxes 2826, a plurality of hub multiplexers 2834, and a plurality of node multiplexers 2836. As shown in FIG. 28, splice boxes 2826, hub multiplexers 2834 and node multiplexers 2836 are each depicted as two separate entities, with splice box 2826(1), hub multiplexer 2834(1), and node multiplexer 2836(1) coupled along the downstream transport medium 2820 and splice box 2826(2), hub multiplexer 2834(2) and node multiplexer 2836(2) coupled along the upstream transport medium 2824. Additionally, in this example, transport medium 2806 may be approximately 40 km in length.

Different from the configuration illustrated in FIG. 27, but similar to the configuration shown in FIG. 24, architecture 2800 includes a plurality of optical amplifiers 2828 coupled to hub 2802. As illustrated in FIG. 28, optical amplifiers 2828 are depicted as two separate amplifiers, with one downstream amplifier 2828(1) communicatively coupled between downstream hub multiplexer 2834(1) and optical distribution frame 2824, and one upstream amplifier 2828(2) communicatively coupled between optical distribution frame 2824 and upstream hub multiplexer 2834(2).

For existing links with 12 dB to 17 dB, the operator may have deployed optical amplifiers 2828 on the fiber, as shown in FIG. 28. When adding a P2P coherent optic link to transport medium 2806, the P2P signals will thus also go through a particular optical amplifier 2828 that supports the coherent optic signals. The operators prefer to only deploy optical amplifiers 2828 in hub 2808, so on the downstream fiber 2820, optical amplifier 2828(1) boosts the signal as it leaves hub 2802. On upstream fiber 2822, optical amplifier 2828(2) acts as a preamplifier to amplify the signal as it enters the HE/Hub. In the upstream case, optical amplifier 2828(2) may be receiving a relatively noisy, weak signal. When optical amplifier 2828(2) amplifies the signal, it also amplifies the noise, which could further lower the OSNR. Depending on the type of optical amplifier 2828, the amount of gain added may vary. Some optical amplifiers 2828 also allow for the operator to adjust the amount of gain that the particular optical amplifier 2828 adds to the signal, which allows the operator to potentially optimize the OSNR at upstream receiving portion 2812. From an operator survey, approximately 20% of the current optical links use amplification to overcome the loss between upstream transmitting portion 2818 and upstream receiving portion 2812.

In order to make the link loss budget work for the low power P2P coherent optic transmitter for 40 km dual fiber multi-channel, optical amplifiers 2828 are added to the links in example architecture 2800. Table 8 calculates an example downstream link budget for a 40 km multi-channel link using two fibers. Table 9 calculates an example upstream link budget for a 40 km multi-channel link using two fibers. In this case, the downstream uses an optical amplifier 2828 as a booster at hub 2802, while the upstream uses an optical amplifier 2828 as a preamplifier in hub 2802. The power coming into preamplifier 2828 could be low, so the OSNR coming out of preamplifier 2828 is important for how sensitive the receiver must be to close the link. As Tables 8 and 9 show, with a small amount of amplification for the 200 Gbps modulation formats, the low power P2P Coherent Optic Transmitter can now close the link.

TABLE 8

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Post EDFA Gain | | | −3 | −5 | −6 | | | | |
| Power/ch out of EDFA (dBm) | | | −10 | −9 | −7 | | | | |
| Opt Distribution Frame | 1 | | | | | | | | |
| Outside Plant Fiber Attenuation 80 km 0.25 dB/km | 10 | | | | | | | | |
| ODC WDM | 5 | | | | | | | | |
| Total Link Attenuation | 21 | | | | | | | | |

TABLE 8-continued

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Margin | 2 | | | | | | | | |
| Calculated Rx Input | | −29 | −28 | −27 | −25 | −23 | −23 | −24 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Calculated Rx OSNR (dB) | | 37.2 | 36.1 | 35.5 | 36.1 | 39.1 | 39.1 | 38.9 | 38.7 |
| Link Supported? | | Yes | Yes | Yes | Yes | Yes | Yes | Yes | Yes |

TABLE 9

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Outside Plant Fiber Attenuation 40 km 0.25 dB/km | 10 | | | | | | | | |
| ODC Optical Distribution Frame | 1 | | | | | | | | |
| Pre-EDFA Gain | | −3 | −7 | −10 | 12 | | | −2 | −6 |
| Power into EDFA (dBm) | | −27 | −27 | −24 | −23 | | | −16 | −17 |
| WDM | 5 | | | | | | | | |
| Total Link Attenuation | 21 | | | | | | | | |
| Margin | 2 | | | | | | | | |
| Calculated Rx Input | | −26 | −24 | −22 | −19 | −23 | −23 | −22 | −19 |
| Required Rx Input | | −26 | −24 | −22 | −19 | −26 | −24 | −22 | −19 |
| Rx OSNR (dB) | | 20 | 20 | 20 | 20 | 20 | 20 | 20 | 20 |
| Calculated Rx OSNR (dB) | | 29.1 | 27.2 | 26.3 | 27.2 | 34.1 | 34.1 | 33.4 | 32.6 |
| Link Supported? | | Yes | Yes | Yes | Yes | Yes | Yes | Yes | Yes |

Figure 29:
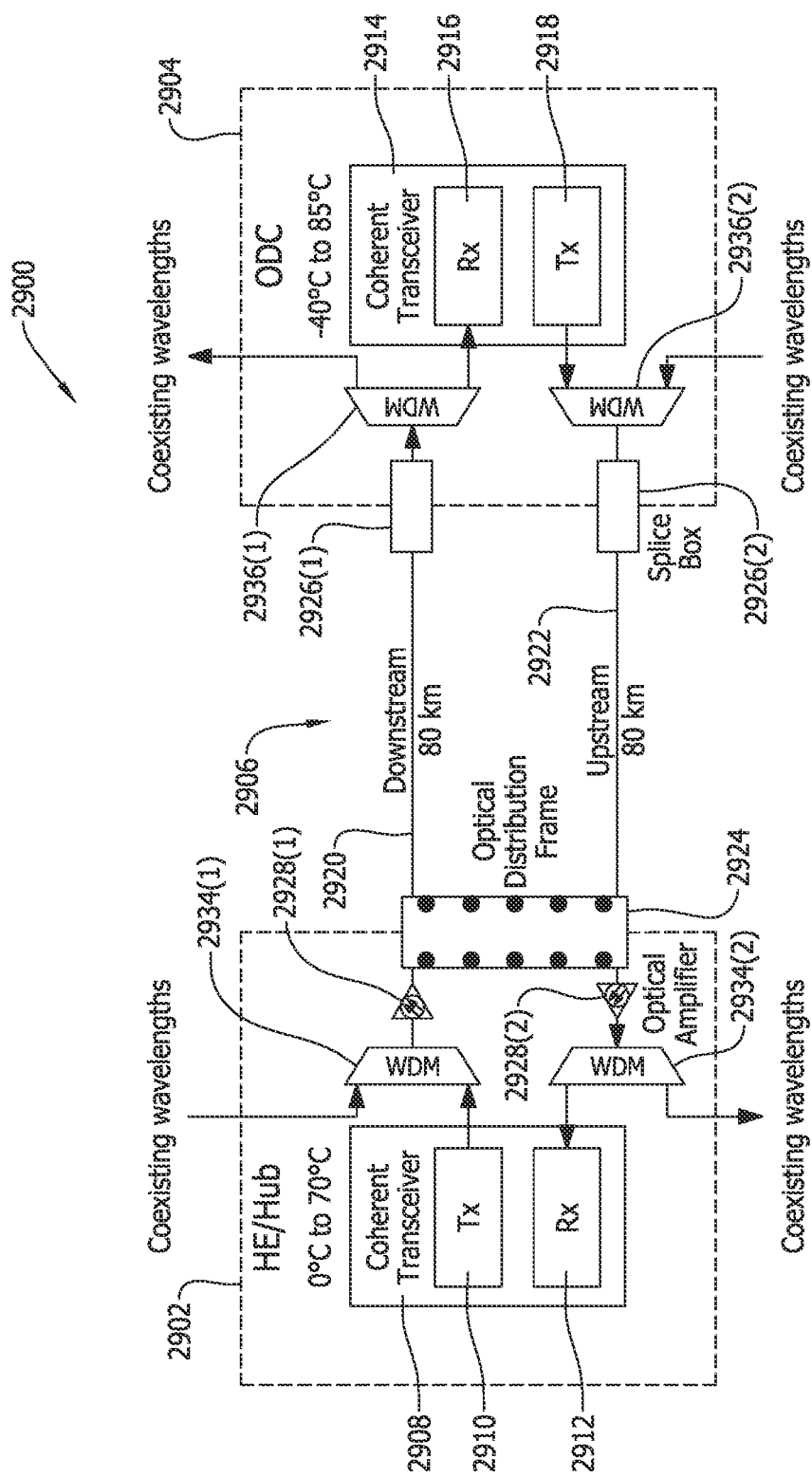
FIG. 29 is a schematic illustration of a coherent optics network architecture.

FIG. 29 is a schematic illustration of a coherent optics network architecture 2900. In an embodiment, architecture 2900 is an 80 km dual-fiber multi-channel network with an optical amplifier architecture, and is similar to, in some respects, architecture 2800, FIG. 28. Architecture 2900 includes a hub 2902, a node 2904, a transport medium 2906, a hub coherent transceiver 2908 having a downstream transmitting portion 2910 and an upstream receiving portion 2912, a coherent transceiver 2914 having a downstream receiving portion 2916 and an upstream transmitting portion 2918, a downstream transport medium 2920, an upstream transport medium 2922, an optical distribution frame 2924, a plurality of splice boxes 2926, a plurality of optical amplifiers 2928, a plurality of hub multiplexers 2934, and a plurality of node multiplexers 2836. Different from the configuration illustrated in FIG. 28, in architecture 2900, transport medium 2906 is approximately 80 km in length.

Figure 31:
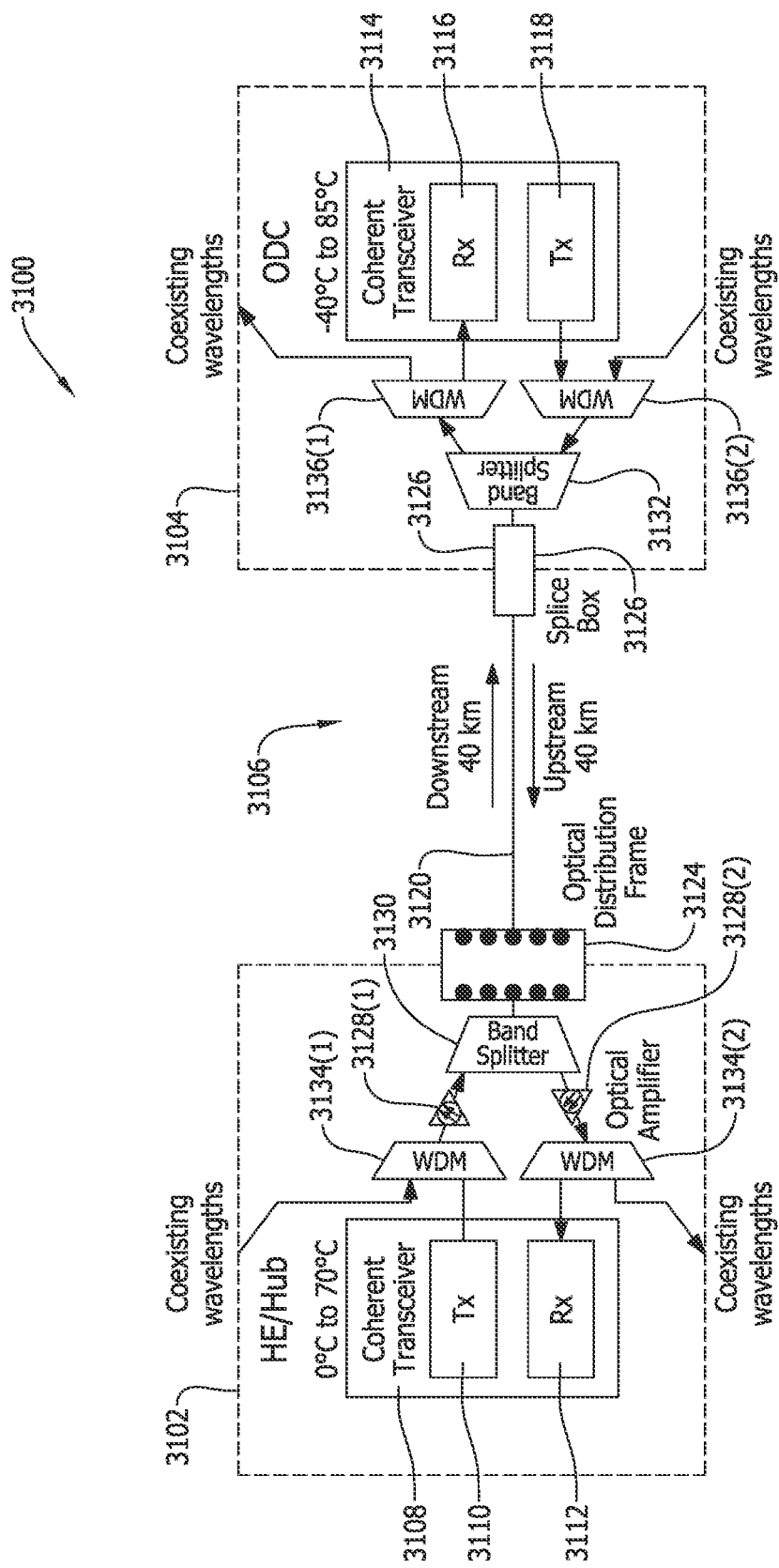
FIG. 31 is a schematic illustration of a coherent optics network architecture.

For longer distances, operators usually use optical amplifiers on the fiber as shown in FIG. 31. When adding a P2P Coherent Optic Link to the fiber, it will also go through an optical amplifier. The operators prefer to only deploy the optical amplifiers in the HE/Hub, so on the Downstream fiber, the optical amplifier will boost the signal as it leaves the HE/Hub. On the Upstream fiber, the optical amplifier will act as a preamplifier to amplify the signal as it enters the HE/Hub. In the Upstream case, the optical amplifier may be receiving a relatively noisy, weak signal. When it amplifies the signal, it also amplifies the noise, which could further lower the OSNR. Depending on the type of optical amplifier, the amount of gain it adds can vary. Some optical amplifiers allow the operator to adjust the amount of gain the optical amplifier adds to the signal. This allows the operator to try to optimize the OSNR at the receiver. From the operator survey, approximately 20% of the current optical links use amplification to overcome the distance between the transmitter and the receiver.

Table 10 calculates an example downstream link budget for a 80 km multi-channel link using two fibers, in accordance with an embodiment of architecture 2900. Table 11 calculates an example upstream link budget for a 80 km multi-channel link using two fibers. In this example, downstream uses optical amplifier 2928 as a booster at hub 2906, while the upstream uses optical amplifier 2928 as a preamplifier in hub 2906. The power coming into the preamplifier could be low, so the OSNR coming out of the preamplifier is important for how sensitive the receiver must be to close the link. As the downstream table shows, both P2P coherent optic transmitters should work for all modulation formats. However, for the upstream link, only the high power P2P coherent optic transmitter will work.

TABLE 10

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Post EDFA Gain | | −9 | −13 | −15 | −16 | −3 | −5 | −7 | −10 |
| Power/ch out of EDFA (dBm) | | −2 | 0 | 1 | 3 | −2 | 0 | 1 | 3 |
| Opt Distribution Frame | 1 | | | | | | | | |
| Outside Plant Fiber Attenuation 80 km 0.25 dB/km | 20 | | | | | | | | |
| ODC | | | | | | | | | |
| WDM | 5 | | | | | | | | |
| Total Link Attenuation | 31 | | | | | | | | |
| Margin | 2 | | | | | | | | |
| Calculated Rx Input | | −30 | −28 | −27 | −25 | −30 | −28 | −27 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Calculated Rx OSNR (dB) | | 37.2 | 36.1 | 35.5 | 36.1 | 39.1 | 39.1 | 38.9 | 38.7 |
| Link Supported? | | Yes | Yes | Yes | Yes | Yes | Yes | Yes | Yes |

TABLE 11

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Outside Plant Fiber Attenuation 80 km 0.25 dB/km | 20 | | | | | | | | |
| ODC | | | | | | | | | |
| Optical Distribution Frame | 1 | | | | | | | | |
| Pre-EDFA Gain | | −20 | −20 | | | −7 | −9 | −12 | −16 |
| Power into EDFA (dBm) | | −32 | −34 | | | −26 | −26 | −27 | −28 |
| WDM | 5 | | | | | | | | |
| Total Link Attenuation | 15 | | | | | | | | |
| Margin | 2 | | | | | | | | |
| Calculated Rx Input | | −19 | −21 | −42 | −41 | −26 | −24 | −22 | −19 |
| Required Rx Input | | −18 | −17 | Not Possible | Not Possible | −26 | −24 | −22 | −19 |
| Rx OSNR (dB) | | 15 | 15 | 15 | 15 | 20 | 20 | 20 | 20 |
| Calculated Rx OSNR (dB) | | 19.4 | 17.4 | 16.4 | | 25.3 | 25.3 | 24.3 | 23.4 |
| Link Supported? | | No | No | No | No | Yes | Yes | Yes | Yes |

Figure 30:
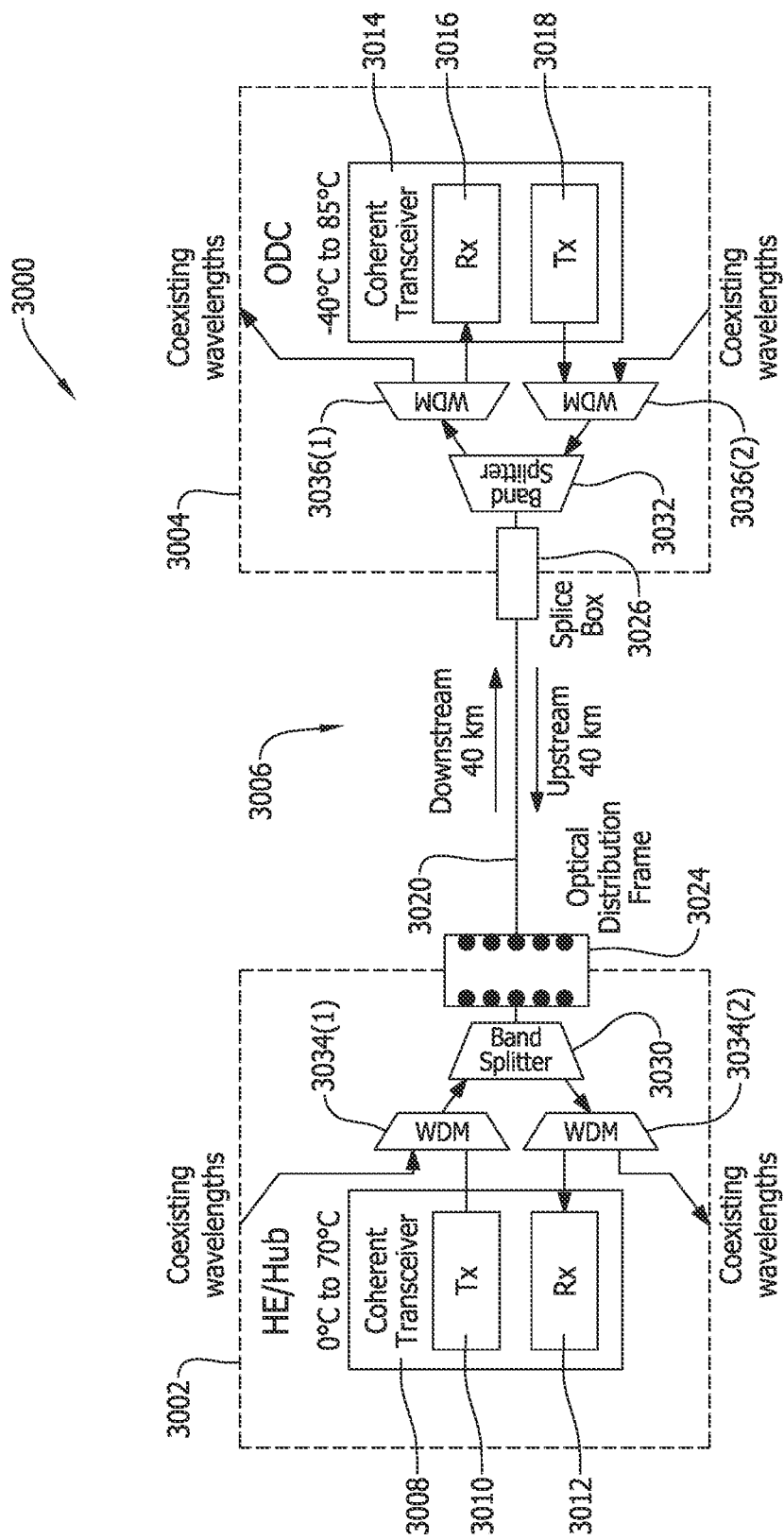
FIG. 30 is a schematic illustration of a coherent optics network architecture.

FIG. 30 is a schematic illustration of a coherent optics network architecture 3000. Architecture 3000 is a 40 km bidirectional multi-channel architecture, and is similar to, in some respects, architecture 2500 (FIG. 25). Architecture 3000 includes a hub 3002; a node 3004; a transport medium 3006; a hub coherent transceiver 3008, having a downstream transmitting portion 3010 and an upstream receiving portion 3012; a node coherent transceiver 3014, having a downstream receiving portion 3016 and an upstream transmitting portion 3018; a single downstream and upstream transport medium 3020; an optical distribution frame 3024; a splice box 3026; a hub band splitter 3030; and a node band splitter 3032. Additionally, transport medium 3006 is about 40 km in length.

Different from the configuration illustrated in FIG. 25, but similar to the configuration shown in FIG. 27, architecture 3000 includes a plurality of hub multiplexers 3034 and a plurality of node multiplexers 3036. Hub multiplexers 3034 are coupled to hub 3002 and are depicted in FIG. 27 as two separate units, with hub multiplexer 3034(1) communicatively coupled between downstream transmission portion 3010 and hub band splitter 3030, and hub multiplexer 3034(2) communicatively coupled between hub band splitter 3030 and upstream receiving portion 3012. Node multiplexers 3036 are coupled to node 3004 and are depicted in FIG. 27 as two separate units, with node multiplexer 3036(1) communicatively coupled between node band splitter 3032 and downstream receiving portion 3016, and node multiplexer 3036(2) communicatively coupled between downstream transmission portion 3018 and node band splitter 3032.

The example illustrated in FIG. 30 for doing multi-channel on a single fiber requires an addition of a multiplexer along with the Bidirectional Band Splitter at the HE/Hub and the ODC.

Table 12 calculates an example link budget for a 40 km multi-channel link using one fiber with one wavelength for downstream and a different wavelength for upstream, in accordance with an embodiment of architecture 3000. The link loss is the same for both downstream and upstream. The example assumes a worst case 40 channel wave division multiplexer. As the table shows, only the high power P2P coherent optic transmitter would work, but only for two modulation formats.

3136(1) and an upstream node multiplexer 3136(2). Additionally, transport medium 3106 is 40 km in length.

Different from the configuration illustrated in FIG. 30, but similar to the configuration in FIG. 28, architecture 3100 include a plurality of optical amplifiers 3128 communicative coupled between one hub multiplexer 3134 and hub band splitter 3130. As depicted in FIG. 31, optical amplifiers 3128 include a downstream optical amplifier 3128(1) and an upstream optical amplifier 3128(2).

As mentioned above, for longer distance examples, optical amplifiers 3128 may be added to the link. When that fiber is bidirectional, the path needs to split between transmit and receive paths, because optical amplifiers 3128 are directional. The transmit and receive paths may be split and combined using different methods. As shown in FIG. 31, architecture 3100 uses bidirectional band splitter 3130 in hub 3102 to apply the amplification in the right direction. Hub 3102 combines all the transmit wavelengths and amplifies them before combining them on the same fiber where the receive wavelengths exist. On the receive path, the bidirectional band splitter separates the receive wavelengths from the transmit wavelengths and sends the receive wavelengths through the optical amplifier that then passes them to a WDM to split them into individual receive wavelengths.

TABLE 12

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| BiDi Band Splitter | 2 | | | | | | | | |
| Opt Distribution Frame | 1 | | | | | | | | |
| Outside Plant Fiber Attenuation 40 km 0.25 dB/km | 10 | | | | | | | | |
| ODC BiDi Band Splitter | 2 | | | | | | | | |
| WDM | 5 | | | | | | | | |
| Total Link Attenuation | 25 | | | | | | | | |
| Margin | 2 | | | | | | | | |
| Calculated Rx Input | | −33 | −35 | −36 | −35 | −27 | −27 | −28 | −29 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Link Supported? | | No | No | No | No | Yes | Yes | No | No |

FIG. 31 is a schematic illustration of a coherent optics network architecture 3100. Architecture 3100 is a 40 km bidirectional multi-channel with optical amplifiers architecture, and is similar to, in some respects, architecture 3000 (FIG. 30). Architecture 3100 includes a hub 3102; a node 3104; a transport medium 3106; a hub coherent transceiver 3108, including a downstream transmitting portion 3110 and an upstream receiving portion 3112; a node coherent transceiver 3114, including a downstream receiving portion 3116 and an upstream transmitting portion 3118; a single downstream and upstream transport medium 3120; an optical distribution frame 3124; a splice box 3126; a hub band splitter 3130; a node band splitter 3132; a plurality of multiplexers 3134, depicted in this example as a downstream hub multiplexer 3134(1) and an upstream hub multiplexer 3134(2); and a plurality of node multiplexers 3136, depicted in this example as a downstream node multiplexer Table 13 calculates an example downstream link budget for a 40 km bidirectional multi-channel link, in accordance with an embodiment of architecture 3100. Table 14 calculates an example upstream link budget for a 40 km bidirectional multi-channel link, in accordance with an embodiment of architecture 3100. The downstream uses an optical amplifier 3128(1) as a booster at hub 3102, while the upstream uses an optical amplifier 3128(2) as a preamplifier in hub 3102. The power coming into the preamplifier could be low, so the OSNR coming out of the preamplifier is important for how sensitive the P2P coherent optic receiver must be to close the link. As the tables show, by adding optical amplifiers to the links that could not be closed in the example embodiment of architecture 3000, the links in both directions for all modulation formats can be closed.

TABLE 13

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM4 | 200 DP-16QAM32 |
| Tx Output Power | | −6 | −8 | −9 | −8 | 0 | 0 | −1 | −2 |
| WDM | 5 | | | | | | | | |
| Post EDFA Gain | | −3 | −7 | −9 | −10 | | | −1 | −4 |
| Power/ch out of EDFA (dBm) | | −8 | −6 | −5 | −3 | | | −5 | −3 |
| BiDi Band Splitter | 2 | | | | | | | | |
| Opt Distribution Frame | 1 | | | | | | | | |
| Outside Plant Fiber Attenuation 40 km 0.25 dB/km | 10 | | | | | | | | |
| ODC | | | | | | | | | |
| BiDi Band Splitter | 2 | | | | | | | | |
| WDM | 5 | | | | | | | | |
| Total Link Attenuation | 25 | | | | | | | | |
| Margin | 2 | | | | | | | | |
| Calculated Rx Input | | −30 | −28 | −27 | −25 | −27 | −27 | −27 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Calculated Rx OSNR (dB) | | 37.2 | 36.1 | 35.5 | 36.1 | 39.1 | 39.1 | 38.9 | 38.7 |
| Link Supported? | | Yes | Yes | Yes | Yes | Yes | Yes | Yes | Yes |

TABLE 14

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM4 | 200 G DP-16QAM32 |
| Tx Output Power | | −6 | −8 | −9 | −8 | 0 | 0 | −1 | −2 |
| WDM | 5 | | | | | | | | |
| BiDi Band Splitter | 2 | | | | | | | | |
| Outside Plant Fiber Attenuation 40 km 0.25 dB/km | 10 | | | | | | | | |
| ODC | | | | | | | | | |
| Optical Distribution Frame | 1 | | | | | | | | |
| BiDi Band Splitter | 2 | | | | | | | | |
| Pre-EDFA Gain | | −7 | −11 | −14 | −16 | −1 | −3 | −6 | −10 |
| Power into EDFA (dBm) | | −26 | −28 | −29 | −28 | −20 | −20 | −21 | −22 |
| WDM | 5 | | | | | | | | |
| Total Link Attenuation | 25 | | | | | | | | |
| Margin | 2 | | | | | | | | |
| Calculated Rx Input | | −26 | −24 | −22 | −19 | −26 | −24 | −22 | −19 |
| Required Rx Input | | −26 | −24 | −22 | −19 | −26 | −24 | −22 | −19 |
| Rx OSNR (dB) | | 20 | 20 | 20 | 20 | 20 | 20 | 20 | 20 |
| Calculated Rx OSNR (dB) | | 29.1 | 27.2 | 26.3 | 27.2 | 34.1 | 34.1 | 33.4 | 32.6 |
| Link Supported? | | Yes | Yes | Yes | Yes | Yes | Yes | Yes | Yes |

Figure 32:
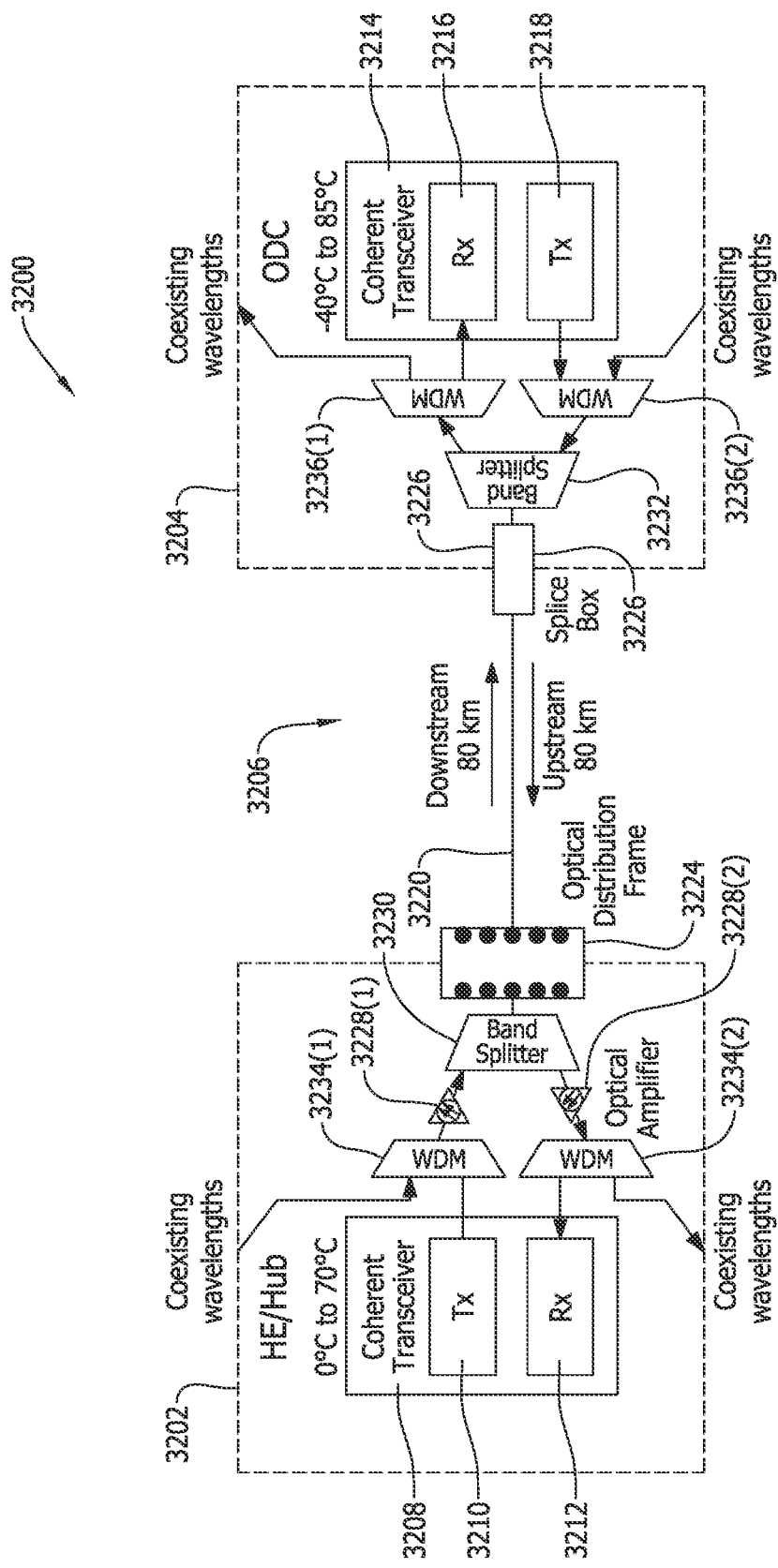
FIG. 32 is a schematic illustration of a coherent optics network architecture.

FIG. 32 is a schematic illustration of a coherent optics network architecture 3200. Architecture 3200 is an 80 km bidirectional multi-channel with optical amplifiers architecture, and is similar to, in some respects, architecture 3100 (FIG. 31). Architecture 3200 includes a hub 3202; a node 3204; a transport medium 3206; a hub coherent transceiver 3208, having a downstream transmitting portion 3210 and an upstream receiving portion 3212; a node coherent transceiver 3214, having a downstream receiving portion 3216 and an upstream transmitting portion 3218; a single downstream and upstream transport medium 3220; an optical distribution frame 3224; a splice box 3226; a plurality of optical amplifiers 3228, depicted in FIG. 32 as a downstream optical amplifier 3228(1) and an upstream optical amplifier 3228(2); a hub band splitter 3230; a node band splitter 3232; a plurality of hub multiplexers 3234, depicted in FIG. 32 as a downstream hub multiplexer 3234(1) and an upstream hub multiplexer 3234(2); and a plurality of node multiplexers 3236, depicted in FIG. 32 as a downstream node multiplexer 3236(1) and an upstream node multiplexer 3236(2). Different from the configuration illustrated in FIG. 31, in architecture 3200, transport medium 3206 is about 80 km in length.

As mentioned, longer distance examples add optical amplifiers 3228 to the link. When that fiber is bidirectional, the path needs to split between transmit and receive paths, since the optical amplifiers 3228 are directional. There are a few options on how to split and combine the transmit and receive paths. The one shown in FIG. 32 uses bidirectional band splitter in hub 3204 to apply the amplification in the right direction. Hub 3204 combines all the transmit wavelengths and amplifies them before combining them on the same fiber where the receive wavelengths exist. On the receive path, the bidirectional band splitter separates the receive wavelengths from the transmit wavelengths and sends the receive wavelengths through the optical amplifier 3228 that then passes them to a WDM 3234 to split them into individual receive wavelengths.

Table 15 calculates an example downstream link budget for a 80 km bidirectional multi-channel link, in accordance with an embodiment of architecture 3200. Table 16 calculates an example upstream link budget for a 80 km bidirectional multi-channel link, in accordance with an embodiment of architecture 3200. The downstream uses optical amplifier 3228(1) as a booster at hub 3202, while the upstream uses optical amplifier 3228(2) as a preamplifier in hub 3202. The power coming into the preamplifier could be low, so the OSNR coming out of the preamplifier is important for how sensitive the P2P coherent optic receiver must be to close the link.

TABLE 15

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Post EDFA Gain | | −13 | −17 | −19 | −20 | −7 | −9 | −11 | −14 |
| Power/ch out of EDFA (dBm) | | 2 | 4 | 5 | 7 | 2 | 4 | 5 | 7 |
| BiDi Band Splitter | 2 | | | | | | | | |
| Opt Distribution Frame | 1 | | | | | | | | |
| Outside Plant Fiber Attenuation 40 km 0.25 dB/km | 20 | | | | | | | | |
| ODC BiDi Band Splitter | 2 | | | | | | | | |
| WDM | 5 | | | | | | | | |
| Total Link Attenuation | 25 | | | | | | | | |
| Margin | 2 | | | | | | | | |
| Calculated Rx Input | | −30 | −28 | −27 | −25 | −30 | −28 | −27 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Calculated Rx OSNR (dB) | | 37.2 | 36.1 | 35.5 | 36.1 | 39.1 | 39.1 | 38.9 | 38.7 |
| Link Supported? | | Yes | Yes | Yes | Yes | Yes | Yes | Yes | Yes |

TABLE 16

| Hub | dB of Loss | A | | | | B | | | |
|---|---|---|---|---|---|---|---|---|---|
| | | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| BiDi Band Splitter | 2 | | | | | | | | |
| Outside Plant Fiber Attenuation 40 km 0.25 dB/km | 20 | | | | | | | | |
| ODC Optical Distribution Frame | 1 | | | | | | | | |
| BiDi Band Splitter | 2 | | | | | | | | |
| Pre-EDFA Gain | | −25 | −28 | −33 | 0 | −11 | −13 | −16 | −20 |

TABLE 16-continued

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Power into EDFA (dBm) | | −36 | −38 | −39 | −38 | −30 | −30 | −31 | −32 |
| WDM | 5 | | | | | | | | |
| Total Link Attenuation | 35 | | | | | | | | |
| Margin | 2 | | | | | | | | |
| Calculated Rx Input | | −18 | −17 | −13 | −45 | −26 | −24 | −22 | −19 |
| Required Rx Input | | −18 | | | | −26 | −24 | −22 | −19 |
| Rx OSNR (dB) | | 15 | | | | 20 | 20 | 20 | 20 |
| Calculated Rx OSNR (dB) | | 18 | 13.4 | 12.4 | | 34.1 | 34.1 | 33.4 | 32.6 |
| Link Supported? | | Yes | No | No | No | Yes | Yes | Yes | Yes |

Figure 33:
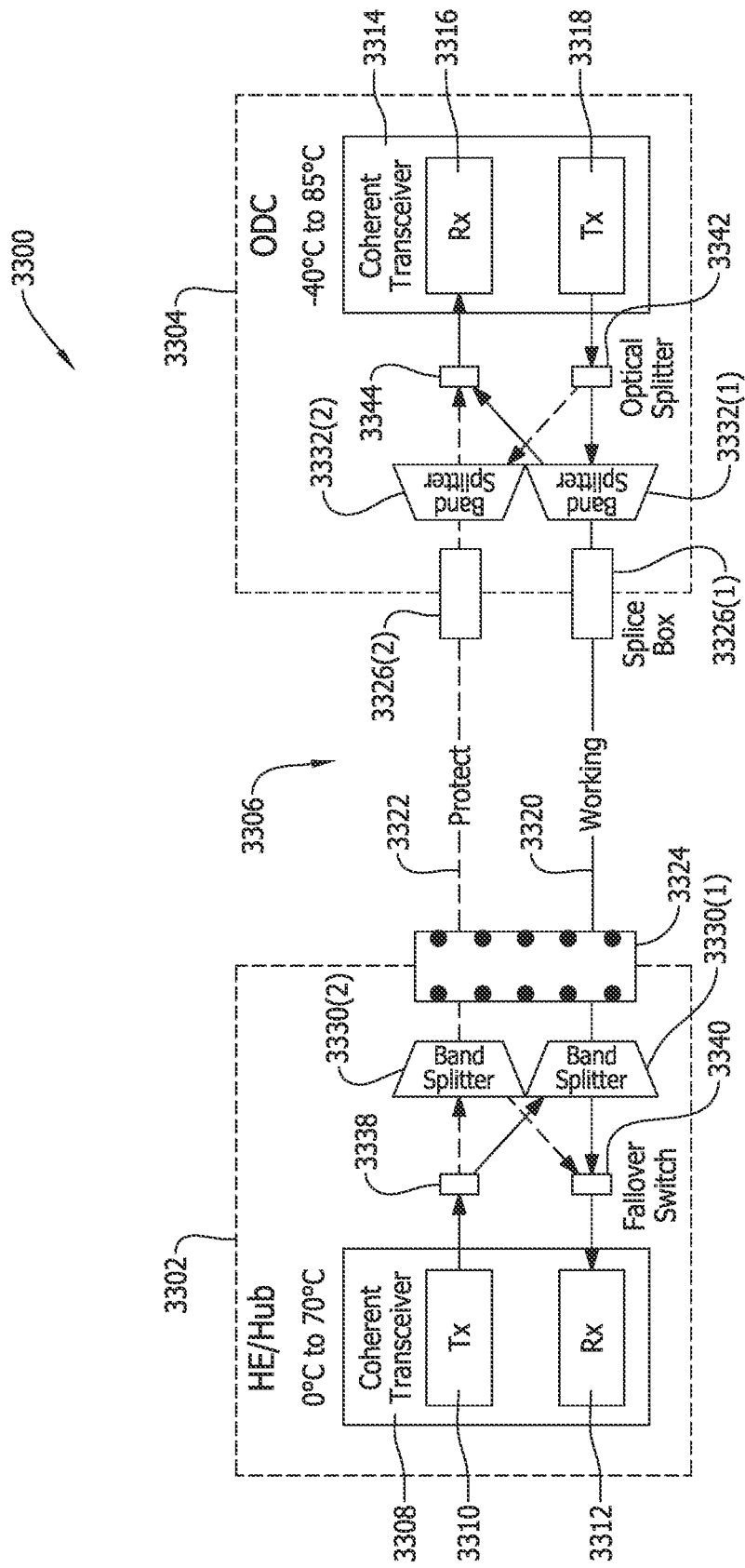
FIG. 33 is a schematic illustration of a coherent optics network architecture.

FIG. 33 is a schematic illustration of a coherent optics network architecture 3300. Architecture 3300 is a redundant 40 km bidirectional single channel architecture, and is similar to, in some respects, architecture 2500 (FIG. 25). Architecture 3300 includes a hub 3302; a node 3304; a transport medium 3306; a hub coherent transceiver 3308, having a downstream transmitting portion 3310 and an upstream receiving portion 3312; a node coherent transceiver 3314, having a downstream receiving portion 3316 and an upstream transmitting portion 3318; an optical distribution frame 3324; a plurality of splice boxes 3326, depicted in FIG. 33 as a first splice box 3326(1) and a second splice box 3326(2); a plurality of hub band splitters 3330, depicted in FIG. 33 as a first hub band splitter 3330(1) and a second hub band splitter 3330(2); and a plurality of node band splitters 3332, depicted in FIG. 33 as a first node band splitter 3332(1) and a second node band splitter 3332(2). Additionally, transport medium is about 40 km in length.

Different from the configuration illustrated in FIG. 25, architecture 3330 includes a first upstream and downstream transport medium 3320 and a second upstream and downstream transport medium 3322. First medium 3320 is commutatively coupled between coherent transceiver 3314 and first splice box 3326(1). Second medium 3322 is commutatively coupled between coherent transceiver 3314 and second splice box 3326(2). Hub 3302 includes a hub optical splitter 3338 and a hub failover switch 3340. Hub optical splitter 3338 is communicatively coupled to downstream transmission portion 3310 and hub band splitters 3330. Hub failover switch 3340 is communicatively coupled to upstream receiving portion 3312 and hub band splitters 3330. Node 3304 a node optical splitter 3342 and a node failover switch 3344. Node optical splitter 3342 is communicatively coupled to upstream transmission portion 3318 and node band splitters 3332. Node failover switch 3344 is communicatively coupled to downstream receiving portion 3316 and node band splitters 3332.

In architecture 3300, second medium 3322 is a redundant fiber extending from hub 3302 to node 3304. In other embodiments, there may be a diverse fiber run. In t architecture 3300, first medium 3320 is the working path for both downstream and upstream and second medium 3322 is the protect path. Hub optical failover switch 3340 determines which medium 3300, 3322 is used for the working path and which is used for the protect path. Node optical splitter 3342 combines two fibers back into one for downstream and breaks one stream into two fibers for upstream.

Figure 35:
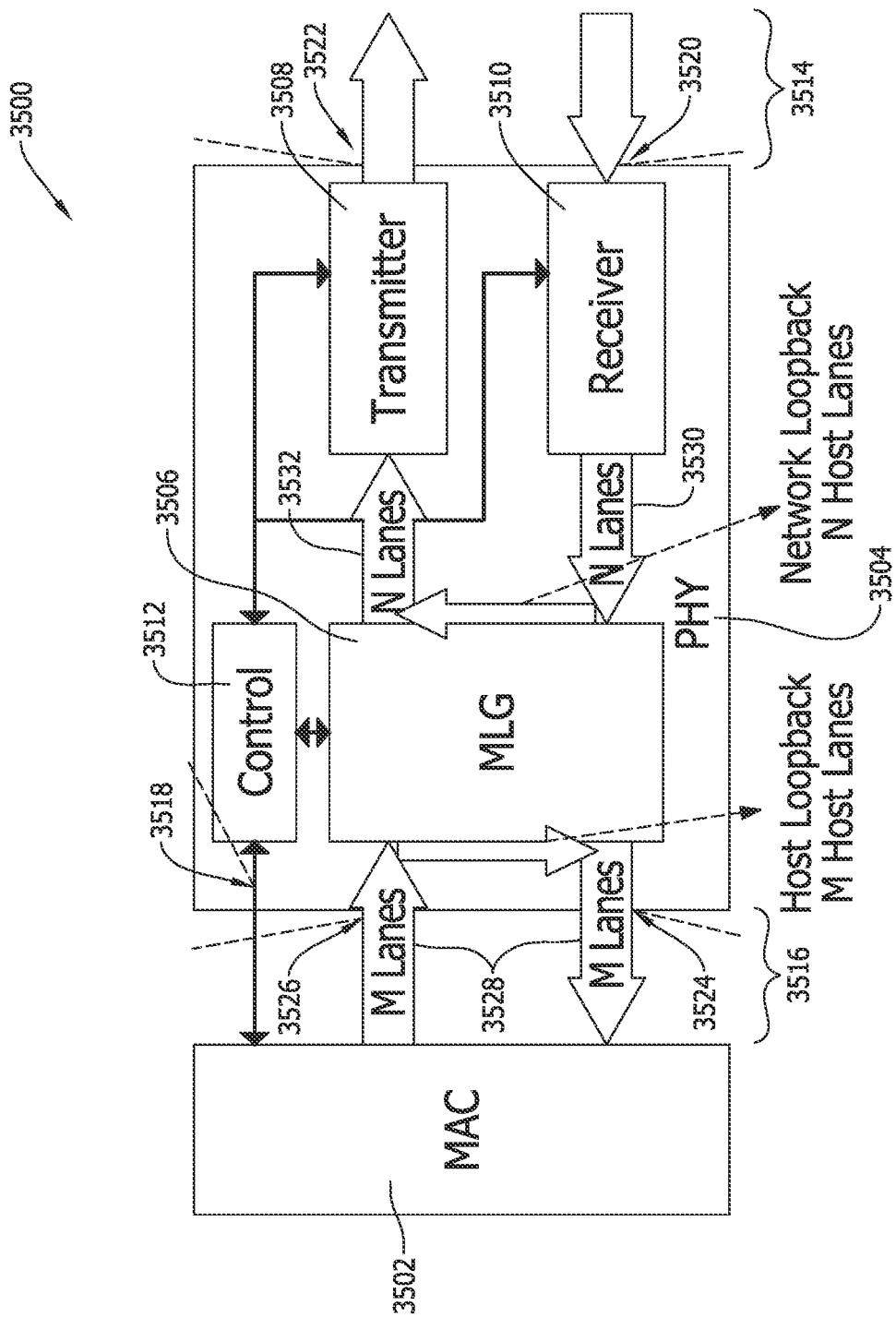
FIG. 35 is a schematic illustration of a coherent interface subsystem.

For shorter distances, no optical amplifiers are needed at hub 3302. A P2P coherent optic link on the fiber will work the same as other types of links that go through an optical failover switch 3340 and optical splitter 3338, as shown in FIG. 35 for a redundant bidirectional single channel architecture.

Table 17 shows an example of the link loss for a redundant 40 km bidirectional single channel link. As the table shows, the high power P2P coherent optic transmitter is the only option that will work for 200 Gbps speeds without optical amplification on the link.

TABLE 17

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| Optical Splitter | 4 | | | | | | | | |
| BiDi Band Splitter | 2 | | | | | | | | |
| Opt Distribution Frame | 1 | | | | | | | | |
| Outside Plant Fiber Attenuation 40 km 0.25 dB/km | 10 | | | | | | | | |
| ODC | | | | | | | | | |
| BiDi Band Splitter | 2 | | | | | | | | |
| Optical Failover Switch | 2 | | | | | | | | |

TABLE 17-continued

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Total Link Attenuation | 21 | | | | | | | | |
| Margin | 2 | | | | | | | | |
| Calculated Rx Input | | −29 | −31 | −32 | −31 | −23 | −23 | −24 | −25 |
| Required Rx Input | | −30 | −28 | −27 | −25 | −30 | −28 | −27 | −25 |
| Rx OSNR (dB) | | 35 | 35 | 35 | 35 | 35 | 35 | 35 | 35 |
| Link Supported? | | Yes | No | No | No | Yes | Yes | Yes | Yes |

Figure 34:
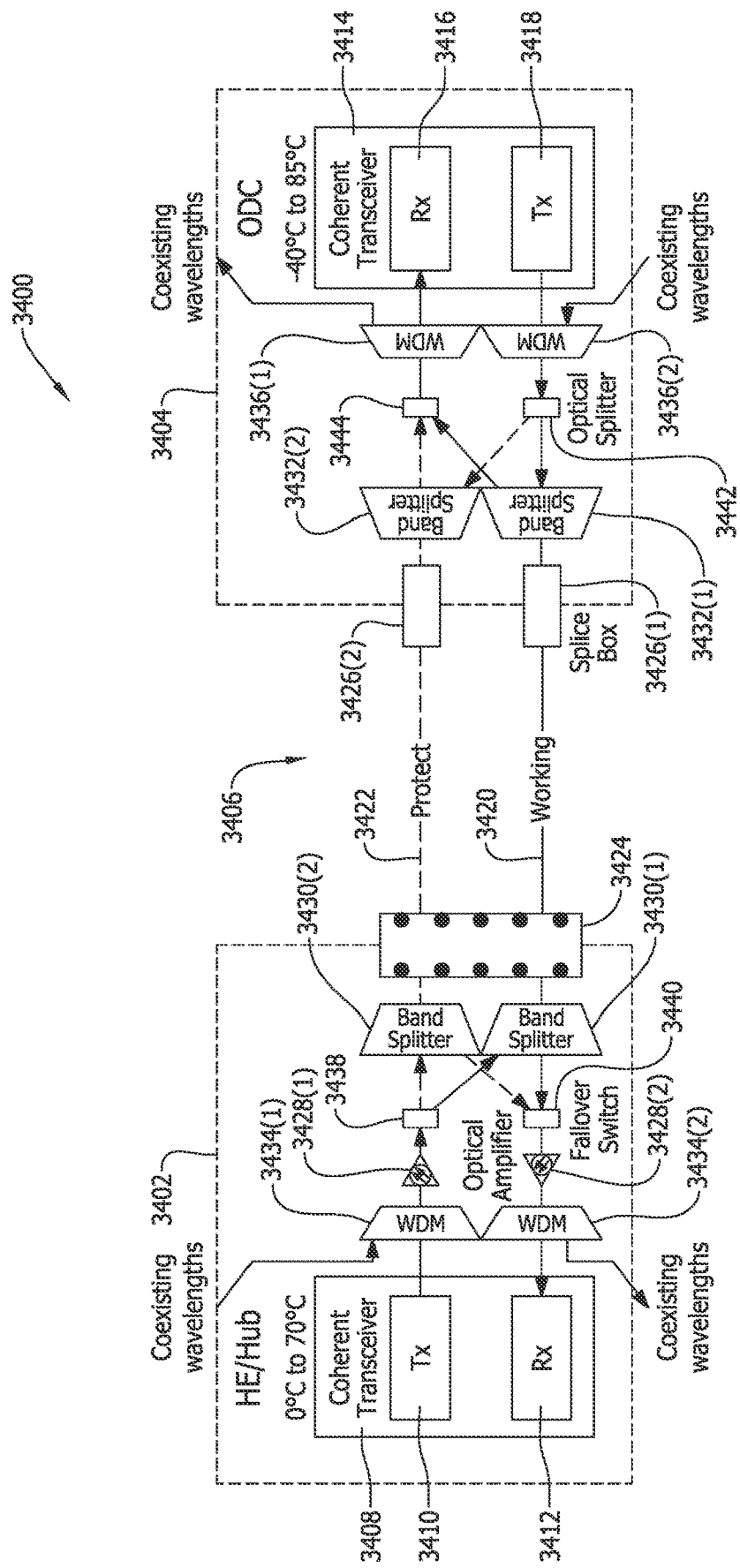
FIG. 34 is a schematic illustration of a coherent optics network architecture.

FIG. 34 is a schematic illustration of a coherent optics network architecture 3400. Architecture 3400 is an example of a 40 km bidirectional multi-channel with amplification, and is similar to, in some respects, architecture 3400 (FIG. 34). Architecture 3400 includes a hub 3402; a node 3404; a transport medium 33406; a hub coherent transceiver 3408, having a downstream transmitting portion 3410 and an upstream receiving portion 3412; a node coherent transceiver 3414, having a downstream receiving portion 3416 and an upstream transmitting portion 3418; a first upstream and downstream transport medium 3420; a second upstream and downstream transport medium 3422; an optical distribution frame 3424; plurality of splice boxes 3426, depicted in FIG. 34 as a first splice box 3426(1) and a second splice box 3426(2); a plurality of hub band splitters 3430, depicted in FIG. 34 as a first hub band splitter 3430(1) and a second hub band splitter 3430(2); a plurality of node band splitters 3432, depicted in FIG. 34 as a first node band splitter 3432(1) and a second node band splitter 3432(2); a hub optical splitter 3438; a hub failover switch 3440; a node optical splitter 3442; and a node failover switch 3444.

Different from the configuration illustrated in FIG. 33, but similar in some respects to the configuration shown in FIG. 28, architecture 3400 further includes a plurality of optical amplifiers 3428, depicted in FIG. 33 as a downstream optical amplifier 3428(1) and an upstream optical amplifier 3428(2); one or more hub multiplexers 3434, depicted in this example as a downstream hub multiplexer 3434(1) and an upstream hub multiplexer 3434(2); and one or more node multiplexers 3436, depicted in this example as a downstream node multiplexer 3436(1) and an upstream node multiplexer 3436 (2). In architecture 3400, transport medium 33406 is about 40 km in length.

Downstream hub multiplexer 3434(1) and downstream optical amplifier 3428(1) are communicatively coupled between downstream transmitting portion 3410 and hub optical splitter 3438. Upstream optical amplifier 3428(2) and upstream hub multiplexer 3434(2) are communicatively coupled between hub failover switch 3440 and upstream receiving portion 3412. Further, downstream node multiplexer 3436(1) is communicatively coupled between node failover switch 3444 and downstream receiving portion 3416. Additionally, upstream node multiplexer 3436(2) is communicatively coupled between node optical splitter 3442 and upstream transmitting portion 3418.

Architecture 3400 uses a WDM 3434 in the working and protect paths to support multiple wavelengths on the same fiber, as shown in FIG. 34. Optical amplifiers 3428 are used on both links to get them to close. Architecture 3400 is one of the most complex with all the different components needed and therefore has one of the most challenging link budgets to meet.

Table 18 shows an example downstream link loss for 40 km bidirectional multi-channel with optical amplifiers link loss, and Table 19 shows an example upstream link loss. Assuming the link can achieve an OSNR of at least 20 dB at the P2P coherent optic transceiver, then both P2P coherent optic transmitters could work for all modulation formats, except for the DP-16QAM at 32 GBaud on the low power P2P coherent optic transmitter. However, if the OSNR at the P2P coherent optic receiver is only 15 for the upstream link, then only the high power P2P coherent optic transmitter would work for the modulation format of DP-QPSK for both 100 Gbps and 200 Gbps.

TABLE 18

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Post-EDFA Gain | | −13 | −17 | −20 | −20 | −7 | −9 | −12 | −16 |
| Power/ch out of EDFA (dBm) | | 2 | 4 | 6 | 7 | 2 | 4 | 6 | 9 |
| Optical Splitter | 4 | | | | | | | | |
| BiDi Band Splitter | 2 | | | | | | | | |
| Opt Distribution Frame | 1 | | | | | | | | |
| Outside Plant Fiber Attenuation 40 km 0.25 dB/km | 10 | | | | | | | | |
| ODC | | | | | | | | | |

TABLE 18-continued

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| BiDi Band Splitter | 2 | | | | | | | | |
| Optical Failover Switch | 2 | | | | | | | | |
| WDM | 5 | | | | | | | | |
| Total Link Attenuation | 31 | | | | | | | | |
| Margin | 2 | | | | | | | | |
| Calculated Rx Input | | −26 | −24 | −22 | −21 | −26 | −24 | −22 | −19 |
| Required Rx Input | | −26 | −24 | −22 | −1 | −26 | −24 | −22 | −19 |
| Rx OSNR (dB) | | 20 | 20 | 20 | 20 | 20 | 20 | 20 | 20 |
| Link Supported? | | Yes | Yes | No | No | Yes | Yes | Yes | Yes |

TABLE 19

| | | A | | | | B | | | |
|---|---|---|---|---|---|---|---|---|---|
| Hub | dB of Loss | 100 G DP-QPSK28 | 200 G DP-QPSK64 | 200 G DP-8QAM42 | 200 G DP-16QAM32 | 100 G DP-QPSK28 | 200 G DP-QPSK64 | 200 G DP-8QAM42 | 200 G DP-16QAM32 |
| Tx Output Power | | −6 | −8 | −9 | −8 | 0 | 0 | −1 | −2 |
| WDM | 5 | | | | | | | | |
| Optical Splitter | 4 | | | | | | | | |
| BiDi Band Splitter | 2 | | | | | | | | |
| Outside Plant Fiber Attenuation 40 km 0.25 dB/km | 10 | | | | | | | | |
| ODC Optical Distribution Frame | 1 | | | | | | | | |
| BiDi Band Splitter | 2 | | | | | | | | |
| Optical Failover Switch | 2 | | | | | | | | |
| Pre-EDFA Gain | | −13 | −17 | −20 | −20 | −7 | −9 | −12 | −16 |
| Power into EDFA (dBm) | | −30 | −32 | −33 | −32 | −24 | −24 | −25 | −26 |
| WDM | 5 | | | | | | | | |
| Total Link Attenuation | 13 | | | | | | | | |
| Margin | 2 | | | | | | | | |
| Calculated Rx Input | | −26 | −24 | −22 | −21 | −26 | −24 | −22 | −19 |
| Required Rx Input | | −26 | −24 | −22 | −19 | −26 | −24 | −22 | −19 |
| Rx OSNR (dB) | | 20 | 20 | 20 | 20 | 20 | 20 | 20 | 20 |
| Link Supported? | | Yes | Yes | Yes | No | Yes | Yes | Yes | Yes |

FIG. 35 is a schematic illustration of a coherent interface subsystem 3500. Subsystem 3500 includes a MAC subsystem 3502 in operable communication with a PHY subsystem 3504. In this example, PHY subsystem 3504 includes a multi-link gear box ("MLG") 3506, a transmitter 3508, a receiver 3510, and a control unit 3512. In an embodiment, control unit 3512 is communicatively coupled to MAC subsystem 3502, MLG 3506, transmitter 3508, and receiver 3510.

In an exemplary embodiment, interface 3500 is configured to interface with respect to a line side 3514, a client side 3516, and a control interface 3518. In this example, line side 3514 includes an optical receive interface 3520 and optical transmit interface 3522. Further in this example, client side 3516 includes an electrical transmit interface 3524 and an electrical receive interface 3526.

More specifically, optical receive interface 3520 represents a portion of subsystem 3500 that interfaces with transmitted upstream optical information. Similarly optical transmission interface 3522 represents a portion of subsystem 3500 that transmits downstream optical information. On client side 3516, electrical receive interface 3524 represents a portion of subsystem 3500 that interfaces with transmitted electrical information from MAC subsystem 3502. Similarly, electrical transmit interface 3526 represents a portion of subsystem 3500 that transmits electrical information to MAC subsystem 3502. Control interface 3518 represents the connection between MAC 3502 and control unit 3512.

As shown in FIG. 35, in an embodiment, MAC subsystem 3502 transmits signals to and receives signals from MLG 3506 via M lanes 3528. In some embodiments, receiver 3510 transmits signals to MLG 3506 via N lanes 3530 and MLG 3506 transmits signals to transmitter 3508 via N lanes 3532.

In some embodiments, client mapping may be performed. In an example, a specific client format may be obtained. The specific client format may be an existing standard, but may alternatively be a subset of an existing standard the client side interface 3516 needs to meet. The client forward error correction (FEC) termination may be 100G or 200G, and control interface 3518 is useful for determining what parameters of the various components are configurable. The parameters may be obtained and set by an operations support system interface (OSSI).

In some embodiments, control interface 3518 may be configured to change the configuration of a component. In further embodiments, control interface 3518 may collect data from a component. In some cases, a network loopback may short-circuit the PHY process by sending information received back to the transmitter 3522 for transmission. In these embodiments, both the receive and transmit processes may be performed before transmission of a signal. The intended use of a loopback is to allow an external entity to monitor if the optical interface on the transceiver is working properly. In some embodiments, the network loopback may occur during turn up. In further embodiments, the network loopback may initiate if failures suddenly begin in order to, for example, assist in troubleshoot the cause of the failure.

In some embodiments, one or more processes may occur during a network loopback. In further embodiments, one or more configurable parameters may be used to establish a network loopback. In still further embodiments, the transceiver may collect data while in loopback in order for operations to pinpoint the cause of a failure.

In some embodiments, a transceiver may be placed into host loopback. While the transceiver is placed into host loopback, a number of processes may be performed. In further embodiments, one or more configurable parameters may establish host loopback. In still further embodiments, the transceiver may collect data while in loopback.

In some embodiments of lineside interface 3514, line mapping may occur. Some embodiments of line mapping may include framing, such as, for example, an Ethernet extended sublayer for both 100G and 200G. In some embodiments, differential encoding is optional. Still further embodiments of line mapping may include pilot tones that can be used, for example, for synchronizing transmitter 3508 and receiver 3510. In an embodiment, the pilot tones occur every 32nd symbol. Some embodiments of line mapping may include transparent timing. In some cases, transparent coding is optional.

Figure 36:
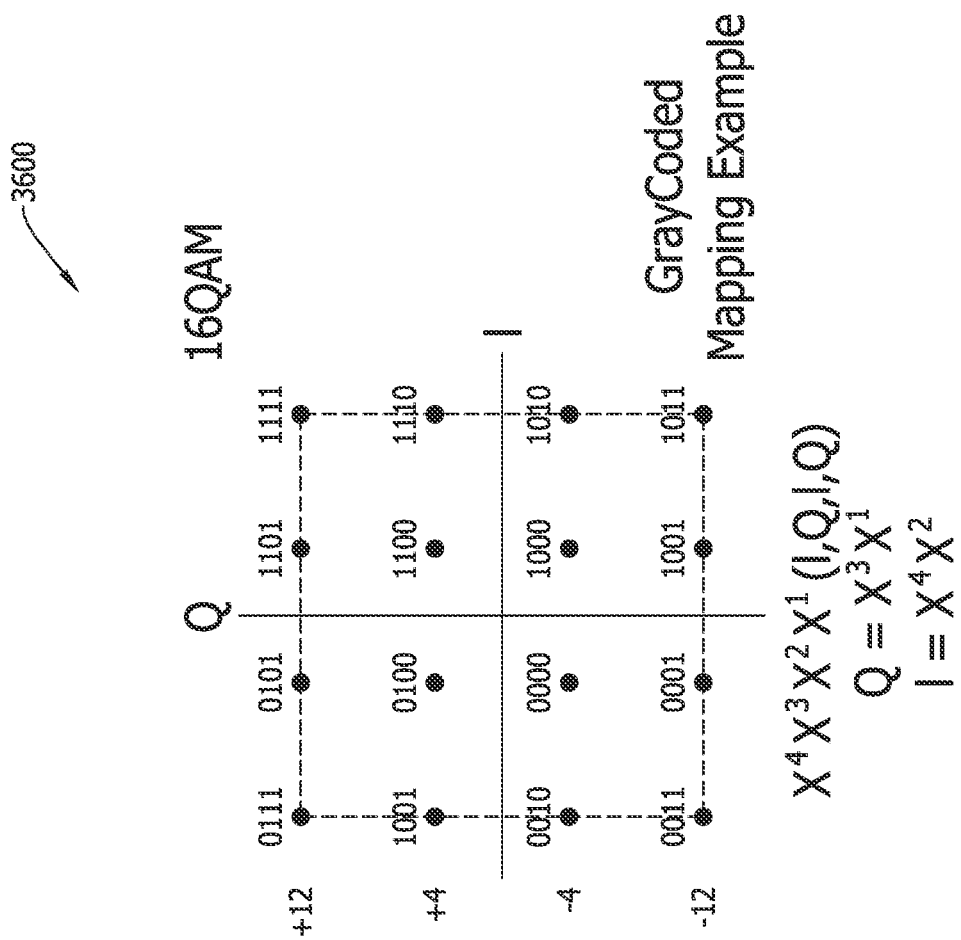
FIG. 36 is a graphical illustration depicting a symbol mapping constellation.

FIG. 36 is a graphical illustration depicting a symbol mapping constellation 3600. In some embodiments, constellation 3600 represents a 16QAM symbol mapping. In this example, bits 3602 are mapped onto an IQ constellation (i.e., constellation 3600). In some embodiments, the 100G may be DP-QPSK and the 200G may be DP-8QAM or DP-16QAM. In other embodiments, 16QAM has the same symbol rate as QPSK. In some embodiments, 8QAM is a 40GBaud, has greater margin, allows for 50 GHz spacing, and has less than 0.5 dBm loss for bit error rate (BER).

Figure 37:
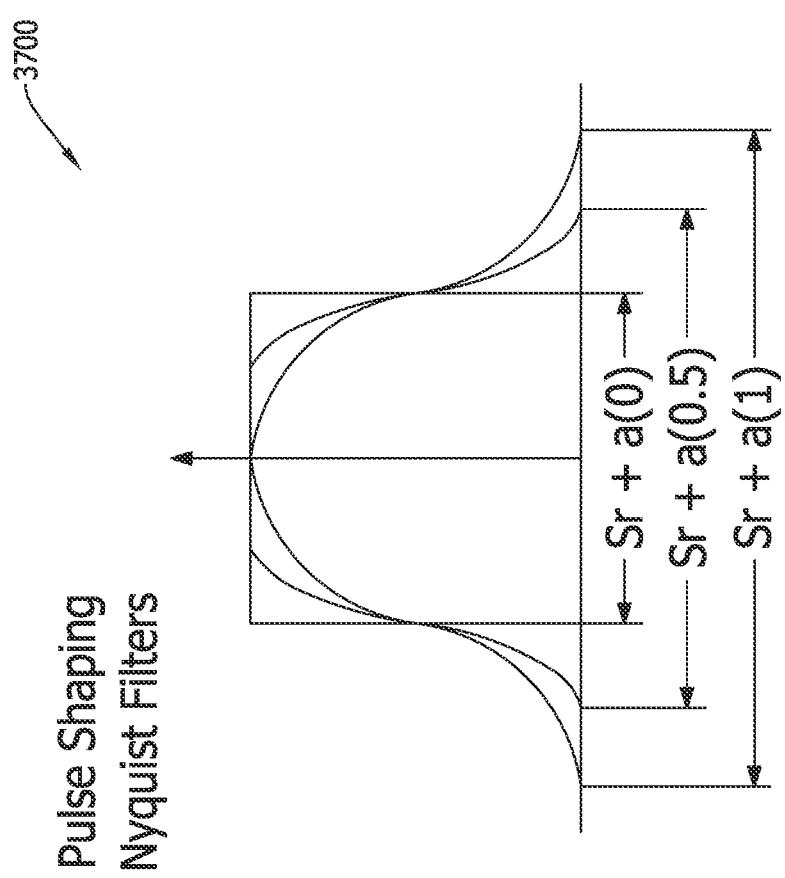
FIG. 37 is a graphical illustration depicting a pulse shaping effect.

FIG. 37 is a graphical illustration depicting a pulse shaping effect 3700. Pulse shaping effect 3700 demonstrates an exemplary embodiment where neighboring wavelengths may be optimally deployed on the same fiber (e.g., 50 GHz spacing, in this example).

In some embodiments, forward error correction (FEC) encoding is employed. For example, two types of FEC encodings (i) Turbo Product Code ("TPC") 500 mW, and (ii) HC Staircase 300 nW, may be utilized. In some embodiments, TPC is used. Some FEC encoding embodiments implement Acacia SD as a power-efficient option, and Acacia SD TPC offers flexibility for longer distances and multiple iterations. Some FEC embodiments utilize hard decision (HD), for example, in the case of 100G with 7% overhead for staircase FEC. Other embodiments of FEC encoding employ TPC with 15% overhead.

In some embodiments of line mapping, various symbol rates may be used. For example, in some embodiments, 31 GBaud may be used (e.g., 100G, 200G at 16 QAM). In other embodiments, a 40-42 GBaud may be used (e.g., 200G at 8QAM). Symbol rates may correlate to a particular modulation format and bits per second.

Figure 38:
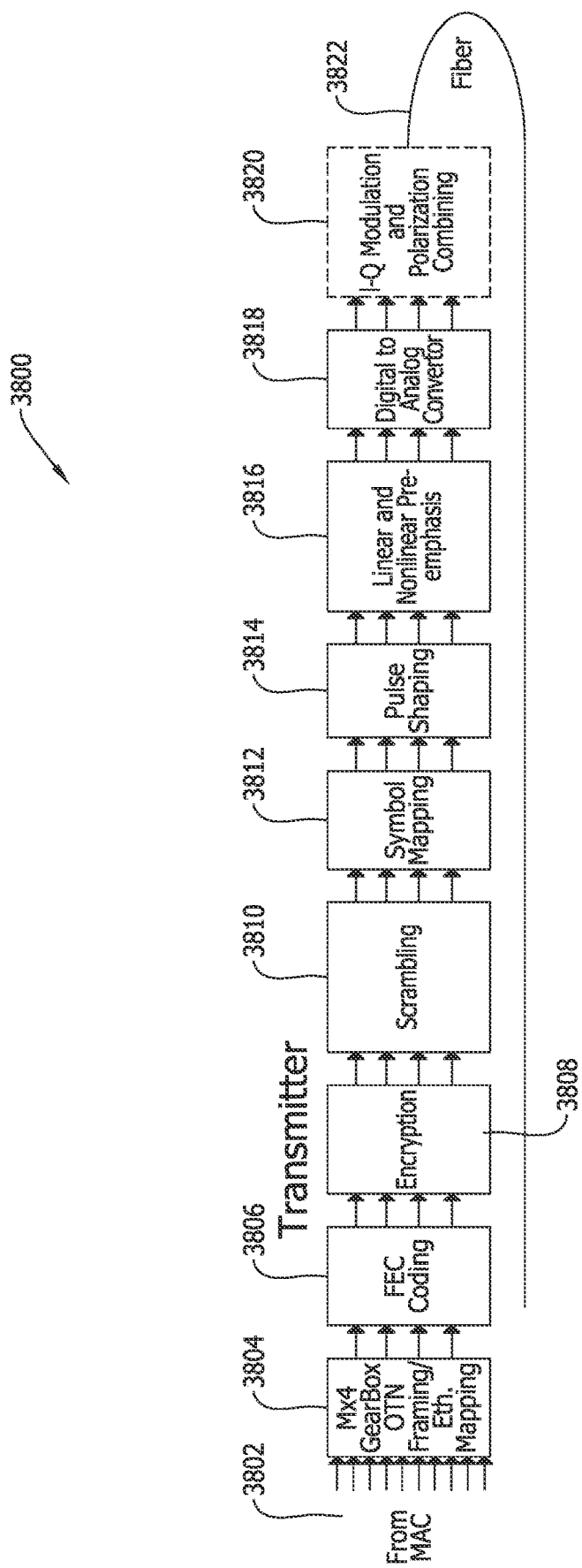
FIG. 38 is a schematic illustration of a transmitter.

FIG. 38 is a schematic illustration of a transmitter 3800. In an exemplary embodiment, transmitter 3800 may include one or more of a signal input from media access control 3802, a Mx4 Gearbox 3804, configured to perform OTN Framing and/or Ethernet mapping, a FEC coder 3806, an encrypter 3808, a scrambler 3810, a symbol mapper 3812, a pulse shaper 3814, a linear and nonlinear pre-emphasis unit 3816, a digital-to-analog converter 3818, an I-Q modulator and/or polarization combiner 3820 and a transport medium 3822. In exemplary operation of transmitter 3800, signal input 3802 may be proceed through one or more components 3802-3820 and transmitted through transport medium 3822.

In some embodiments of transmitter 3800, IQ modulation and polarization combining may be performed by IQ modulator and polarizer 3820. IQ modulation and polarization is the process through which IQ symbols are combined onto two polarizations. Transmitter X-Y skew may, in some embodiments, be performed in 1 ps. Transmitter I-Q skew may, in some embodiments, be performed in 1 ps. In an embodiment of transmitter 3800, encryption may be performed by encryption unit 3808. Transmitter 3800 may support a variety of encryption algorithms, such as, for example, advanced encryption standard (AES). In some cases, encryption at this level of the open systems interconnection (OSI) stack is particularly complex, and may impact interoperability.

Figure 39:
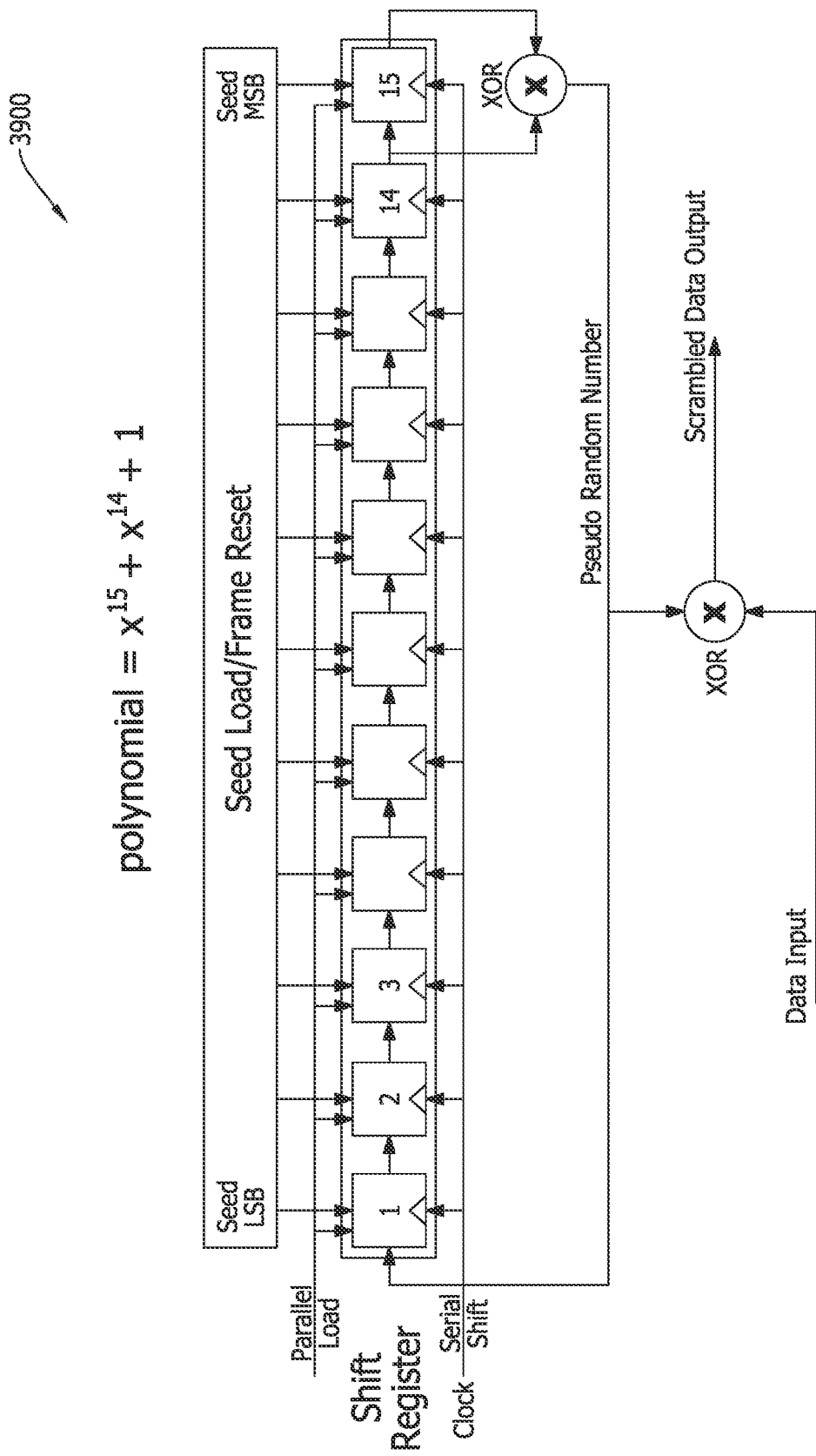
FIG. 39 is a schematic illustration of a scrambling unit.

FIG. 39 is a schematic illustration of a scrambling unit 3900. Scrambling unit 3900 may be employed with one or more of the embodiments described herein. In an exemplary embodiment scrambling unit 3900 executes scrambling algorithms to support the coherent transmitter.

Figure 40:
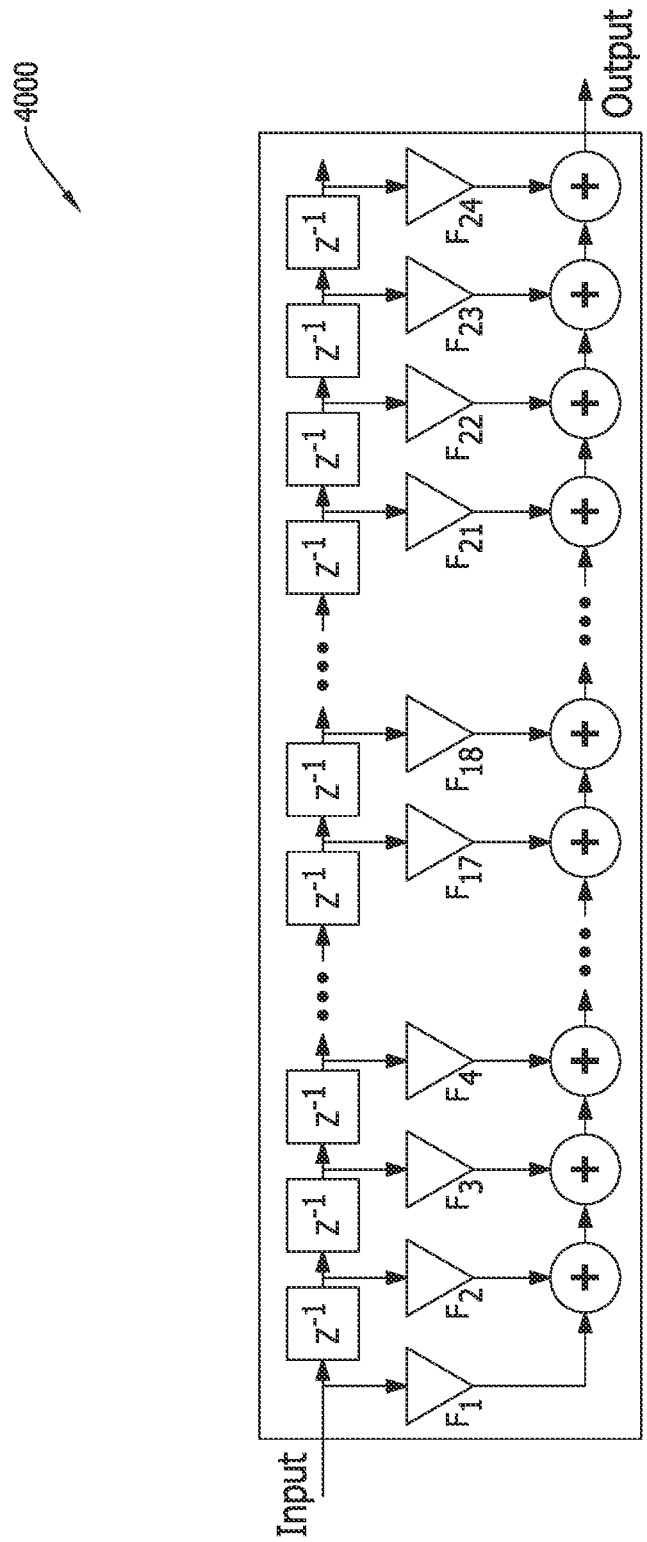
FIG. 40 is a schematic illustration of a filter.

FIG. 40 is a schematic illustration of a filter 4000. Filter 4000 may also be employed with one or more of the embodiments described herein. Filter 4000 may, for example, be deployed at one or both of the coherent transmitter and coherent receiver. In an exemplary embodiment, filter 4000 is representative of a pre-equalizer transversal filter.

Figure 41:
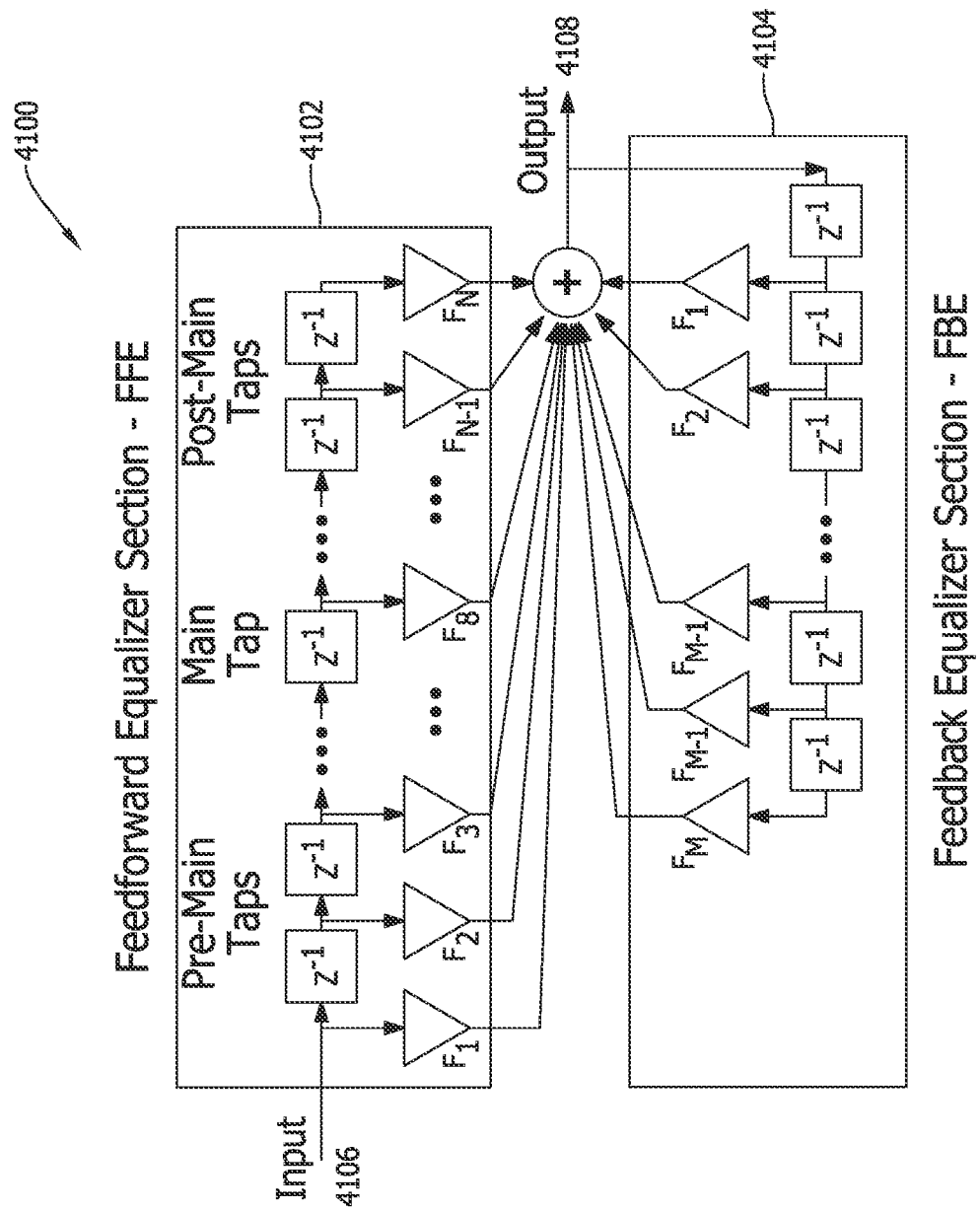
FIG. 41 is a schematic illustration of a pre-equalizer unit.

FIG. 41 is a schematic illustration of a pre-equalizer unit 4100. In an exemplary embodiment, unit 4100 includes a feedforward equalizer section 4102 and a feedback equalizer section 4104. Feedforward equalizer section 4102 is connected to an input 4106, and feeds into an output 4108. In contrast, feedback equalizer section 4104 uses output 4108 as both an input and an output. In the exemplary embodiment, unit 4100 provides both linear and nonlinear preemphasis, and advantageously may be utilized to mitigate the drawbacks of cost/band-limited components and their corresponding effects on roll off, micro-reflection, etc.

Figure 42:
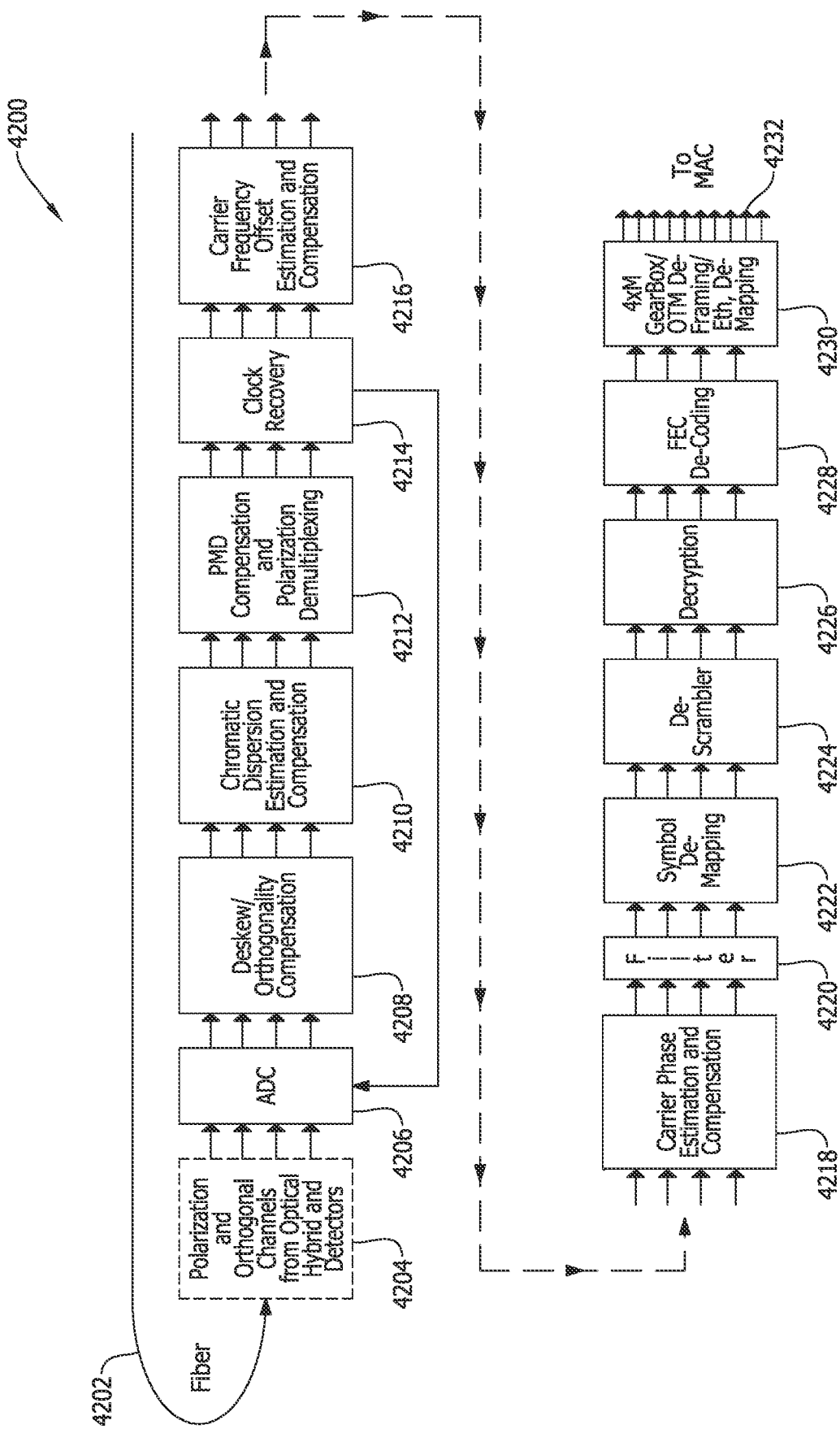
FIG. 42 is a schematic illustration of a receiver.

FIG. 42 is a schematic illustration of a receiver 4200. In an exemplary embodiment, receiver 4200 may include one or more of a signal input from a transport medium 4202, a polarization and/or orthogonal channels from optical hybrid and detection unit 4204, an analog-to-digital ("ADC") converter 4206, a deskew/orthogonality compensation unit 4208, a chromatic dispersion estimator and compensator 4210, a polarization mode dispersion ("PMD") compensator and polarization demultiplexer 4212, a clock recovery unit 4214, a carrier frequency offset estimator and compensator 4216, a carrier phase estimator and compensator 4218, a symbol de-mapper 4220, a de-scrambler 4222, a decrypter 4224, a FBC decoder 4226, a Mx4 Gearbox 4228, configured to perform OTN Framing and/or Ethernet mapping, and a media access control layer 4230. In exemplary operation of receiver 4200, signal input from transport medium 4202 may proceed through one or more components 4202-4230 and transmitted to media access control 4230. Further, in some embodiments, signal input may cycle through a cycler 4234 from clock recovery unit 4214 back to ADC unit 4206.

In some embodiments, receiver 4200 may have a minimum input power. In some embodiments, the minimum input power is −25 dBm. In further embodiments, the minimum input power is −22 dBm. In some embodiment, receiver 4200 has an input range post DWDM and before pre-amplifier. In some embodiments, this range is +2 to ~15 dBm. In other embodiments, receiver 4200 has a target receiver OSNR and minimum receiver OSNR. The target receive OSNR may be calculated. In some embodiments, the minimum receiver OSNR is 16 dB. In further embodiments, the minimum receiver OSNR is 22 dB. In some embodiments, data may be captured by the component used to measure the OSNR. In some embodiments, receiver 4200 has a polarization dependent loss ("PDL") tolerance. In some further embodiments, the PDL tolerance is 1 dB. In some embodiments, receiver 4200 has an I-Q skew. In other embodiments, the I-Q skew is 1 ps. In some embodiments, coherent detection in access network may allow for a lower cost local oscillator. The use of a common laser may have benefits for transmitter and receivers. These benefits may, for example, be higher efficiency or lower cost.

In some embodiments of P2P coherent PHY, requirements may vary depending on a number of factors. For example, requirements for P2P coherent PHY may change when the distance is less than 40 km, between 40 km and 80 km, or between 80 km and 120 km. In further embodiments, the modes and requirements may be defined in such a way so as to optimize the utility of the P2P coherent PHY. For example, the modes may be optimized in a way so as to lead to less expensive components than long-haul and metro coherent optics components.

In some embodiments, the transmitter generates a pilot tone roughly every $32^{nd}$ symbol. In some embodiments, the receiver is capable of receiving a pilot tone every $32^{nd}$ symbol. In further embodiments, the receiver uses the pilot tone to synchronize with the symbols sent by the transmitter. The transmitter MUST generate a pilot tone every 32nd symbol when sending at 100 Gbps. The transmitter MUST generate a pilot tone every 32nd symbol when sending 200 Gbps. The receiver MUST be capable of receiving a pilot tone every 32nd symbol for 100 Gbps. The receiver MUST be capable of receiving a pilot tone every 32nd symbol for 200 Gbps.

The systems and methods described herein are therefore of particular advantage with respect to applications such as Chroma D&B, ranging, and hard coding. In the case of short fibers (e.g. fibers less than or equal to 40 km), 64 QAM may be used, and may further include a FEL hard decision, lower power, elimination of some sequences, wavelengths in ether the C band or L band, narrow or broad spacing (e.g., higher QAM for broader spacing), post-compensation, and a higher symbol rate. In the case of long fibers (e.g., greater than 40 km), 16 QAM may be used, and may further include a hard or soft FEL decision, higher power, all sequences, wavelengths in the C band, broader spacing, both pre- and post-compensation, and a lower symbol rate.

Exemplary embodiments of coherent optics systems and methods for communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for a coherent optical communication access network having a local transceiver in operable communication with a remote transceiver over an optical transport medium, the apparatus comprising:

an electrical interface unit configured to (i) receive a plurality of outgoing electrical data signals from a media access control (MAC) layer of the local transceiver, and (ii) transmit a plurality of incoming electrical data signals to the MAC layer of the local transceiver;

a control interface unit in operable communication with the MAC layer of the local transceiver separate from the plurality of outgoing and incoming electrical data signals;

an optical interface unit disposed within a physical layer (PHY) of the apparatus, and in operable communication with a control signal from the control interface unit, the optical interface unit configured to (i) transmit an outgoing optical data signal to the optical transport medium based on the control signal and the received plurality of outgoing electrical data signals, and (ii) receive an incoming optical data signal from the optical transport medium.

2. The apparatus of claim 1, wherein the apparatus is disposed proximate the local transceiver.

3. The apparatus of claim 1, wherein the local transceiver includes a coherent optics transceiver.

4. The apparatus of claim 1, wherein the apparatus is disposed proximate the remote transceiver.

5. The apparatus of claim 1, wherein the remote transceiver includes a coherent optics receiver.

6. The apparatus of claim 1, wherein the local transceiver and the remote transceiver are communicatively coupled over the optical transport medium through the apparatus.

7. The apparatus of claim 1, wherein the control interface unit is further communicatively coupled to the remote transceiver.

8. The apparatus of claim 1, wherein the optical transport medium includes an incoming optical medium and an outgoing optical medium separate from the incoming optical medium.

9. An apparatus for a coherent optical communication access network having a local transceiver in operable communication with a remote transceiver over an optical transport medium, the apparatus comprising:
- an electrical interface unit configured to (i) receive a plurality of outgoing electrical data signals from the local transceiver, and (ii) transmit a plurality of incoming electrical data signals to the local transceiver;
- a control interface unit in operable communication with the local transceiver separate from the plurality of outgoing and incoming electrical data signals;
- an optical interface unit in operable communication with a control signal from the control interface unit, the optical interface unit configured to (i) transmit an outgoing optical data signal to the optical transport medium based on the control signal and the received plurality of outgoing electrical data signals, and (ii) receive an incoming optical data signal from the optical transport medium; and
- a gear box in operable communication with (i) the plurality of incoming and outgoing electrical data signals of the electrical interface unit, (ii) the control signal of the control interface unit, and (iii) the optical interface unit.

10. The apparatus of claim 9, wherein the plurality of incoming electrical data signals include M incoming host lanes to the gear box, and wherein the plurality of outgoing electrical data signals include M outgoing host lanes from the gear box.

11. The apparatus of claim 10, further comprising a host loopback from the M incoming host lanes to the M outgoing host lanes, wherein M is an integer greater than or equal to 1.

12. The apparatus of claim 10, further comprising (i) N outgoing network lanes from the MLG to the optical interface unit, and (ii) N incoming network lanes to the MLG from the optical interface unit, where N is an integer greater than or equal to 1.

13. The apparatus of claim 12, further comprising a network loopback from the N incoming network lanes to the N outgoing network lanes.

14. The apparatus of claim 13, wherein the network loopback enables an external entity to monitor operational functionality of the optical interface unit.

15. The apparatus of claim 13, wherein the network loopback is configured to operate during a turn up operation of the apparatus.

16. The apparatus of claim 13, wherein the network loopback is configured to operate upon occurrence of a failure event of the optical interface unit.

17. The apparatus of claim 13, further comprising (i) a coherent transmitter disposed between the N outgoing network lanes and the outgoing optical data signal, and (ii) a coherent receiver disposed between the N incoming network lanes and the incoming optical data signal.

18. The apparatus of claim 17, wherein the network loopback functions to send information received at the coherent receiver back to the coherent transmitter for transmission.

19. The apparatus of claim 17, wherein the optical interface unit further comprises a line mapping module.

20. The apparatus of claim 19, wherein the line mapping module comprises at least one of a framing unit, a differential encoder, and a synchronization unit for synchronizing the coherent transmitter with the coherent receiver.

* * * * *